(12) United States Patent
Quigley et al.

(10) Patent No.: US 11,273,473 B2
(45) Date of Patent: *Mar. 15, 2022

(54) LANDFILL GAS EXTRACTION SYSTEMS AND METHODS

(71) Applicant: Loci Controls, Inc., Wareham, MA (US)

(72) Inventors: Peter Quigley, Duxbury, MA (US); Ian Martin, Sharon, MA (US); Nicole Neff, Colorado Springs, CO (US); Jack Rowbottom, Swansea, MA (US)

(73) Assignee: Loci Controls, Inc., Wareham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,430

(22) Filed: Jun. 15, 2020

(65) Prior Publication Data

US 2020/0306807 A1    Oct. 1, 2020

Related U.S. Application Data

(63) Continuation of application No. 16/589,372, filed on Oct. 1, 2019.

(60) Provisional application No. 62/793,304, filed on Jan. 16, 2019, provisional application No. 62/739,612, filed on Oct. 1, 2018.

(51) Int. Cl.
*E21B 43/12* (2006.01)
*B09B 1/00* (2006.01)
*E21B 34/02* (2006.01)

(52) U.S. Cl.
CPC .............. *B09B 1/006* (2013.01); *E21B 34/02* (2013.01); *Y02W 30/30* (2015.05)

(58) Field of Classification Search
CPC ..................................................... B09B 1/006
See application file for complete search history.

(56) References Cited

U.S. PATENT DOCUMENTS

3,062,037 A    11/1962   Donner et al.
3,567,387 A    3/1971    Jones
(Continued)

FOREIGN PATENT DOCUMENTS

WO    WO 2006/005014 A2    1/2006
WO    WO 2015/072989 A1    5/2015
(Continued)

OTHER PUBLICATIONS

Extended European Search Report for European Application No. 17760717.3 dated Oct. 2, 2019.
(Continued)

*Primary Examiner* — Janine M Kreck
(74) *Attorney, Agent, or Firm* — Wolf, Greenfield & Sacks, P.C.

(57) ABSTRACT

A control system for controlling extraction of landfill gas from a landfill via a gas extraction system, the gas extraction system comprising well piping for coupling a plurality of wells to a gas output. The control system comprises a controller configured to: obtain a value indicating measured energy content of landfill gas collected at the gas output from the plurality of wells; determine whether the measured energy content is different from a target energy content; and in response to determining that the measured energy content is different from the target energy content: control a plurality of valves disposed in the well piping to change flow rates of landfill gas being extracted from at least some of the plurality of wells at least in part by changing degrees to which the plurality of valves are open.

18 Claims, 17 Drawing Sheets

(56) References Cited

U.S. PATENT DOCUMENTS

| | | | |
|---|---|---|---|
| 4,026,355 A | 5/1977 | Johnson et al. | |
| 4,191,541 A | 3/1980 | Jenkins | |
| 4,227,897 A | 10/1980 | Reed | |
| 4,494,380 A | 1/1985 | Cross | |
| 4,670,148 A | 6/1987 | Schneider | |
| 4,890,672 A | 1/1990 | Hall | |
| 5,063,519 A | 11/1991 | Zison | |
| 5,209,941 A | 5/1993 | Wuest | |
| 5,223,229 A | 6/1993 | Brucker | |
| 5,451,249 A | 9/1995 | Spiegel et al. | |
| 5,458,006 A | 10/1995 | Roqueta | |
| 5,665,314 A | 9/1997 | Berger et al. | |
| 5,681,360 A | 10/1997 | Siwajek et al. | |
| 5,695,641 A | 12/1997 | Cosulich et al. | |
| 5,830,262 A | 11/1998 | Marchini et al. | |
| 6,169,962 B1* | 1/2001 | Brookshire | B09B 1/00 702/47 |
| 6,196,324 B1 | 3/2001 | Giacomino et al. | |
| 6,241,950 B1 | 6/2001 | Veelenturf et al. | |
| 6,399,391 B1 | 6/2002 | Tomlin | |
| 6,591,695 B1 | 7/2003 | Brookshire et al. | |
| 6,595,287 B2 | 7/2003 | Fisher | |
| 6,611,760 B2 | 8/2003 | Bentley et al. | |
| 6,749,368 B2 | 6/2004 | Ankeny et al. | |
| 6,799,477 B2 | 10/2004 | Brookshire et al. | |
| 6,999,883 B1 | 2/2006 | Brady et al. | |
| 7,187,299 B2 | 3/2007 | Kunerth et al. | |
| 7,198,433 B2 | 4/2007 | Augenstein et al. | |
| 7,243,730 B2 | 7/2007 | Casey | |
| 7,273,098 B2 | 9/2007 | Evans et al. | |
| 7,373,976 B2 | 5/2008 | Casey | |
| 7,387,163 B2 | 6/2008 | Seegers et al. | |
| 7,448,828 B2 | 11/2008 | Augenstein et al. | |
| 7,748,450 B2 | 7/2010 | Mundell | |
| 7,866,921 B2 | 1/2011 | Stamoulis | |
| 7,950,464 B2 | 5/2011 | Atencio et al. | |
| 7,972,082 B2 | 7/2011 | Augenstein et al. | |
| 8,047,276 B2 | 11/2011 | Stamoulis | |
| 8,168,121 B2 | 5/2012 | Elkins | |
| 8,186,211 B2 | 5/2012 | Boult et al. | |
| 8,840,708 B1 | 9/2014 | Morrow et al. | |
| 8,924,029 B2 | 12/2014 | Nath et al. | |
| 9,062,536 B2 | 6/2015 | Fischer et al. | |
| 10,029,290 B2 | 7/2018 | Campanella et al. | |
| 10,400,560 B2 | 9/2019 | Campanella et al. | |
| 10,408,747 B2 | 9/2019 | Schlueter et al. | |
| 10,449,578 B2 | 10/2019 | Campanella et al. | |
| 10,556,259 B2 | 2/2020 | Campanella et al. | |
| 10,576,514 B2 | 3/2020 | Campanella et al. | |
| 10,576,515 B2 | 3/2020 | Campanella et al. | |
| 10,639,687 B2 | 5/2020 | Campanella et al. | |
| 10,705,063 B2 | 7/2020 | Campanella et al. | |
| 10,882,086 B2 | 1/2021 | Quigley et al. | |
| 10,946,420 B2 | 3/2021 | Quigley et al. | |
| 11,007,555 B2 | 5/2021 | Campanella et al. | |
| 11,067,549 B2 | 7/2021 | Campanella et al. | |
| 11,072,006 B2 | 7/2021 | Campanella et al. | |
| 11,084,074 B2 | 8/2021 | Campanella et al. | |
| 2001/0005812 A1 | 6/2001 | Brookshire et al. | |
| 2002/0101718 A1 | 8/2002 | Negishi | |
| 2003/0000281 A1 | 1/2003 | Ketler et al. | |
| 2004/0055359 A1 | 3/2004 | Ketler et al. | |
| 2004/0121201 A1 | 6/2004 | Roche et al. | |
| 2006/0034664 A1 | 2/2006 | Augenstein et al. | |
| 2006/0251540 A1 | 11/2006 | Benning et al. | |
| 2007/0224085 A1 | 9/2007 | Tooley | |
| 2007/0225923 A1* | 9/2007 | Tooley | B09B 1/006 702/47 |
| 2008/0011248 A1 | 1/2008 | Cutlip et al. | |
| 2008/0127726 A1 | 6/2008 | Elkins | |
| 2009/0136298 A1 | 5/2009 | Augenstein et al. | |
| 2010/0310733 A1 | 12/2010 | Hoffman | |
| 2011/0061439 A1 | 3/2011 | Dong et al. | |
| 2011/0061874 A1 | 3/2011 | Stamoulis | |
| 2011/0081586 A1 | 4/2011 | McAlister | |
| 2011/0132104 A1 | 6/2011 | Benson et al. | |
| 2011/0198094 A1 | 8/2011 | Stamoulis | |
| 2011/0231099 A1 | 9/2011 | Elkins | |
| 2011/0272420 A1 | 11/2011 | Landess et al. | |
| 2012/0191349 A1 | 7/2012 | Lenz et al. | |
| 2012/0206715 A1 | 8/2012 | Laub | |
| 2012/0287418 A1 | 11/2012 | Scherer et al. | |
| 2013/0180703 A1 | 7/2013 | Colby | |
| 2013/0193325 A1 | 8/2013 | Phillips et al. | |
| 2013/0247647 A1 | 9/2013 | Mahoney et al. | |
| 2013/0334418 A1 | 12/2013 | Cowie et al. | |
| 2014/0182846 A1 | 7/2014 | Fischer et al. | |
| 2014/0284935 A1 | 9/2014 | Disbennett et al. | |
| 2014/0338878 A1 | 11/2014 | Tessnow | |
| 2015/0000426 A1 | 1/2015 | Mustang | |
| 2015/0226045 A1 | 8/2015 | Fischer et al. | |
| 2015/0275632 A1 | 10/2015 | Fischer et al. | |
| 2015/0330938 A1 | 11/2015 | Henson et al. | |
| 2015/0354032 A1 | 12/2015 | Yuan et al. | |
| 2015/0362468 A1 | 12/2015 | Gerhold | |
| 2016/0011159 A1 | 1/2016 | Sekiya et al. | |
| 2016/0025696 A1 | 1/2016 | Birks et al. | |
| 2016/0033391 A1 | 2/2016 | Stroganov et al. | |
| 2016/0123946 A1 | 5/2016 | Dufresne | |
| 2016/0169826 A1 | 6/2016 | Youssi et al. | |
| 2016/0209133 A1 | 7/2016 | Hu et al. | |
| 2016/0237007 A1 | 8/2016 | Morrow et al. | |
| 2016/0238494 A1 | 8/2016 | Chrin, II | |
| 2016/0247183 A1 | 8/2016 | Foody | |
| 2016/0287870 A1 | 10/2016 | Yip et al. | |
| 2016/0377457 A1 | 12/2016 | Zhang et al. | |
| 2017/0080762 A1 | 3/2017 | Guinart et al. | |
| 2017/0122065 A1* | 5/2017 | Fischer | B09B 1/00 |
| 2017/0176590 A1 | 6/2017 | Sharonov et al. | |
| 2017/0216891 A1 | 8/2017 | Campanella et al. | |
| 2017/0216892 A1 | 8/2017 | Campanella et al. | |
| 2017/0216893 A1 | 8/2017 | Campanella et al. | |
| 2017/0218730 A1 | 8/2017 | Campanella et al. | |
| 2017/0218731 A1* | 8/2017 | Campanella | E21B 43/00 |
| 2017/0218732 A1 | 8/2017 | Campanella et al. | |
| 2017/0254196 A1 | 9/2017 | Campanella et al. | |
| 2017/0254787 A1 | 9/2017 | Campanella et al. | |
| 2018/0003572 A1 | 1/2018 | Garsd et al. | |
| 2018/0003684 A1 | 1/2018 | Kerr | |
| 2018/0024202 A1 | 1/2018 | Erickson et al. | |
| 2018/0154408 A1 | 6/2018 | Ko et al. | |
| 2018/0164137 A1 | 6/2018 | Layher et al. | |
| 2018/0171604 A1 | 6/2018 | Kim et al. | |
| 2018/0209248 A1* | 7/2018 | Patel | E21B 34/06 |
| 2018/0304323 A1 | 10/2018 | Campanella et al. | |
| 2019/0069245 A1 | 2/2019 | Miller et al. | |
| 2019/0277119 A1 | 9/2019 | Campion | |
| 2019/0277821 A1 | 9/2019 | Quigley et al. | |
| 2020/0086365 A1 | 3/2020 | Campanella et al. | |
| 2020/0101504 A1 | 4/2020 | Quigley et al. | |
| 2020/0101505 A1 | 4/2020 | Quigley et al. | |
| 2020/0130033 A1 | 4/2020 | Campanella et al. | |
| 2020/0197990 A1 | 6/2020 | Quigley et al. | |
| 2020/0254497 A1 | 8/2020 | Campanella et al. | |
| 2020/0306806 A1 | 10/2020 | Quigley et al. | |
| 2021/0046524 A1 | 2/2021 | Quigley et al. | |
| 2021/0178436 A1 | 6/2021 | Quigley et al. | |
| 2021/0229142 A1 | 7/2021 | Quigley et al. | |

FOREIGN PATENT DOCUMENTS

| | | |
|---|---|---|
| WO | WO 2016/010985 A1 | 1/2016 |
| WO | WO 2018/194650 A1 | 10/2018 |

OTHER PUBLICATIONS

International Search Report and Written Opinion for International Application No. PCT/US2017/020196 dated Jun. 7, 2017.

International Search Report and Written Opinion for International Application No. PCT/US17/28818 dated Sep. 8, 2017.

International Search Report and Written Opinion for International Application No. PCT/US2019/020251 dated May 31, 2019.

(56) References Cited

OTHER PUBLICATIONS

International Search Report and Written Opinion for International Application No. PCT/US2019/054013 dated Dec. 4, 2019.
Invitation to Pay Additional Fees for International Application No. PCT/US17/28818 dated Jul. 10, 2017.
[No Author Listed], 50% CH4, 35% CO2, 15% N2. Instrument Depot. 2015. http://www.instrumentdepot.com/50-methane-35-carbon-dioxide-15-nitrogen-c-1_27_472.html [last accessed Sep. 25, 2015].
[No Author Listed], Cloud-Based Wellwatcher Analytics Platform Offers 24/7/365 Visibility on Landfill Gas-Collection Systems. Tech Note. Loci Controls. Nov. 2016. 1 page.
[No Author Listed], Increase Landfill Gas Collection By Up To 30%. Tech Note. Loci Controls. Oct. 2016. 1 page.
[No Author Listed], Loci Controller Combines Active Flow Control With 24/7/365 Real-Time Gas-Composition Analysis to Maximize Landfill Gas Extraction. Tech Note. Loci Controls. Nov. 2016. 1 page.
[No Author Listed], Loci Sentry Utilizes Passive Flow and Gas-Composition Monitoring in Conjunction With Loci Controller and Wellwatcher Analytics to Maximize Landfill Gas Collection. Tech Note. Loci Controls. Nov. 2016. 1 page.
[No Author Listed], Methacontrol® Optimizing landfill gas recovery. Oct. 9, 2013. http://www.veolia.com/en/veolia-group/media/news/methacontrol-r. 1 page.
Bieker et al., Real-Time Production Optimization of Offshore Oil and Gas Production Systems: A Technology Survey. SPE International. 2006. 8 pages.
Collins et al., Web-based monitoring of year-length deployments of autonomous gas sensing platforms on landfill sites. 2011 IEEE Sensors Proceedings. 2011:1620-3.
Fay et al., Remote Real-Time Monitoring of Subsurface Landfill Gas Migration. Sensors. 2011;11(7):6603-29.
Xu et al., Impact of changes in barometric pressure on landfill methane emission. AGU Publications. Jul. 10, 2014. 17 pages.
U.S. Appl. No. 17/152,252, Quigley et al., filed Jan. 19, 2021.
U.S. Appl. No. 17/167,539, Quigley et al., filed Feb. 4, 2021.
U.S. Appl. No. 17/343,317, Campanella et al., filed Jun. 9, 2021.
U.S. Appl. No. 17/369,395, Campanella et al., filed Jul. 7, 2021.
U.S. Appl. No. 17/369,318, Campanella et al., filed Jul. 7, 2021.
International Search Report and Written Opinion for International Application No. PCT/US2021/013850 dated Jun. 21, 2021.
Extended European Search Report for European Application No. 17906368.0 dated Oct. 15, 2020.
U.S. Appl. No. 14/532,807, Campanella et al., filed Nov. 4, 2014.
U.S. Appl. No. 15/456,936, Campanella et al., filed Mar. 13, 2017.
U.S. Appl. No. 15/456,982, Campanella et al., filed Mar. 13, 2017.
U.S. Appl. No. 15/464,236, Campanella et al., filed Mar. 20, 2017.
U.S. Appl. No. 15/478,583, Campanella et al., filed Apr. 4, 2017.
U.S. Appl. No. 15/493,174, Campanella et al., filed Apr. 21, 2017.
U.S. Appl. No. 15/493,184, Campanella et al., filed Apr. 21, 2017.
U.S. Appl. No. 15/493,201, Campanella et al., filed Apr. 21, 2017.
U.S. Appl. No. 16/024,085, Campanella et al., filed Jun. 29, 2018.
U.S. Appl. No. 16/290,387, Quigley et al., filed Mar. 2, 2019.
U.S. Appl. No. 16/589,372, Quigley et al., filed Oct. 1, 2019.
U.S. Appl. No. 16/589,391, Quigley et al., filed Oct. 1, 2019.
U.S. Appl. No. 16/694,745, Campanella et al., filed Nov. 25, 2019.
U.S. Appl. No. 16/726,232, Campanella et al., filed Dec. 23, 2019.
U.S. Appl. No. 16/745,892, Campanella et al., filed Jan. 17, 2020.
U.S. Appl. No. 16/831,131, Campanella et al., filed Mar. 26, 2020.
U.S. Appl. No. 16/901,405, Quigley et al., filed Jun. 15, 2020.
U.S. Appl. No. 16/927,471, Quigley et al., filed Jul. 13, 2020.
U.S. Appl. No. 16/927,479, Quigley et al., filed Jul. 13, 2020.
U.S. Appl. No. 16/927,482, Quigley et al., filed Jul. 13, 2020.
U.S. Appl. No. 16/927,488, Quigley et al., filed Jul. 13, 2020.
U.S. Appl. No. 17/086,987, Quigley et al., filed Nov. 2, 2020.

* cited by examiner

LANDFILL GAS EXTRACTION SYSTEMS AND METHODS

CROSS-REFERENCE TO RELATED APPLICATIONS

This patent application is a continuation and claims priority under 35 U.S.C. § 120 to U.S. Patent Application Ser. No. 16/589,372, titled LANDFILL GAS EXTRACTION SYSTEMS AND METHODS, filed Oct. 1, 2019, attorney docket number L0789.70009US02, which claims the benefit of priority under 35 U.S.C. § 119 (e) to U.S. provisional patent application No. 62/739,612, titled "FIELD LEVEL CONTROL OF LANDFILL GAS EXTRACTION", filed on Oct. 1, 2018, attorney docket number L0789.70009US00, and U.S. provisional patent application No. 62/793,304, titled "PRESSURE CONTROL IN LANDFILL GAS EXTRACTION SYSTEMS", filed on Jan. 16, 2019, attorney docket number L0789.70009US01, each of which is incorporated by reference herein in its entirety.

FEDERALLY SPONSORED RESEARCH

This invention was made with government support under SBIR Phase II Award No. 1632439 and SBIR Phase 1B Award No. 1520346, awarded by the National Science Foundation. The government has certain rights in the invention.

BACKGROUND

Landfills typically produce landfill gas as a result of decomposition processes occurring in the waste, and methane is often a component of this landfill gas. In order to reduce emissions of methane and other contaminants in landfill gas, the landfill sites are typically capped with a layer of cover material and gas extraction systems are installed to pull landfill gas out before it can penetrate the cover layer and escape. At larger sites, these gas extraction systems can consist of a plurality of vertical and horizontal wells drilled into the landfill, which are connected with piping to one or more vacuum sources. The cover layer prevents gas from freely escaping, while the vacuum in the extraction wells pulls landfill gas into the collection system. A conventional landfill gas extraction well typically has a manual valve that adjusts the localized vacuum pressure in that well, as well as a set of ports for sampling the gas characteristics with a portable gas analyzer. Landfill gas is most often disposed of in a flare, processed for direct use, or used to power electricity generation equipment (such as generators or gas turbines).

SUMMARY

Some embodiments are directed to a control system for controlling extraction of landfill gas from a landfill via a gas extraction system, the gas extraction system comprising well piping for coupling a plurality of wells to a gas output, the control system comprising a controller configured to: obtain a value indicating measured energy content of landfill gas collected at the gas output from the plurality of wells; determine whether the measured energy content is different from a target energy content; and in response to determining that the measured energy content is different from the target energy content control a plurality of valves disposed in the well piping to change flow rates of landfill gas being extracted from at least some of the plurality of wells at least in part by changing degrees to which the plurality of valves are open.

In some embodiments, controlling the plurality of valves disposed in the well piping comprises: determining a value of a control adjustment; and transmitting the value of the control adjustment to a plurality of controllers, each of at least some of the plurality of controllers configured to control a respective one of the plurality of valves.

In some embodiments, the gas output comprises a power plant and the controller is further configured to obtain the value indicating the measured energy content of landfill gas from the power plant.

In some embodiments, the controller comprises a PID controller configured to receive, as input, a difference between the measured energy content and the target energy content.

In some embodiments, the controller is further configured to: determine that the target energy content is greater than the measured energy content; and in response to determining that the target energy content is greater than the measured energy content, controlling the plurality of valves to decrease the flow rates of landfill gas through the at least some of the plurality of wells.

In some embodiments, the controller is further configured to concurrently control the plurality of valves.

In some embodiments, the gas output comprises a processing plant configured to treat landfill gas collected at the gas output.

Some embodiments are directed to a control system for controlling extraction of landfill gas from a landfill via a gas extraction system, the gas extraction system comprising well piping for coupling a plurality of wells to a gas output, the control system comprising: a controller configured to: obtain a value indicating measured energy content of landfill gas collected at the gas output from the plurality of wells; determine whether the measured energy content is within a target range of energy content; and in response to determining that the measured energy content is not within the target range of energy content: control a plurality of valves disposed in the well piping to change flow rates of landfill gas being extracted from at least some of the plurality of wells at least in part by changing degrees to which the plurality of valves are open.

In some embodiments, controlling the plurality of wells comprises: determining a control adjustment; and transmitting the control adjustment to a plurality of controllers, each of at least some of the plurality of controllers configured to control a respective one of the plurality of valves.

In some embodiments, the controller is further configured to: set the control adjustment to a first value in response to determining that the measured energy content is less than a first threshold content; and set the control adjustment to a second value different from the first value in response to determining that the measured energy content is greater than a second threshold content.

In some embodiments, controlling the flow rates of landfill gas from being extracted from the at least some wells comprises: identifying a subset of the at least some wells; and adjusting flow rates of landfill gas being extracted from the subset of wells.

In some embodiments, the controller is further configured to identify the subset of the at least some wells based on a concentrations of methane in landfill gas being extracted from the at least some wells.

Some embodiments are directed to a system for controlling extraction of landfill gas from a landfill via a gas extraction system, the gas extraction system comprising a vacuum source, well piping, and a well coupled to the vacuum source through the well piping, the system comprising: at least one flow control mechanism disposed in the well piping and configured to control flow rate of landfill gas through the gas extraction system; and a controller configured to: determine one or more control variables using one or more measurements selected from the group consisting of a change in pressure of the vacuum source, a change in barometric pressure outside of the landfill, a change in ambient temperature outside of the landfill and a quality of aggregated landfill gas received at a gas output; control the at least one flow control mechanism based at least on the one or more control variables.

In some embodiments, the at least one control mechanism comprises a valve, and controlling the at least one flow control mechanism comprises providing a command to an actuator to cause the actuator to adjust a position of the valve.

In some embodiments, the one or more control variables comprise a plurality of control variables and controlling the at least one flow control mechanism comprises: combining the plurality of control variables to obtain an adjustment to the at least one flow control mechanism; and applying the adjustment to the at least one flow control mechanism.

In some embodiments, the controller is configured to obtain the adjustment to the at least one flow control mechanism at least in part by: applying a respective gain parameter to each of at least some of the plurality of control variables to obtain a plurality of adjustments; and combining the plurality of adjustments to obtain the adjustment to the at least one flow control mechanism.

In some embodiments, the controller is further configured to control the at least one flow control mechanism to decrease the flow rate of landfill gas through the gas extraction system in response to determining an increase in barometric pressure over a period of time.

In some embodiments, the controller is configured to control the at least one flow control mechanism to decrease the flow rate of landfill gas through the gas extraction system in response to determining a decrease in temperature over a period of time.

In some embodiments, the controller is configured to control the at least one flow control mechanism to decrease the flow rate of landfill gas through the gas extraction system in response to determining an increase in vacuum pressure.

In some embodiments, the controller is configured to control the at least one flow control mechanism to change the flow rate of landfill gas through the gas extraction system in response to determining a change in barometric pressure, a change in temperature, and/or a change in vacuum pressure.

Some embodiments provide for a control system for controlling extraction of landfill gas from a landfill via a gas extraction system, the gas extraction system comprising well piping for coupling a well to a gas output, the control system comprising: a valve for controlling flow of landfill gas through the well piping to the gas output; a pressure sensor configured to measure landfill gas pressure in the well piping at a location upstream of the valve; and a controller configured to: obtain, using the pressure sensor, a first measurement of the landfill gas pressure at the location upstream of the valve; determine whether the first measurement of the landfill gas pressure at the location upstream of the valve is greater than a first threshold pressure; and in response to determining that the first measurement of the landfill gas pressure at the location upstream of the valve is greater than the first threshold pressure, control the valve to reduce the landfill gas pressure at the location upstream of the valve.

In some embodiments, the controller is configured to control the valve to reduce the landfill gas pressure in the well piping at the location upstream of the valve by increasing a degree to which the valve is open.

In some embodiments, the controller is configured to control the valve to reduce the landfill gas pressure in the well piping at the location upstream of the valve by: obtaining a second measurement of landfill gas pressure in the well piping at a location downstream of the valve; determining whether the second measurement of the landfill gas pressure at the location downstream of the valve is less than a second threshold pressure; and increasing the degree to which the valve is open only in response to determining that the second measurement of the landfill gas pressure at the location downstream of the valve is less than the second threshold pressure.

In some embodiments, the controller is configured to control the valve to reduce the landfill gas pressure at the location upstream of the valve by maintaining a position of the valve in response to determining that the second measurement of the landfill gas pressure at the location downstream of the valve is greater than the second threshold pressure.

In some embodiments, the second threshold pressure is approximately 0 mbar. In some embodiments, the first threshold pressure is approximately −0.1 mbar.

In some embodiments, the controller is configured to control the valve to reduce the landfill gas pressure in the well piping at the location upstream of the valve by: increasing a degree to which the valve is open by a first amount; and after increasing the degree to which the valve is open by the first amount: obtaining, from the pressure sensor, a second measurement of the landfill gas pressure at the location upstream of the valve; and in response to determining that the second measurement of the landfill gas pressure at the location upstream of the valve is greater than the first threshold pressure, increasing the degree to which the valve is open by the first amount.

In some embodiments, the controller is configured to: in response to determining that the first measurement of the landfill gas pressure at the location upstream of the valve is greater than the first threshold pressure: store a record of the first measurement of the landfill gas pressure at the location upstream of the valve; store a record of controlling the valve to reduce the landfill gas pressure at the location upstream of the valve; and store a record of a second measurement of the landfill gas pressure at the location upstream of the valve after controlling the valve to reduce the landfill gas pressure at the location upstream of the valve.

In some embodiments, the controller is configured to store the record of the second measurement of the landfill gas pressure at the location upstream of the valve when it is determined that the second measurement is less than the first threshold pressure.

In some embodiments, the control system of claim 1, wherein the controller is configured to control the valve to reduce the landfill gas pressure at the location upstream of the valve by: implementing one or more adjustments in position of the valve determined by the controller for reducing the landfill gas pressure at the location upstream of the valve; and not implementing one or more other adjustments in the position of the valve determined by the controller.

In some embodiments, the controller is configured to: in response to determining that the first measurement of the landfill gas pressure at the location upstream of the valve is less than or equal to the first threshold pressure, control the valve by maintaining a position of the valve.

Some embodiments provide for a method of controlling extraction of landfill gas from a landfill via a gas extraction system, the method comprising: obtaining, from a pressure sensor, a first measurement of landfill gas pressure at a location upstream of a valve in well piping of the gas extraction system, the valve being for controlling flow of landfill gas through the well piping from the landfill to a gas output; determining whether the first measurement of the landfill gas pressure at the location upstream of the valve is greater than a first threshold pressure; and in response to determining that the first measurement of the landfill gas pressure at the location upstream of the valve is greater than the first threshold pressure, controlling the valve to reduce the landfill gas pressure at the location upstream of the valve.

In some embodiments, the method further comprises controlling the valve to reduce the landfill gas pressure in the well piping at the location upstream of the valve by increasing a degree to which the valve is open.

In some embodiments, the method further comprises controlling the valve to reduce the landfill gas pressure in the well piping at the location upstream of the valve by: obtaining a second measurement of landfill gas pressure in the well piping at a location downstream of the valve; determining whether the second measurement of the landfill gas pressure at the location downstream of the valve is less than a second threshold pressure; and increasing the degree to which the valve is open only in response to determining that the second measurement of the landfill gas pressure at the location downstream of the valve is less than the second threshold pressure.

In some embodiments, the method further comprises controlling the valve to reduce the landfill gas pressure at the location upstream of the valve by maintaining a position of the valve in response to determining that the second measurement of the landfill gas pressure at the location downstream of the valve is greater than the second threshold pressure.

In some embodiments, the second threshold pressure is approximately 0 mbar. In some embodiments, the first threshold pressure is approximately −0.1 mbar.

In some embodiments, the method further comprises controlling the valve to reduce the landfill gas pressure in the well piping at the location upstream of the valve by: increasing a degree to which the valve is open by a first amount; and after increasing the degree to which the valve is open by the first amount: obtaining, from the pressure sensor, a second measurement of the landfill gas pressure at the location upstream of the valve; and in response to determining that the second measurement of the landfill gas pressure at the location upstream of the valve is greater than the first threshold pressure, increasing the degree to which the valve is open by the first amount.

In some embodiments, the method further comprises: in response to determining that the first measurement of the landfill gas pressure at the location upstream of the valve is greater than the first threshold pressure: storing a record of the first measurement of landfill gas pressure at the location upstream of the valve; storing a record of controlling the valve to reduce the landfill gas pressure at the location upstream of the valve; and storing a record of a second measurement of the landfill gas pressure at the location upstream of the valve after controlling the valve to reduce the landfill gas pressure at the location upstream of the valve.

In some embodiments, the method further comprises storing the record of the second measurement of the landfill gas pressure at the location upstream of the valve when it is determined that the second measurement is less than the first threshold pressure.

In some embodiments the method further comprises controlling the valve to reduce the landfill gas pressure at the location upstream of the valve by: implementing one or more adjustments in position of the valve determined by the controller for reducing the landfill gas pressure at the location upstream of the valve; and not implementing one or more other adjustments in the position of the valve determined by the controller.

In some embodiments, the method further comprises in response to determining that the first measurement of the landfill gas pressure at the location upstream of the valve is less than or equal to the first threshold pressure, controlling the valve by maintaining a position of the valve.

Some embodiments provide for a control system for controlling extraction of landfill gas from a landfill via a gas extraction system, the gas extraction system comprising well piping for coupling a well to a gas output, the control system comprising: a controller configured to: obtain a first measurement of landfill gas pressure at a location upstream of a valve disposed in the well piping, the valve being for controlling flow of landfill gas through the well piping to the gas output; determine whether the first measurement of the landfill gas pressure at the location upstream of the valve is greater than a first threshold pressure; and in response to determining that the first measurement of the landfill gas pressure at the location upstream of the valve is greater than the first threshold pressure, control the valve to reduce the landfill gas pressure at the location upstream of the valve.

BRIEF DESCRIPTION OF THE DRAWINGS

Various aspects and embodiments will be described with reference to the following figures. It should be appreciated that the figures are not necessarily drawn to scale. For purposes of clarity, not every component may be labeled in every drawing. In the drawings.

DETAILED DESCRIPTION

Figure 1:
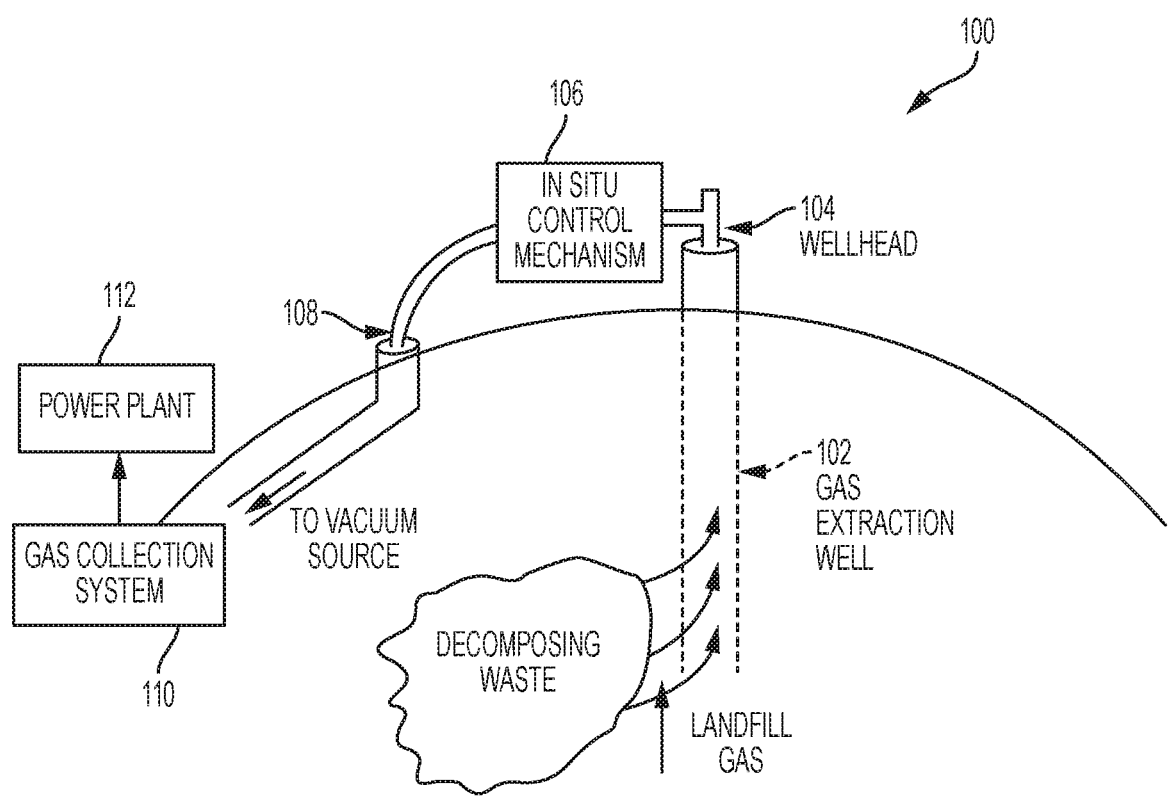
FIG. 1 is a sketch illustrating a landfill gas extraction system, according to some embodiments.

Conventional techniques for controlling extraction of landfill gas are sometimes imprecise and inefficient. When such techniques are used, the gas extracted from a landfill may not have the desired properties (e.g., the energy content of the extracted gas may be lower than a desired energy content, the composition of the extracted gas may differ from a desired composition, etc.). In some cases, conventional techniques may even be counter-productive (e.g., such techniques may destroy some or all of the bacteria that convert decomposing waste into methane, thereby reducing the energy content of the landfill gas, or may result in emission of high levels of methane into the atmosphere, or worse yet, cause fires to break out deep within the landfill that are near impossible to extinguish).

The inventors have recognized and appreciated that controlling extraction of landfill gas based on a predictive model of the landfill may overcome at least some of the deficiencies of conventional landfill gas extraction techniques and result in an overall improvement in landfill management. For example, controlling extraction of landfill gas based on a predictive model of the landfill may increase precision and/or efficiency of the gas extraction process, thereby facilitating extraction of landfill gas having desired properties. As another example, controlling extraction of landfill gas based on a predictive model of the landfill may reduce the landfill's environmental impact (e.g., by reducing the amount of harmful and/or foul-smelling gas emitted into the atmosphere). In some embodiments, the performance of the gas extraction system may be enhanced by adjusting the system's control settings in real time or at frequent intervals (e.g., hourly or daily). In some embodiments, the performance of the gas extraction system may be enhanced by training the predictive model based on differences between the landfill state predicted by the model and the landfill state actually observed. In some embodiments, the performance of the gas extraction system may be enhanced by modeling interactions between/among two or more wells. The inventors have recognized that adjustments in one well may lead to changes in the conditions of surrounding wells. Modeling interactions among two or more wells and the use of predictive modeling as described herein allows for automated control among multiple wells.

As described above, conventional techniques for controlling extraction of landfill gas may result in extraction of landfill gas having a composition that is different from a target composition. Accordingly, the inventors have developed techniques for controlling extraction of landfill gas such that the concentration of each of one or more constituent gases is in a respective target range. For example, some of the techniques described herein may be used to control extraction of landfill gas so that the concentration of methane in the landfill gas being extracted is within a target range (e.g., within 45-55% by volume).

In some embodiments, an iterative control technique may be used to control extraction of landfill gas such that the concentration of a particular gas (e.g., methane, oxygen, nitrogen, etc.) falls within a target range such that the concentration is above a first threshold concentration and below a second threshold concentration. The first and second threshold concentrations may define the target range, with the second threshold concentration being greater than (or equal to, in some embodiments) the first threshold concentration.

Accordingly, in some embodiments, a control system for controlling extraction of landfill gas may include: (A) at least one sensor configured to measure one or more characteristics of landfill gas extracted from the landfill; (B) at least one flow control mechanism disposed in well piping and configured to control flow of the landfill gas through the well piping; and (C) at least one processor configured to: (1) obtain a measured concentration, obtained using the at least one sensor, of a first gas in landfill gas extracted from the landfill; (2) determine whether the measured concentration of the first gas is either less than a first threshold concentration or greater than a second threshold concentration (e.g., whether a measured concentration of methane is less than 45% by volume or greater than 55% by volume); (3) when it is determined that the measured concentration is less than the first threshold concentration, control the at least one flow control mechanism to reduce (e.g., when the first gas is methane) or increase (e.g., when the first gas is oxygen or nitrogen) the flow rate of landfill gas through the at least one flow control mechanism; and (4) when it is determined that the concentration is greater than the second threshold concentration, control the at least one flow control mechanism to increase (e.g., when the first gas is methane) or to decrease (e.g., when the first gas is oxygen or nitrogen) the flow rate of landfill gas through the at least one flow control mechanism.

In some embodiments, when it is determined that the measured concentration is less than the first threshold concentration, the at least one processor is further configured to: after controlling the at least one flow control mechanism to reduce the flow rate of the landfill gas through the at least one flow control mechanism, (1) obtain a second measured concentration of the first gas in landfill gas extracted from the landfill; (2) determine whether the second measured concentration of the first gas is less than the first threshold concentration; and (3) when it is determined that the second measured concentration of the first gas is less than the first threshold concentration, control the at least one flow control mechanism to further reduce the flow rate of landfill gas through the at least one flow control mechanism.

Similarly, in some embodiments, when it is determined that the measured concentration is greater than the second threshold concentration, the at least one processor is further configured to: after controlling the at least one flow control mechanism to increase the flow rate of the landfill gas through the at least one flow control mechanism, (1) obtain a second measured concentration of the first gas in landfill gas extracted from the landfill; (2) determine whether the second measured concentration of the first gas is greater than the second threshold concentration; and (3) when it is determined that the second measured concentration of the first gas is greater than the second threshold concentration, control the at least one flow control mechanism to further increase the flow rate of landfill gas through the at least one flow control mechanism.

In some embodiments, the at least one flow control mechanism may include one or more valves. Examples of different types of valves are provided herein. In some embodiments, the at least one processor may be configured to control the at least one flow control mechanism to increase the flow rate of landfill gas at least in part by causing one or more valve(s) to open to a greater degree (e.g., to open by a specified increment or in any other suitable way). The at least one processor may be configured to control the at least one flow control mechanism to decrease the flow rate of landfill gas at least in part by causing one or more valves to close to a greater degree.

In some embodiments, the sensor(s) configured to measure landfill gas characteristics may include sensor(s) configured to measure partial pressure and/or concentrations of gases including, but not limited to, methane, oxygen, carbon dioxide, carbon monoxide, hydrogen sulfide, and nitrogen. Examples of such sensors are provided herein. In some embodiments, the sensor(s) may be co-located with the at least one flow control mechanism. For example, the sensor(s) and the flow control mechanism (e.g., a valve) may be part of an in situ control mechanism (e.g., in situ control mechanism 200 described with reference to FIG. 2).

In some embodiments, the at least one processor may be located remotely from the at least one flow control mechanism and may be configured to communicate with the at least one flow control mechanism using one or more wireless links, one or more wired links, or any suitable combination thereof.

Also as described above, conventional techniques for controlling extraction of landfill gas may result in extraction of landfill gas having energy content lower than a targeted energy content. Accordingly, the inventors have developed techniques for controlling extraction of landfill gas such that the energy content in the extracted gas is maximized or at least higher than the energy content would otherwise be with the application of conventional methods. The inventors appreciated that the product of the flow rate of extracted landfill gas and the concentration of methane in the extracted landfill gas, which may indicate the rate of methane extraction, provides a good estimate of the energy content in the extracted landfill gas, as methane is a major source of energy extracted from landfills (e.g., energy may be generated by burning methane). Accordingly, some of the techniques developed by the inventors seek to achieve as high a product of methane concentration and flow rate as possible. In some embodiments, the techniques involve iteratively adjusting the flow rate of extracted landfill gas, based on flow rate and methane concentration measurements, so as to maximize the product of methane concentration and extracted landfill gas flow rate.

Accordingly, in some embodiments, a control system for controlling extraction of landfill gas may include: (A) at least one sensor configured to measure one or more characteristics of landfill gas extracted from the landfill; (B) at least one flow control mechanism disposed in well piping and configured to control flow of the landfill gas through the well piping; and (C) at least one processor configured to perform: (1) obtaining, based on at least one first measurement obtained using the at least one sensor, a first measure of energy content in a first portion of extracted landfill gas; (2) controlling the at least one flow control mechanism to increase a flow rate of landfill gas being extracted from the landfill; (3) after the controlling, (a) obtaining, based on at least one second measurement obtained using the at least one sensor, a second measure of energy content in a second portion of extracted landfill gas; determining whether the second measure of energy content is greater than the first measure of energy content; (b) when it is determined that the second measure of energy content is greater than the first measure of energy content, controlling the at least one flow control mechanism to increase the flow rate of landfill gas being extracted from the landfill; and (c) when it is determined that the second measure of energy content is less than the first measure of energy content, controlling the at least one flow control mechanism to decrease the flow rate of landfill gas being extracted from the landfill.

In some embodiments, obtaining the first measure of energy content comprises: obtaining a measurement of a first concentration of methane in the first portion of extracted landfill gas and a measurement of a first flow rate of landfill gas through the at least one flow control mechanism; and determining the first measure of energy content based on the first concentration of methane and the first flow rate of landfill gas. In some embodiments, obtaining the second measure of energy content comprises: obtaining a measurement of a second concentration of methane in the second portion of extracted landfill gas and a second flow rate of landfill gas through the at least one flow control mechanism; and determining the second measure of energy content based on the second concentration of methane and the second flow rate of landfill gas.

In some embodiments, the techniques for controlling the extraction of landfill gas may seek to maximize energy content in the landfill gas subject to one or more constraints on the concentration(s) of one or more other gases. For example, in some embodiments, the techniques for controlling landfill gas extraction may seek to maximize energy content in the landfill gas (or satisfy any other objective described herein) subject to an upper limit (e.g., 2.5%) on the concentration of nitrogen in the extracted gas. The concentration of nitrogen may be measured directly (e.g., using one or more sensors) or indirectly (e.g., by measuring concentrations of methane, oxygen, and carbon dioxide and estimating the concentration of nitrogen as the remaining balance gas, for example, by estimating the concentration of nitrogen as 100%-concentration of methane—concentration of oxygen—concentration of methane). Limits on concentration of nitrogen may be imposed by landfill operators, operators of associated power generation facilities, local regulations, state regulations, and/or federal regulations.

Accordingly, in some embodiments, the at least one processor of the control system may be further configured to perform: (1) obtaining, from the at least one sensor, measured concentrations of methane, oxygen, and carbon dioxide in the first portion of extracted landfill gas; (2) determining a balance gas concentration based on the measured concentrations of methane, oxygen, and carbon dioxide; (3) controlling the at least one flow control mechanism to increase the flow rate of landfill gas being extracted from the landfill only when it is determined both that the second measure of energy content is greater than the first measure of energy content and the balance gas concentration is less than a balance gas threshold (e.g., 2.5% by volume); and (4) controlling the at least one flow control mechanism to decrease the flow rate of landfill gas being extracted from the landfill when it is determined that either the second measure of energy content is less than the first measure of energy content or the balance gas concentration is greater than the balance gas threshold.

As another example, in some embodiments, the techniques for controlling landfill gas extraction may seek to maximize energy content in the landfill gas (or satisfy any other objective described herein) subject to an upper limit (e.g., 5%) on the concentration of oxygen in the extracted gas. Limiting the amount of oxygen in the extracted landfill gas may be helpful because high amounts of oxygen may negatively influence how generators run, for example, by causing engine problems or contributing to fires deep within the landfill. Limits on the concentration of oxygen may be imposed by landfill operators, power utility operators, local regulations, state regulations, and/or federal regulations.

Accordingly, in some embodiments, the at least one processor of the control system may be further configured to perform: (1) obtaining, from the at least one sensor, a measured concentration of oxygen in the first portion of extracted landfill gas; (2) controlling the at least one flow control mechanism to increase the flow rate of landfill gas being extracted from the landfill only when it is determined both that the second measure of energy content is greater than the first measure of energy content and the measured concentration of oxygen is less than an oxygen threshold (e.g., 5% by volume); and (3) controlling the at least one flow control mechanism to decrease the flow rate of landfill gas being extracted from the landfill when it is determined that either the second measure of energy content is less than the first measure of energy content or the measured concentration of oxygen is greater than the oxygen threshold.

The inventors have also appreciated that changes in atmospheric pressure (e.g., due to weather changes) may cause changes in the composition of landfill gas. For example, the percentage of methane in landfill gas may increase during periods of declining atmospheric pressure and may decrease during periods of increasing atmospheric pressure. Accordingly, the inventors have developed techniques for controlling extraction of landfill gas based on atmospheric pressure measurements and changes among them. In some embodiments, the flow rate of landfill gas being extracted may be decreased in response to increasing atmospheric pressure and/or increased in response to decreasing atmospheric pressure.

Accordingly, in some embodiments, a control system for controlling extraction of landfill gas may include: (A) at least one atmospheric pressure sensor configured to measure atmospheric pressure; (B) at least one flow control mechanism disposed in well piping and configured to control flow of the landfill gas through the well piping; and (C) at least one processor configured to perform: (1) obtaining a first atmospheric pressure value based on at least one first measurement obtained by the at least one atmospheric pressure sensor; (2) obtaining a second atmospheric pressure value based on at least one second measurement obtained by the at least one atmospheric pressure sensor after obtaining the at least one first measurement; (3) determining whether the second atmospheric pressure value is greater than the first atmospheric pressure value; (4) when it is determined that the second atmospheric pressure value is greater than the first atmospheric pressure value, controlling the at least one flow control mechanism to decrease the flow rate of landfill gas being extracted from the landfill; and (5) when it is determined that the second atmospheric pressure value is less than the first atmospheric pressure value, controlling the at least one flow control mechanism to increase the flow rate of landfill gas being extracted from the landfill.

In some embodiments, after controlling the at least one flow control mechanism to decrease the flow rate of landfill gas being extracted from the landfill, the control system may further perform: (1) obtaining a third atmospheric pressure value based on at least one third measurement obtained by the at least one atmospheric pressure sensor after obtaining the at least one second measurement; (2) determining whether the third atmospheric pressure value is greater than the second atmospheric pressure value; (3) when it is determined that the third atmospheric pressure value is greater than the second atmospheric pressure value, controlling the at least one flow control mechanism to further decrease the flow rate of landfill gas being extracted from the landfill; and (4) when it is determined that the third atmospheric pressure value is less than the second atmospheric pressure value, controlling the at least one flow control mechanism to increase the flow rate of landfill gas being extracted from the landfill.

In some embodiments, the control system may be configured to change the flow rate of landfill gas being extracted by an amount determined based on the magnitude of change in the atmospheric pressure. For example, in response to a small relative change in atmospheric pressure, the control system may effect a small change in a valve of other flow control mechanism. By contrast, a valve or other flow control mechanism may be adjusted by a larger amount in response to a greater change in atmospheric pressure.

The aspects and embodiments described above, as well as additional aspects and embodiments, are described further below. These aspects and/or embodiments may be used individually, all together, or in any combination, as the application is not limited in this respect.

Figure 5:
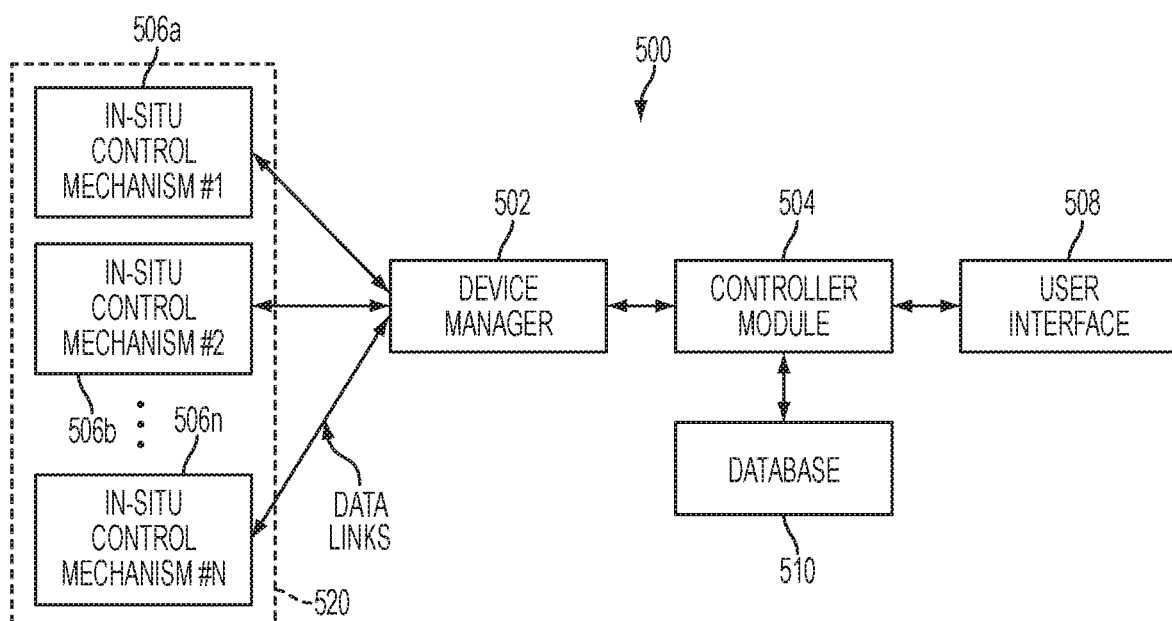
FIG. 5 is a block diagram illustrating an example of a control system for controlling landfill gas extraction, according to some embodiments.

This disclosure describes devices and techniques for controlling landfill gas extraction. FIG. 1 illustrates a landfill gas extraction system 100, according to some embodiments. In some embodiments, a landfill gas extraction system may include one or more gas extraction wells 102 coupled to one or more wellheads 104. In some embodiments, each wellhead may be in fluid communication with a single, corresponding well. In some embodiments, the landfill gas extraction system 100 may include a gas extraction piping system 108 coupling the well(s) 102 to a gas collection system 110, and one or more In Situ Control Mechanisms 106 for controlling extraction of the landfill gas through the well(s) 102 and gas extraction piping system 108 to the gas collection system 110. In some embodiments, gas collection system 110 may supply the extracted landfill gas to a gas-to-energy power plant 112, which may convert the landfill gas into electrical power (e.g., by burning the landfill gas to turn the rotor of a generator or turbine). In some embodiments, the In Situ Control Mechanism(s) 106 may operate (e.g., individually, in concert with each other, and/or under the control of a controller) to improve gas extraction efficiency and/or to control the extraction process for a variety of desired outcomes including the delivery of the extracted gas into a natural gas pipeline system. In some embodiments the controller may be located remote from the In Situ Control Mechanisms. (Such a remotely located controller is not shown in FIG. 1, but is shown in FIG. 5 and discussed below.)

It should be appreciated that an In Situ Control Mechanism, as described herein, may control one or more parameters associated with a well, but is not a requirement that all other In Situ Control Mechanism be physically located at that well. The In Situ Control Mechanism(s) may be disposed at any suitable location(s). In some embodiments, each In Situ Control Mechanism may be coupled to a single, corresponding well. In some embodiments, an In Situ Control Mechanism may be coupled to one or more wells. In some embodiments, some or all of the gas extraction wells in a landfill gas extraction system may be outfitted with an In Situ Control Mechanism 106, as depicted in FIG. 1. In some embodiments, an In Situ Control Mechanism 106 may be positioned at or adjacent to one or more junction points in the gas extraction piping system 108 (header junctions, or leachate junctions, or others) to control the performance of an entire section of piping. In some embodiments, an In Situ Control Mechanism 106 may be positioned between the gas extraction well 102 and the gas collection system 110 such that gas coming from the well flows through the In Situ Control Mechanism 106 on its way to the rest of the collection system. The In Situ Control Mechanism 106 may be installed permanently in a suitable location (e.g., in, on, adjacent to, and/or near a well and/or gas extraction piping), or may be moved from location to location (e.g., well to well) over time.

Figure 2:
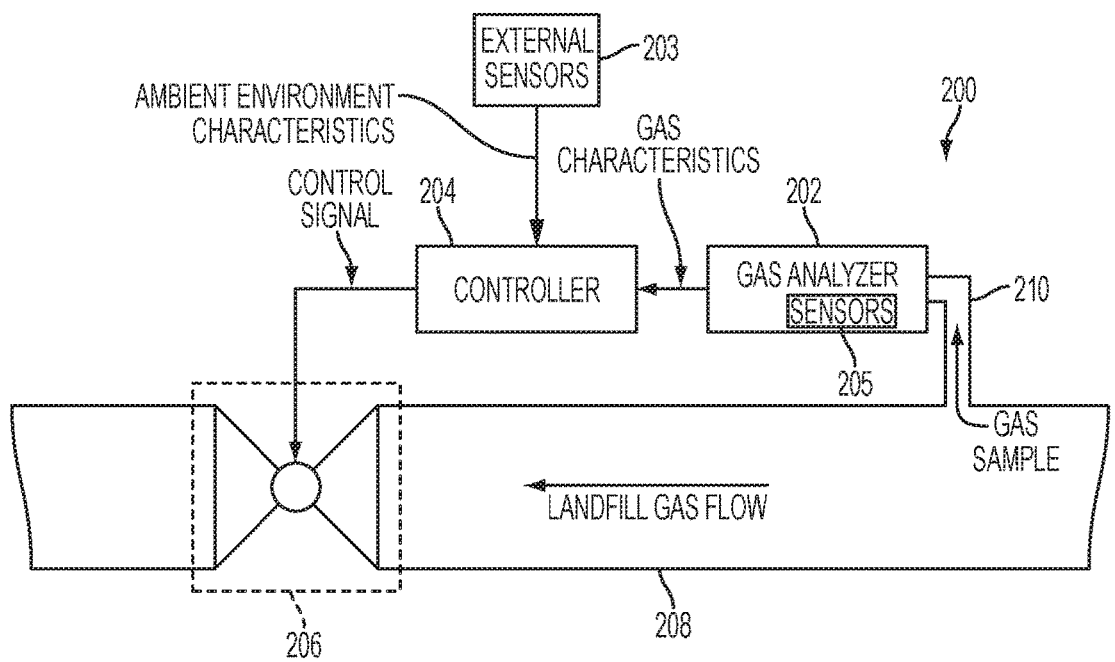
FIG. 2 is a block diagram illustrating an in situ control mechanism for landfill gas extraction, according to some embodiments.

A block diagram of some embodiments of an In Situ Control Mechanism 200 is presented in FIG. 2. In some embodiments, an In Situ Control Mechanism may include one or more mechanisms configured to control the flow of landfill gas from one or more wells to gas collection system 110 through gas extraction piping system 108. Any suitable flow-control mechanism 206 may be used, including, without limitation, a valve (e.g., a solenoid valve, latching solenoid valve, pinch valve, ball valve, butterfly valve, ceramic disc valve, check valves, choke valves, diaphragm valves, gate valves, globe valves, knife valves, needle valves, pinch valve, piston valve, plug valve, poppet valve, spool valve, thermal expansion valve, pressure reducing valve, sampling valve, safety valve) and/or any other suitable type of flow-control mechanism.

In some embodiments, an In Situ Control Mechanism may include one or more actuation devices configured to control operation of the one or more flow-control mechanisms (e.g., to open a flow-control mechanism, close a flow-control mechanism, and/or adjust a setting of a flow-control mechanism). In some embodiments, an In Situ Control Mechanism may include a controller 204 configured to determine the settings to be applied to the one or more flow-control mechanisms (e.g., via the actuation devices), and/or configured to apply the settings to the one or more flow-control mechanisms (e.g., via the actuation devices). In some embodiments, the settings to be applied to the one or more flow-control mechanisms (e.g., via the actuation devices) may be determined remotely and communicated to the In Situ Control Mechanism (e.g., by a remotely located controller) using any suitable communication technique, including, without limitation, wireless communication, wired communication, and/or power line communication.

In some embodiments, an In Situ Control Mechanism may include one or more sensor devices configured to sense one or more attributes associated with the landfill, including, without limitation, attributes of the landfill, attributes of the landfill gas, attributes of an area adjacent to the landfill, and/or attributes of the landfill's gas extraction system. In some embodiments, the In Situ Control Mechanism may include one or more actuation devices configured to control operation of the one or more sensor devices (e.g., to activate a sensor device, deactivate a sensor device, and/or collect data from the sensor device). In some embodiments, an In Situ Control Mechanism may include a controller 204 configured to determine the settings (e.g., control signals) to be applied to the one or more actuation and/or sensor devices, configured to apply the settings to the one or more actuation and/or sensor devices, and/or configured to collect data (e.g., measurements) obtained by the one or more sensor devices. In some embodiments, the settings to be applied to the one or more actuation and/or sensor devices may be determined remotely and communicated to the In Situ Control Mechanism (e.g., by a remotely located controller) using any suitable communication technique, including, without limitation, wireless communication, wired communication, and/or power line communication. In some embodiments, the In Situ Control Mechanism may communicate the one or more sensed attributes associated with the landfill (e.g., to a remotely located controller).

In some embodiments, the one or more sensor devices may include a Gas Analyzer 202. In some embodiments, a Gas Analyzer 202 may collect a sample of landfill gas from the gas extraction piping 208 through an input port 210, determine (e.g., compute, measure and/or sense) one or more characteristics of that gas, and/or report the one or more characteristics of the gas to a controller (e.g., local controller 204 and/or a remotely located controller). In some embodiments, the Gas Analyzer may determine the gas temperature, pressure, flow rate, humidity, energy content (e.g., energy density), gas composition (partial pressure or concentration of methane, oxygen, carbon dioxide, carbon monoxide, hydrogen sulfide, nitrogen and/or any other suitable gas) and/or any other characteristics of the landfill gas coming from the gas extraction well(s) upstream from the location where the In Situ Control Mechanism is installed.

Accordingly, in some embodiments, Gas Analyzer 202 may include sensors 205 configured to make such measurements. Sensors 205 may be of any suitable type. In some embodiments, sensors 205 may include a sensor configured to detect partial pressure and/or concentration of methane in landfill gas, a sensor configured to detect partial pressure and/or concentration of oxygen in landfill gas, a sensor configured to detect partial pressure and/or concentration of carbon dioxide in landfill gas, a sensor configured to detect partial pressure and/or concentration of carbon monoxide in landfill gas, a sensor configured to detect partial pressure and/or concentration of hydrogen sulfide in landfill gas, a sensor configured to detect partial pressure and/or concentration of nitrogen in landfill gas, and/or a sensor to detect partial pressure or concentration of any suitable gas in landfill gas.

In some embodiments, sensors 205 may include one or more non-dispersive infrared (NDIR) sensors, mid infrared optical sensors, catalytic beads, electrochemical sensors, pellistors, photoionization detectors, zirconium oxide sensors, thermal conductivity detectors, and/or any other sensing technology. Gas Analyzer 202 may be configured to measure flow rate by using one or more sensors 205 to determine a pressure differential across a venturi, orifice plate, or other restriction to the flow of gas; by pitot tube, mechanical flow meter, heated wire or thermal mass flow meter, and/or using any other suitable technique. Gas Analyzer 202 may be configured to measure temperature with a thermocouple, a negative or positive temperature coefficient resistor, capacitor, inductor, a semiconducting device, and/or using any other suitable technique.

In some embodiments, one or more external sensors 203 may be used to measure one or more characteristics of the ambient environment outside of Gas Analyzer 202 (e.g., outside of In Situ Control Mechanism 200). The external sensor(s) 203 may provide obtained measurements to In Situ Control Mechanism 200 (e.g., to control 1204) and/or to one or more computing devices located remotely from In Situ Control Mechanism 200 (e.g., by using a wireless link, a wired link, and/or any suitable combination of wireless and wired links). In some embodiments, external sensor(s) 203 may include one or more temperature sensors configured to measure temperature outside the control mechanism 200 (e.g., the ambient atmospheric temperature) and/or any other suitable location. In some embodiments, external sensor(s) 203 may include one or more atmospheric pressure sensor(s) configured to measure atmospheric pressure outside of the control mechanism 200 (e.g., ambient atmospheric pressure) and/or any other suitable location. In some embodiments, sensors 203 may be used to measure one or more characteristics of the ambient environment. Additionally or alternatively, in some embodiments, information about the characteristic(s) of the ambient environment may be obtained from an external data source (e.g., external forecast data, National Oceanic and Atmospheric Administration (NOAA) data for temperature and/or barometric pressure).

In some embodiments, the gas characteristics may be sampled once in each reading, or may be sampled many times and statistics about the distribution of values may be determined. The gas characteristics may be continuously determined, or they may be determined at discrete time intervals. In some embodiments, the Gas Analyzer may analyze gas in the main flow of landfill gas (e.g., within gas extraction piping 208). In some embodiments, the Gas Analyzer may draw a small sample of gas into a separate chamber for analysis. In some embodiments, certain parameters (for example flow rate, pressure, temperature, humidity, and the like) may be measured in the main gas stream (e.g., may be measured by sensors disposed directly within extraction gas piping), and others may be analyzed in a separate chamber.

In order to improve measurement accuracy, measurement resolution, measurement repeatability, sensor lifetime, and/or sensor reliability, a sample of gas from the well may be pre-treated before analysis, which pre-treatment may include heating, cooling, drying, and/or any other suitable pre-treatment processing (e.g., through forced condensation, passing through a desiccant, or any other suitable technique), filtered to remove particles, filtered to remove contaminants or other chemicals, pressurized, de-pressurized, and/or otherwise treated before being analyzed. After analyzing and reporting gas characteristics (e.g., to local controller 204 and/or to a remotely located controller), the Gas Analyzer may purge the gas sample from the chamber and vent it to the atmosphere, or return it to the main gas flow. In some embodiments, the analyzed gas sample may be purged prior to reporting the gas characteristics to a controller.

One embodiment of a Gas Analyzer 300 utilizing pre-treatment mechanisms as described above is illustrated in FIG. 3. In the Gas Analyzer 300 of FIG. 3 and other arrangements not explicitly described here, a small sample of landfill gas may be taken into the Gas Analyzer through input port 310 (e.g., from the main flow of landfill gas in gas extraction piping 308 between the gas extraction well and the gas collection system) and sent through a drying element 312 and a series of one or more flow-control mechanisms (e.g., valves) before entering the gas analysis sample chamber 302. In some embodiments, at the beginning and end of a gas measurement cycle, both valves 316 and 318 are in the closed state. Valve 316 may be opened and the pump 314 may be turned on in order to draw a sample of landfill gas through the drying element 312 and into the gas analysis sample chamber 302 for analysis. At the end of a measurement cycle, the pump 314 may be turned off and valve 316 may be closed to stop the flow of gas into the sample chamber 302. In some embodiments, the gas sample may be purged from sample chamber 302 by opening valve 318. Under typical operating conditions, the gas collection system and gas extraction well(s) may be at negative pressure (i.e., operating under vacuum conditions) relative to atmospheric pressure, such that opening valve 318 may pull ambient air through the Gas Analyzer 300 to purge the sample chamber 302 of landfill gas. In some embodiments, one or more valves of Gas Analyzer 300 may be toggled and a pump (e.g., pump 314) may be activated to force purge sample chamber 302 with ambient air. Forced purging may be beneficial when one or more wells upstream from Gas Analyzer 300 are operating under positive pressure relative to atmospheric pressure (e.g., because the gas extraction system's vacuum is off-line or because the one or more wells are under-extracted). For example, forced purging may be an effective technique for clearing condensate from the Gas Analyzer's tubes and/or for clearing sample gas from sample chamber 302 in cases where the upstream well(s) are operating under positive pressure. (Although not shown, one of ordinary skill in the art would understand that a valve may be placed between pump 314 and input port 310, and that sample chamber 302 may be force purged by closing this valve and by opening valves between pump 314 and atmospheric port 320.) After purging the gas sample from Gas Analyzer 300, valve 318 may be closed to stop atmospheric air from leaking into the gas collection system.

Figure 3:
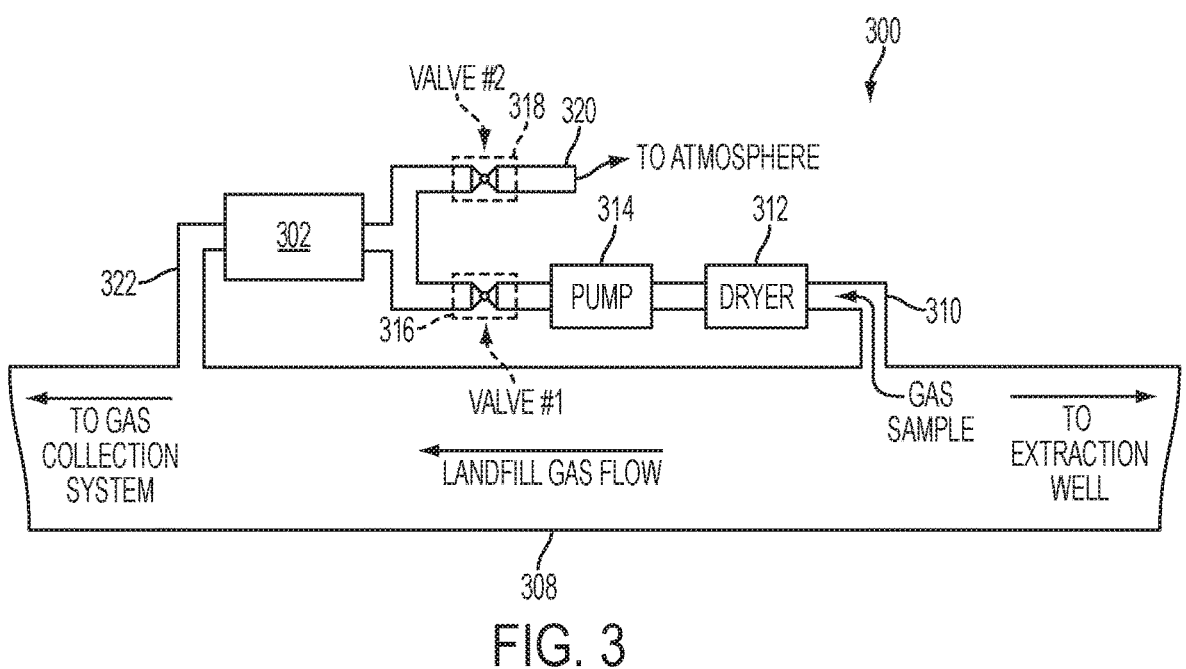
FIG. 3 is a block diagram illustrating a gas analyzer of an in situ control mechanism for landfill gas extraction, according to some embodiments.

Configurations that perform a similar function to the embodiment of FIG. 3 and which, while not described explicitly here, are within the scope of the present disclosure. For example, the pump 314 may be placed after valve 316, or after the gas analyzer sample chamber 302, or the drying element 312 may be moved to a different point in the flow path. Similarly, the functionality provided by valve 316 and the pump 315 may be consolidated by the use of a sealed pump design (e.g., a peristaltic pump). An additional valve may be added after the gas analyzer (e.g., in a port 322 coupling the sample chamber 302 to the gas extraction piping 308), for additional control or to prevent backflow into the sample chamber. Additionally, the Gas Analyzer may be outfitted with additional modules to provide other pre-treatment of the gas in addition to or in alternative to drying (for example, particle filtering, removal or deactivation of hydrogen sulfide or other chemicals, etc.).

In some embodiments, the flow-control mechanism(s) of Gas Analyzer 300 may include solenoid valves, latching solenoid valves, pinch valves, ball valves, butterfly valves, ceramic disc valves, check valves, choke valves, diaphragm valves, gate valves, globe valves, knife valves, needle valves, pinch valves, piston valves, plug valves, poppet valves, spool valves, thermal expansion valves, pressure reducing valves, sampling valves, safety valves, and/or any other type of flow-control mechanism.

In some embodiments, the Gas Analyzer may utilize non-dispersive infrared (NDIR) sensors, catalytic beads, electrochemical sensors, pellistors, photoionization detectors, zirconium oxide sensors, thermal conductivity detectors, and/or any other sensing technology. Flow rate may be measured by a pressure differential across a venturi, orifice plate, or other restriction to the flow of gas; by pitot tube, mechanical flow meter, heated wire or thermal mass flow meter, and/or using any other suitable technique. Temperature may be measured with a thermocouple, a negative or positive temperature coefficient resistor, capacitor, inductor, a semiconducting device, and/or using any other suitable technique. Temperature may be measured inside the well, in the main gas flow from the well to the collection system, inside a sampling chamber, outside of the control mechanism (e.g., ambient atmospheric temperature), and/or at any other suitable point. Atmospheric pressure may be measured outside of the control mechanism (e.g., ambient atmospheric pressure) and/or at any other suitable location. Temperature, pressure, gas composition, and/or other readings from different points within the gas extraction well, the In Situ Control Mechanism, and/or the gas collection system may be used in conjunction with each other to obtain a more complete analysis of the operating state of the landfill gas collection system.

Figure 4:
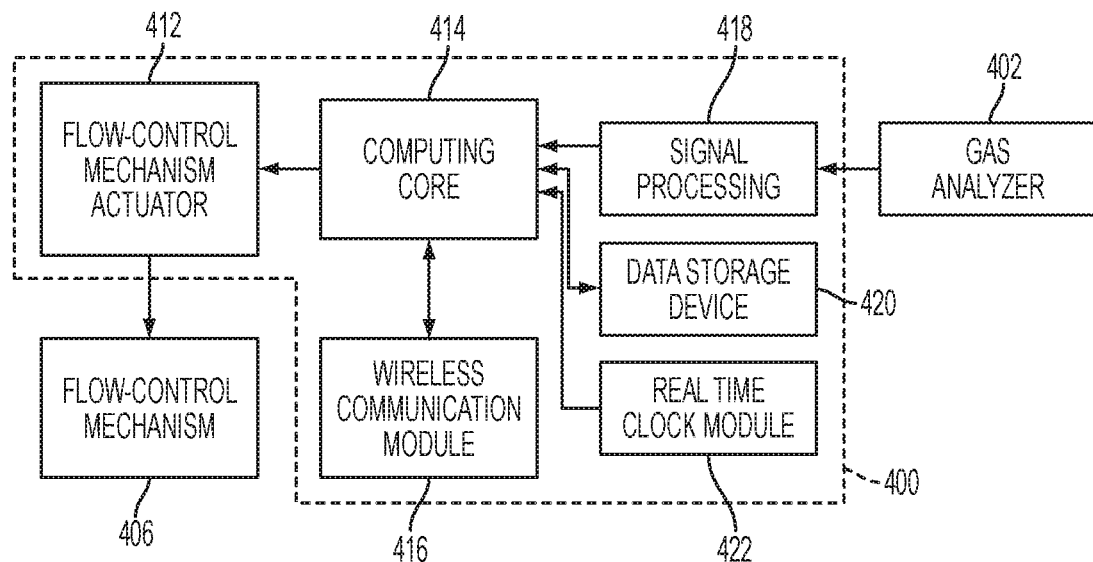
FIG. 4 is a block diagram illustrating a controller of an in situ control mechanism for landfill gas extraction, according to some embodiments.

FIG. 4 shows a controller of an In Situ Control Mechanism, according to some embodiments. In some embodiments, the Controller 400 of an In Situ Control Mechanism may include functional blocks as indicated in FIG. 4. In the embodiment of FIG. 4, the Controller 400 includes a Signal Processing Module 418, a Data Storage Device 420, a Real Time Clock Module 422, a Wireless Communication Module 416, and/or a Flow-Control Mechanism Actuator 412 (e.g., valve drive buffer) for providing a control signal to the Flow-Control Mechanism 406. Other embodiments may use only parts of this implementation, while others may add additional functional modules for supporting functions. For example, in some embodiments, the Controller of an In Situ Control Mechanism may be implemented using a one or more processors as described below.

In some embodiments, the Controller 400 of the In Situ Control Mechanism may use data about environmental conditions in and around the landfill (e.g., in and around the gas extraction well upon which the In Situ Control Mechanism is installed) to determine the settings to be applied to the flow-control mechanism. In some embodiments, a remotely-located controller may use the environmental data to determine the settings to be applied to the flow-control mechanism, and may communicate those settings to the In Situ Control Mechanism. The environmental data may include information about parameters including, but not limited to atmospheric pressure, ambient temperature, wind direction, wind speed, precipitation, and/or any other suitable environmental parameter. The In Situ Control Mechanism may use information from one or more other sensors placed in or around the gas extraction well, including, without limitation, atmospheric pressure sensor(s) (sometimes termed barometric pressure sensor(s), subsurface temperature probe(s), subsurface moisture probe(s), collection well liquid level measurement sensors, measurements of the chemical and/or biological processes (for example, pH measurements, tests for the presence of other chemicals or biological by-products, etc.) occurring in the section of waste that is in the vicinity of the gas extraction well, and/or any other suitable information. In embodiments, where one or more atmospheric pressure sensors are used, the atmospheric pressure sensors may be of any suitable type, as aspects of the technology described herein are not limited in this respect.

In some embodiments, the Controller 400 of the In Situ Control Mechanism may use the current data about the gas characteristics and/or environmental parameters, and/or it may incorporate historical data about the performance of the gas extraction well to determine the settings to be applied to the Flow-Control Mechanism. In some embodiments, a remotely-located controller may use the gas data, environmental data, and/or historical data to determine the settings to be applied to the flow-control mechanism, and may communicate those settings to the In Situ Control Mechanism. The In Situ Control Mechanism may, in some embodiments, incorporate past and/or present data about gas production into one or more predictive models and may use the predictive model(s) to determine the modulation of the Flow-Control Mechanism state.

In some embodiments, the Signal Processing Module 418 takes gas characteristics data from the Gas Analyzer 402 and converts it into a form that can be interpreted by the Computing Core 414. This may involve a interpreting a serial digital data stream via a serial parsing algorithm, a parallel parsing algorithm, analog signal processing (for example, performing functions on analog signals like filtering, adding or removing gain, frequency shifting, adding or removing offsets, mixing or modulating, and the like), digital signal processing (digital filtering, convolution, frequency shifting, mixing, modulating, and the like), analog-to-digital or digital-to analog conversion, and/or any other suitable signal processing technique that will be recognized by one of ordinary skill in the art.

In some embodiments, the Data Storage Device 420 may include any volatile and/or non-volatile memory element, including but not limited to flash memory, SD card, micro SD card, USB drive, SRAM, DRAM, RDRAM, disk drive, cassette drive, floppy disk, cloud storage backup, and/or any other suitable computer-readable storage medium. The Data Storage Device may serve as a data recovery backup, or it may hold data for temporary intervals during the calculation of control signals. The Data Storage Device may be removable, or it may be fixed.

In some embodiments, the Real Time Clock Module 400 may include any circuit and/or functional module that allows the Computing Core to associate the results of a gas analyzer reading with a date or time (e.g., a unique date or time stamp).

In some embodiments, the Wireless Communication Module 416 may include, but is not limited to: a radio transceiver (AM or FM, or any other type), television, UHF, or VHF transceiver, Wi-Fi and/or other 2.4 GHz communication module, cellular chipset (2G, 3G, 4G, LTE, GSM, CDMA, etc.), GPS transmitter, satellite communication system, and/or any other suitable wireless communication device. The Wireless Communication Module may have an integrated antenna, and/or an external one. The Wireless Communication Module may transmit, receive, and/or have two-way communication with a central source and/or be capable of point-to-point communication with another module. In some embodiments, the Wireless Communication Module may include a 2G chipset that allows the In Situ Control Mechanism to connect to existing telecommunications infrastructure.

In some embodiments, the Computing Core 414 may include, but is not limited to: a microprocessor, a computer, a microcontroller, a field programmable gate array (FPGA), an application specific integrated circuit (ASIC), a digital signal processor (DSP), an analog computer or control system, and/or any other suitable computing device. In some embodiments, the Computing Core may have integrated Analog-to-Digital converters, pulse width modulation detectors, edge detectors, frequency detectors, phase detectors, amplitude detectors, demodulators, RMS-DC converters, rectifiers, and/or other suitable signal processing modules.

In some embodiments, the Flow-Control Mechanism Actuator 412 (e.g., a valve drive buffer) may include any circuit that can translate commands from the Computing Core into an appropriate actuation signal (e.g., driving signal) for the Flow-Control Mechanism 406. In some embodiments, translating commands from the Computing Core may comprise analog signal processing on a voltage (for example, adding/removing gain, offset, filtering, mixing, etc.), analog signal processing on a current control (for example, conversion to a 4-20 mA control loop, increasing output current drive capability), pulse width modulating a digital signal, digital signal processing, digital-to-analog or analog-to-digital conversion, and/or any other suitable techniques.

In some embodiments, the Flow-Control Mechanism 406 of the In Situ Control Mechanism may comprise a solenoid valve, latching solenoid valve, pinch valve, ball valve, butterfly valve, ceramic disc valve, check valve, choke valve, diaphragm valve, gate valve, globe valve, knife valve, needle valve, pinch valve, piston valve, plug valve, poppet valve, spool valve, thermal expansion valve, pressure reducing valve, sampling valve, safety valve, and/or any other suitable type of flow-control mechanism. The Flow-Control Mechanism may have two or more discrete operating states, or it may provide continuous adjustment of the operating state (e.g., valve position) for fine control of operating pressure, temperature, flow, gas characteristics, etc.

In some embodiments, the In-Situ Control Mechanism may modulate the Flow-Control Mechanism to achieve any number of desired outcomes, or it may determine the state of the Flow-Control Mechanism based on an optimization and/or prioritization of multiple output parameters. Some examples of control schemes might include, but are not limited to:

Modulation of the flow-control mechanism to maintain and/or obtain a constant vacuum pressure in the gas extraction well (in spite of varying atmospheric pressure, temperature, and/or varying rates of gas generation, etc.);

Modulation of the flow-control mechanism to maintain and/or obtain a constant flow rate of landfill gas from the extraction well;

Modulation of the flow-control mechanism to control the flow rate of landfill gas from the extraction well;

Modulation of the flow-control mechanism to maintain and/or obtain a constant percentage of any of the constituent gases (including but not limited to methane, carbon dioxide, oxygen, nitrogen, etc.) in the landfill gas coming from the extraction well;

Modulation of the flow-control mechanism to control (e.g., increase or decrease) the concentration of any of the constituent gases in the landfill gas coming from the extraction well;

Modulation of the flow-control mechanism to control (e.g., increase and/or decrease) the energy content of the landfill gas (e.g., increase the total quantity of methane extracted in a given period of time, etc.) coming from the extraction well;

Modulation of the flow-control mechanism to control the total volume of the landfill gas (e.g., increase the total quantity of landfill gas extracted in a given period of time, etc.) coming from the extraction well;

Modulation of the flow-control mechanism to increase the rate of extraction during periods of increased energy demand (e.g., increasing generation during the peaks of real time, hourly, daily, weekly, monthly, or seasonal electricity prices);

Modulation of the flow-control mechanism to decrease the rate of extraction during periods of reduced energy demand (e.g., reducing generation during the lows of real time, hourly, daily, weekly, monthly, or seasonal electricity prices);

Modulation of the flow-control mechanism to control (e.g., maintain, improve, and/or establish) the long term stability of the biochemical decomposition processes (aerobic or anaerobic digestion, etc.) occurring within the section of waste that is in the vicinity of the gas extraction well;

Modulation of the flow-control mechanism to control (e.g., increase and/or decrease) the rates of decomposition occurring within the section of waste that is in the vicinity of the gas extraction well;

Modulation of the flow-control mechanism to match the operating parameters or limitations of the gas collection system;

Modulation of the flow-control mechanism to prevent or extinguish underground fires or other potentially dangerous events occurring within the section of waste that is in the vicinity of the gas extraction well;

Modulation of the flow-control mechanism to mitigate emission of odors;

Modulation of the flow-control mechanism to control (e.g., reduce) emissions of landfill gas or components of landfill gas ($H_2S$, methane, etc.) in the vicinity of the gas extraction wells;

Modulation of the flow-control mechanism to control (e.g., reduce) gas losses into the atmosphere;

Modulation of the flow-control mechanism to control (e.g., maintain, improve, and/or establish) compliance of the gas extraction system with local, state and/or federal regulations; and/or Modulation of the flow-control mechanism to reduce damage to an engine, turbine, or other energy generation equipment from contaminants emanating from the vicinity of a gas extraction well.

In some embodiments, some or all of the gas extraction wells and/or piping junction points in a landfill may be outfitted with In-Situ Control Mechanisms to form at least a portion of a control system for controlling gas extraction across the entire landfill or a set of wells within the landfill (the "landfill under control"). One embodiment of such a control system is shown in FIG. 5.

FIG. 5 shows a control system 500 for a landfill gas extraction system, according to some embodiments. In some embodiments, control system 500 may include one or more In Situ Control Mechanisms 506 configured to control gas flow in a gas extraction system in a landfill under control 520. In some embodiments, control system 500 may include a controller module 504 for modeling aspects of the landfill under control, for communicating with the In Situ Control Mechanisms, and/or for controlling the operation of the In Situ Control mechanisms. In some embodiments, controller module 504 may be implemented on one or more computers located remotely from the In Situ Control Mechanisms (e.g., on a centralized computer or in a distributed computing environment). In some embodiments, controller module 504 may execute a multitasking program with different tasks configured to control the operation of different In Situ Control Mechanisms and/or to communicate with different In Situ Control Mechanisms. In some embodiments, the functionality described below as being performed by controller module 504 may be performed by one or more In Situ Control Mechanisms 506 individually or in concert. In some embodiments, controller module 504 may communicate with the In Situ Control Mechanisms through a device manager 502. In some embodiments, controller module 504 be in communication with a user interface 508 and/or a database 510.

In some embodiments, some or all of these In-Situ Control Mechanisms 506 may contain wireless communication capability to establish Wireless Data Links to controller module 504 (e.g., through device manager 502). Wireless Data Links may operate in either a unidirectional or a bidirectional manner. The network of Wireless Data Links may be implemented using a mesh network, a star network, point-to-point communication, and/or any other suitable communication technique. In-Situ Control Mechanisms 506 may send information over a communication network to a distributed network (e.g., the "cloud"). Communication may occur through a system including but not limited to a cell phone network (2G, 3G, 4G LTE, GSM, CDMA 1×RTT, etc.), a satellite network, a local area network connected to the Internet, etc. In some embodiments, the In Situ Control Mechanisms 506 may communicate with each other and/or with controller module 504 using wired data links, Wireless Data Links, power line communication, and/or any other suitable communication technique.

Information sent (e.g., over Wireless Data Links) by the In-Situ Control Mechanisms 506 may include but is not limited to sensor data, environmental data, failure notifications, status notifications, calibration notifications, etc. Information received by the In-Situ Control Mechanisms may include but is not limited to: raw or pre-processed data about the current or past operational state of other landfill gas extraction wells in the landfill under control, command and control signals, desired operating states, predictive calculations about the operating state of the well upon which the In-Situ Control Mechanism is installed or other landfill gas extraction wells, failure notifications, status notifications, calibration changes, software and/or firmware updates, flow-control mechanism settings, sensor settings, and/or other information.

In some embodiments, In Situ Control Mechanisms 506 in the landfill under control 520 may communicate with a Device Manager 502, as indicated in FIG. 5, and/or they may communicate directly with each other. The Device Manager 502 may include software operating on a computer in the landfill under control, or operating on a remote server, and/or operating on a distributed computing network ("the cloud") in one or multiple locations. In some embodiments, Device Manager 502 may be implemented using a computing system 1100 as described below. The Device Manager 502 may collect information from alternate sources—including but not limited to environmental data, past history about electrical power demand and/or prices, forecasts about future electrical power demand and/or prices, etc. In some embodiments, the Device Manager 502 may be in constant communication with the In-Situ Control Mechanisms 506, or it may communicate asynchronously with the In-Situ Control Mechanisms. In some embodiments, the Device Manager 502 may hold a queue of commands or other information to be passed to the In Situ Control Mechanism(s) 506 upon the establishment of a data link (e.g., re-establishment of a Wireless Data Link).

In some embodiments, the Device Manager 502 may associate a set of In-Situ Control Mechanisms 506 into a single landfill under control 520, and it may add or remove additional In-Situ Control Mechanisms 506 to that landfill under control 520 to accommodate the addition or removal of In-Situ Control Mechanisms from the site. The Device Manager 502 may contain or perform authentication or encryption procedures upon establishing a data link (e.g., a Wireless Data Link) with an In-Situ Control Mechanism. Security protocols implemented by the Device Manager may include, but are not limited to: internet key exchange, IPsec, Kerberos, point to point protocols, transport layer security (TLS), HTTPS, SSH, SHTP, etc.

In some embodiments, the Device Manager 502 may communicate with a controller module 504. The controller module 504 may include one or more applications running on a distributed computational platform (e.g., a "cloud server"), a traditional server infrastructure, a computing system 1100 as described below, and/or other suitable computer architecture recognized by those of ordinary skill in the art. It should be appreciated, however, that control functions as described herein may be distributed across device manager 502, controller module 504 and/or any other computing components in any suitable way. Similarly, control functions may be distributed across processors (e.g., controllers) associated with one or more In Situ Control Mechanisms.

In some embodiments, control system 500 may be configured to predict future states of the landfill under control, and/or may be configured to use such predictions to control the operation of a gas extraction system associated with the landfill under control. In some embodiments, using one or more predictions regarding the future state(s) of the landfill under control to control the operation of the gas extraction system may improve the performance (e.g., efficiency) of the gas extraction system, relative to the performance of conventional gas extraction systems.

Figure 6:
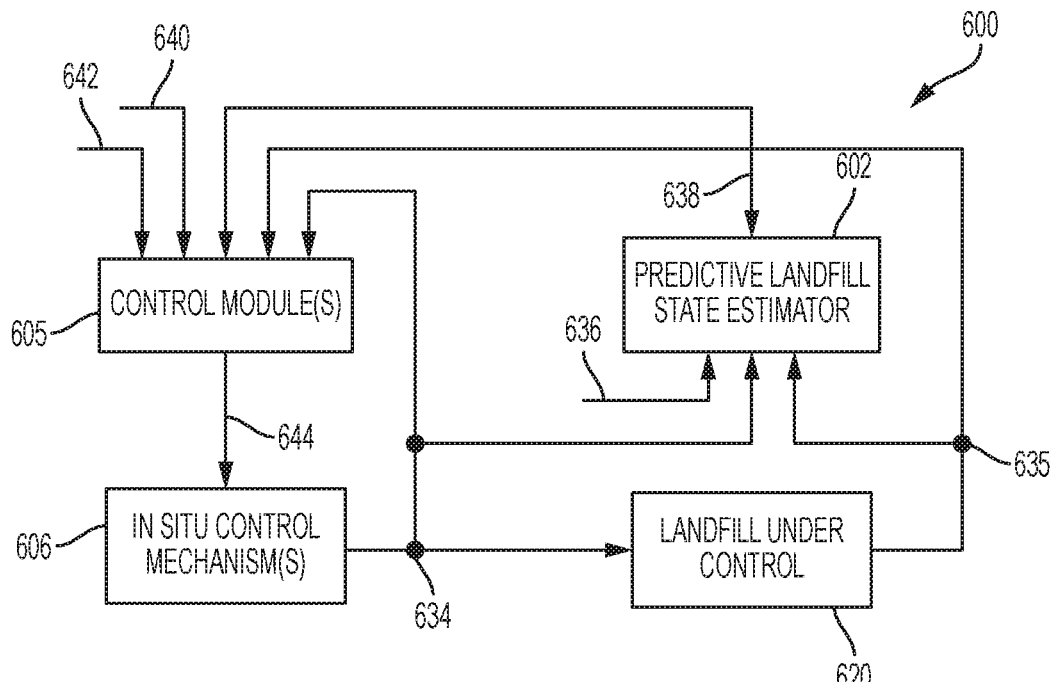
FIG. 6 is a block diagram illustrating an example of a feedback-based, predictive system for controlling landfill gas extraction, according to some embodiments.

FIG. 6 shows a feedback-based, predictive control system 600, which may be implemented by some embodiments of control system 500 to control the operation of gas extraction system associated with a landfill under control 620. Feedback-based, predictive control system 600 may include a predictive landfill state estimator 602 for predicting one or more future states of a landfill under control 620, and one or more control modules 605 for controlling the operation of a gas extraction system (e.g., by controlling the operation of one or more in situ control mechanisms 606 in the landfill under control 620) based, at least in part, on the predicted future state(s) of the landfill under control 620. The predictive landfill state estimator 602 and/or control module(s) 605 may be implemented by controller 504 and/or by controller(s) 204 of in situ control mechanism(s) 606, with the functions of the predictive landfill state estimator 602 and the control module(s) 605 being divided among the controller 504 and the in situ control mechanism(s) 606 in any suitable way.

In some embodiments, predictive landfill state estimator 602 may include one or more predictive models of the landfill under control 620. Each model may relate a set of parameters defining a current state of the landfill to one or more sets of parameters, defining one or more future states of the landfill. Any suitable modeling techniques may be used to develop such a model, which may be implemented using software programming on a computing device. Different models may be selected depending on parameters defining input or output states. For example, different models may be used to predict parameters such as odor, energy production, or gas production.

In some embodiments, predictive landfill state estimator 602 may use a predictive model to predict a future state 638 of at least one attribute of a landfill under control, based on a model of the landfill under control and/or based on suitable input data. In some embodiments, the predictive landfill state estimator 602 may apply mathematical models to present and/or past data about the landfill under control 620 (e.g., data about landfill gas production and/or extraction) to estimate a future state of the landfill under control (e.g., the future LFG production and/or extraction). Suitable input data for the predictive landfill state estimator 602 may include the current state 634 of flow-control mechanisms in the gas extraction system of the landfill under control (e.g., the operating states of valves in the gas extraction system), the current state 635 of the landfill under control (e.g., the characteristics of the landfill's gas, as determined using the in situ control mechanism's sensors), and/or environmental data 636 (e.g., data describing environmental conditions in and/or around the landfill, as determined by the in situ control mechanism's sensors or any other suitable data source). In some embodiments, the predicted future state may correspond to a specified date and/or time in the future.

In some embodiments, control module(s) 605 may control the operation of the gas extraction system based, at least in part, on the predicted future state 638 of the landfill under control. For example, control module(s) 605 may determine the values of control parameters 644 ("control settings") for the in situ control mechanism(s) 606 based on the predicted future state 638. In embodiments where the control module(s) are not implemented by the in situ control mechanism(s) 606, the control module(s) may send the determined values of the control parameters 644 to the in situ control mechanism(s) 606. The in situ control mechanism(s) 606 may apply the control parameters to flow-control mechanisms in the gas extraction system (e.g., valves) to control the operation of the gas extraction system (e.g., the in situ control mechanism(s) 606 may adjust the gas extraction rate from the landfill under control 620 by modulating the positions of valves in the gas extraction system). As another example, control module(s) 605 may determine changes in the current values of control parameters 644 for the in situ control mechanisms(s) 606 based on the predicted future state, and the in situ control mechanism(s) may change the control parameters of the flow-control mechanisms by the determined amounts.

In some embodiments, control module(s) 605 may determine the values (or changes in the values) of the control parameters 644 based on predicted future state 638 and/or based on other input data. For example, control module(s) 605 may determine a difference between a predicted and a desired future state, determine control parameters 644 to reduce that difference, and apply the control parameters to in situ control mechanism(s) 606 (e.g., by controlling an in situ control mechanism to adjust a valve or other actuator in accordance with the control parameters) to reduce that difference. The input data may include the current state 634 of flow-control mechanisms in the gas extraction system, the current state 635 of the landfill under control, design constraints 640, and/or set point(s) 642.

In some embodiments, design constraints 640 may include physical limitations of the landfill gas extraction system including, but not limited to: operating ranges of the flow-control mechanisms (e.g., available valve movement range), accuracy of the operating states of the flow-control mechanisms (e.g., valve position accuracy), resolution of the operating states of the flow-control mechanisms (e.g., valve position resolution), gas extraction system vacuum pressure, measurement ranges of the in situ control mechanism(s)' sensors, power generation capacity at a landfill gas to energy power plant, total flow rate restrictions of the landfill gas extraction system, and/or any other suitable limitations. In some embodiments, design constraints 640 may be hard-coded values, and/or they may be specific to particular well, collection of wells, landfills, or geographic regions. In some embodiments, design constraints may be re-programmed by a human operator through a software or hardware interface (for example, a web application, a mobile application, through manual or over the air firmware upgrades, etc.). Control module 605 may use these design constraints, for example, in selecting values of control parameters such that the design constraints are not violated.

In some embodiments, the set point(s) 642 may indicate a desired operating state for the gas extraction system (e.g., an energy content extraction rate, gas flow rate, gas composition, and/or other suitable characteristic for the gas extraction system, for individual wells, and/or for individual in situ control mechanisms). In some embodiments, the control module(s) 605 may determine the values of the control parameters 644 (e.g., using a mathematical model or models) to maintain the state of the landfill under control equal to, less than, or greater than the set point. In this manner, the control module(s) 605 may use the state of the landfill (e.g., the current and/or predicted states of the landfill) to control the gas extraction system to operate in a desired operating state (as indicated by the set point(s)), without violating the system's design constraints. The set point(s) may be hard coded into the system, may be user adjustable via a software interface (e.g., web or mobile application), and/or may be set and/or adjusted using any other suitable technique.

Predictive landfill state estimator 602 may obtain its input data using any suitable technique. In some embodiments, predictive landfill state estimator 602 may obtain the current state 634 of the flow-control mechanisms in the gas extraction system and/or the current state 635 of the landfill from the in situ control mechanism(s) 606 (e.g., by querying the in situ control mechanism(s) 606 via the Device Manager).

Figure 7:
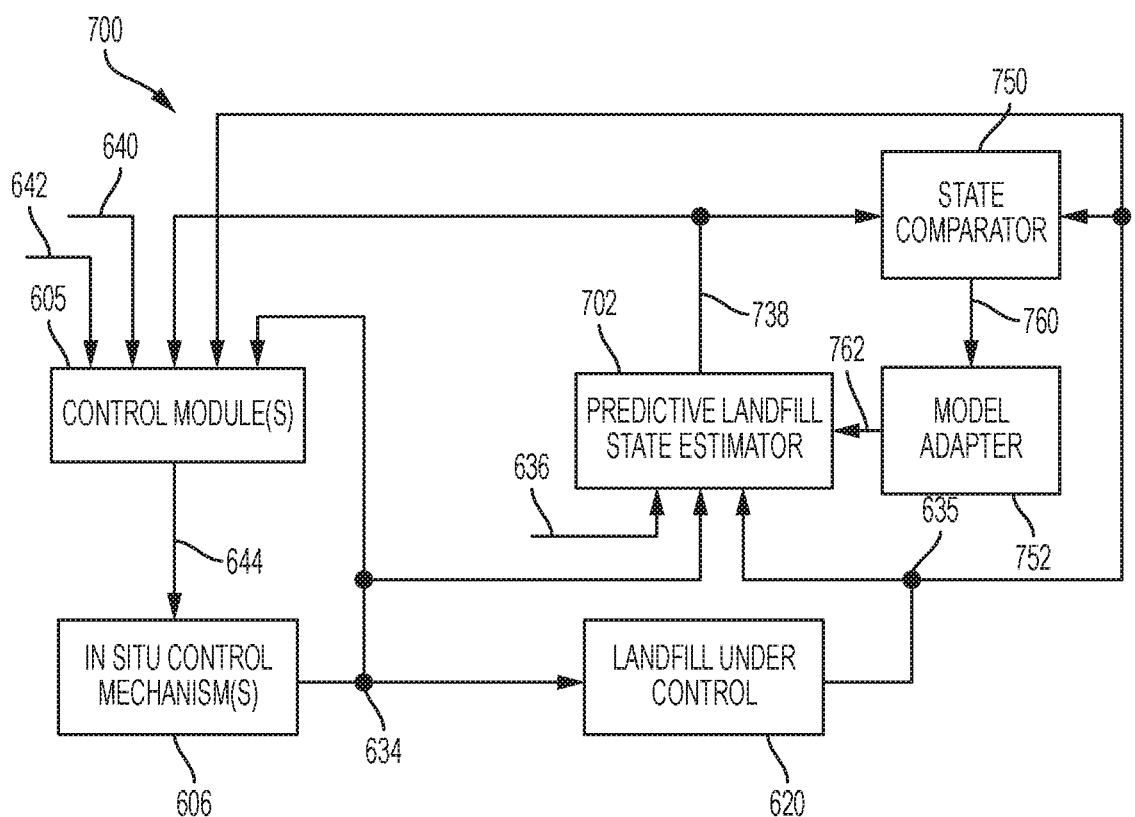
FIG. 7 is a flow diagram illustrating another example of a feedback-based, predictive system for controlling landfill gas extraction, according to some embodiments.

FIG. 7 shows a feedback-based, predictive control system 700, which may be implemented by some embodiments of control system 500 to control the operation of gas extraction system associated with a landfill under control 620. In some embodiments, feedback-based, predictive control system 700 may be adaptive ("self-learning"). In some embodiments of the adaptive control system 700, the predictive landfill state estimator 702 may compare the current state 635 of the landfill (e.g., the current state of landfill gas production) to the previously predicted state 738 of the landfill, and modify parameters in the state estimator's state estimation model or models to make the predicted states more closely match the actual measured states. In this manner, the accuracy of the state estimator's predictions may improve over time, and/or the state estimator may adapt to changing conditions over time, so that the state estimator's predictions remain accurate even as the conditions in and around the landfill change.

In some embodiments, adaptive control system 700 may include a predictive landfill state estimator 702, a state comparator 750, and a model adapter 752. In some embodiments, predictive landfill state estimator 702 may include one or more predictive models of the landfill under control 620, and may apply the predictive model(s) to suitable input data (e.g., current state 634 of flow-control mechanisms, current state 635 of the landfill under control, and/or environmental data 636) to predict one or more future states 738 of the landfill under control.

In some embodiments, state comparator 750 and model adapter 752 may adapt the state estimator's predictive model(s) to improve the accuracy of the predictive model(s). In some embodiments, state comparator 750 may compare a predicted future state 738 of the landfill and a subsequently measured current state 635 of the landfill. In some embodiments, model adapter 752 may use the difference 760 between the predicted state and the actual state of the landfill to determine modified parameter values 762 for one or more parameters in the state estimator's predictive model(s), to improve (e.g., continually improve) the accuracy of those models.

In some embodiments, the modified parameter values 762 output by the model adapter 752 may act to reduce the difference between the predicted future state of the landfill (if it were recalculated using the modified parameter values) and the actual current state of the landfill (e.g., to reduce the difference to zero). In some embodiments, the modified parameter values 762 may act to reduce (e.g., minimize) another error metric (e.g., to reduce the mean error, the sum of the squares of errors for one or more (e.g., all) previous predictions, and/or any other metric). The modified parameter values 762 may be output after every cycle of the feedback loop, or they may be selectively applied. In some embodiments, the model adapter 752 may detect anomalous data points in the measured current state 635 of the landfill (as may happen, e.g., during natural events (e.g., extreme weather), during equipment malfunction (e.g., sensor or control valve failures), when the operations of the Landfill Gas to Energy plant are suddenly disrupted, etc.). In some embodiments, control system 700 may not apply modified parameter values 762 to the predictive model(s) of the predictive landfill state estimator 702 during such events.

In some embodiments, adaptive control system 700 may also include one or more control module(s) 605 and one or more in situ control mechanism(s) 606, which may control the operation of a gas extraction system associated with landfill under control 620. Some embodiments of control module(s) 605 and in situ control mechanism(s) 606 are described above with reference to FIG. 6. For brevity, these descriptions are not repeated here.

Returning to the control system 500 shown in FIG. 5, in some embodiments the controller module 504 may be in communication with a database 510 and/or a user interface 508. In some embodiments, the database 510 may be implemented on a centralized storage mechanism (hard drive, disk drive, or some other non-volatile memory), or it may reside on a distributed storage mechanism (e.g., a cloud server, or any other suitable distributed storage device). The database 510 may serve as a long term archive of historical data and/or past predictions from the predictive landfill state estimator 602, and/or may store past design constraints 640, current design constraints 640, past set points 642, current set points 642, any parameters from the state estimator's predictive model(s), any parameters from the flow-control mechanisms, and/or any other data (for example, environmental data, data from landfill operations, etc.). In some embodiments, the data stored in database 510 may be used to train predictive landfill state estimator 702. In some embodiments, the data stored in database 510 may be provided as input data to the predictive landfill state estimator, which may use the data to predict the next state of the landfill under control. In some embodiments, the data stored in database 510 may be provided as input data to the control module(s) 605 and may be used to determine the values of control parameters 644. The database may be implemented using MySQL, dBASE, IBM DB2, LibreOffice Base, Oracle, SAP, Microsoft SQL Server, MariaDB, SQLite, FoxPro, and/or any other commercially available database management software that will be recognized by one of ordinary skill in the art. In some embodiments, the database may be of a custom construction.

In some embodiments, the controller module 504 may display certain data and/or accept inputs via a user interface 508. In some embodiments, the user interface 508 may include a web site, may include a mobile application (tablet, phone, or other mobile device), and/or may be provided through a terminal via a local network (e.g., secure local network) operating at the landfill under control. The user interface may display current and/or historical gas extraction data collected from a particular well or any set of wells in a given landfill. The user interface may display data via tables, charts, graphs, and/or any other suitable technique, and may do so over various periods of time (e.g., the previous day, past week, past month, etc.). The user interface may overlay data from wells in a given landfill on top of or embedded into aerial maps or renderings of the landfill, and/or it may display data overlays with topographical maps, schematics of the underground piping system, and/or other engineering drawings.

In some embodiments, the user interface may allow users to click on a particular well or set of wells and manually adjust set points, design constraints, and/or other parameters of the control system 500 as they pertain to those wells. The user interface may allow users to set alarms or notifications if gas extraction data or gas data from wells under control cross certain thresholds as defined by the user (for example, a user may request an email or SMS message to be sent in the event that gas from any well exceeds 55% methane or drops below 45% methane by volume, and/or a user may set an alarm if gas temperature rises above 120 degrees Fahrenheit at any well, etc.).

In some embodiments, control modules 605 corresponding to two or more In Situ Control Mechanisms 606 may be in communication with each other (e.g., control modules 605 may be implemented by controller 504 and share data through the memory of controller 504, and/or control modules 605 may be implemented by the corresponding In Situ Control Mechanisms, which may communicate with each other directly or through controller 504). The control parameters 644 for a given In Situ Control Mechanism 606 may then be determined in accordance with, and/or driven by, the behavior, control parameters, sensor readings, and/or other data of other In Situ Control Mechanisms in the landfill under control (e.g., in the surrounding area). Such interdependence among the control parameters 644 of the in situ control mechanisms 606 may improve the performance of the gas extraction system, because adjustments to each gas extraction point, being in fluid communication in the trash, and/or in fluid communication through the gas extraction piping system, may influence the surrounding areas. The spatial area around a given landfill gas extraction well that is affected by that well is called its "Zone of Influence."

Figure 8:
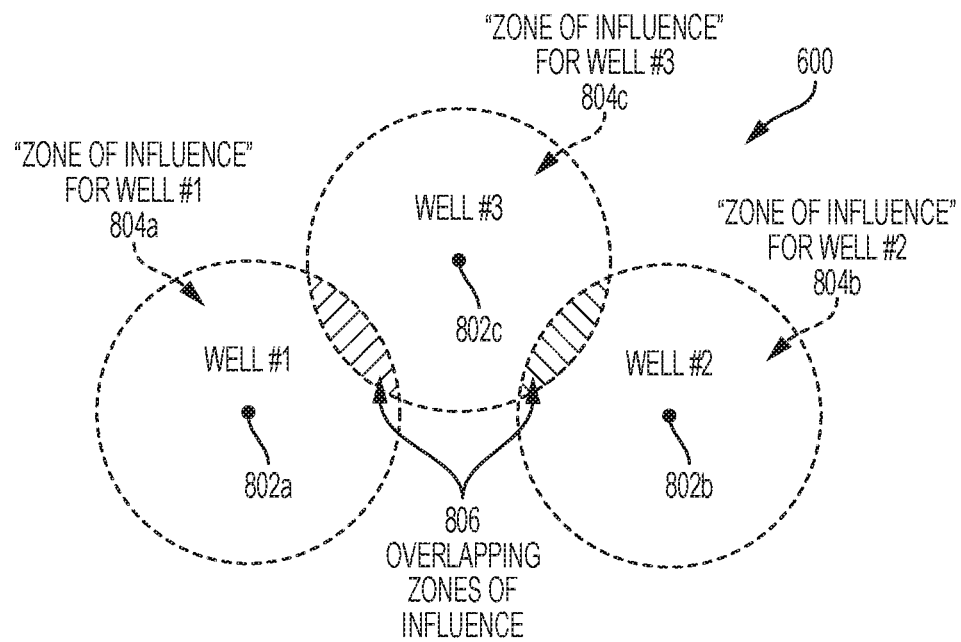
FIG. 8 is a sketch of an example of zones of influence of wells in a landfill.

FIG. 8 depicts the Zones of Influence around a set of several gas extraction wells 802a-c. In this example, well 802c has overlapping zones of influence 806 with both other wells. In such an example, changes to the gas extraction rate at well 802c will impact the gas characteristics at wells 802a and 802*b*. In some embodiments of the landfill gas extraction control system disclosed herein, one objective of the processing performed by the state estimator and/or control module(s) 605 may be to identify such overlapping zones of influence and incorporate interactions between wells into their models.

Figure 9:
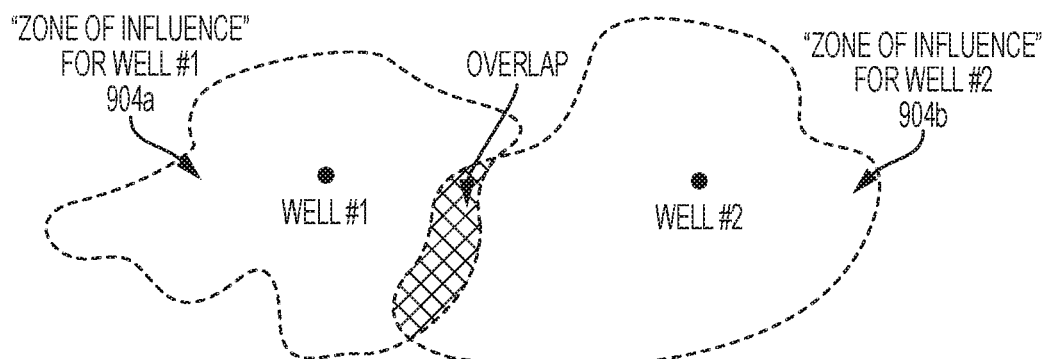
FIG. 9 is a sketch of another example of zones of influence of wells in a landfill.

The inventors have recognized and appreciated that as the porosity of waste in a landfill varies (due to heterogeneous waste composition and compaction at the time of dumping, and also due to the natural decomposition of waste over time and settling effects), certain wells may have highly irregular zones of influence 904*a-b* as depicted in FIG. 9 below. By placing a set of In-Situ Control Mechanisms on adjacent wells in a landfill, it may be possible to quantify and model the strength of interactions between individual wells and to create an interaction matrix that captures an effective "coupling parameter" between any two or more wells in that landfill. In some embodiments, the coupling parameters and/or the interaction matrix may be used to develop or improve the model(s) of the state estimator and/or control module(s) 605 in the control system, and/or may be used to inform the placement of additional wells (e.g., in areas of the landfill where gas extraction may be lacking with the existing wells).

The techniques and devices disclosed herein may be used to modulate the rate of gas extraction of a well or set of wells in accordance with any suitable control scheme, including but not limited to:

Modulation of the gas extraction rate to control vacuum pressure (e.g., maintain and/or obtain a constant vacuum pressure) in the landfill and/or wells under control (in spite of varying atmospheric pressure, temperature, and/or varying rates of gas generation, etc.);

Modulation of the gas extraction rate to maintain and/or obtain a constant flow rate of landfill gas from the landfill and/or wells under control;

Modulation of the gas extraction rate to control (e.g., increase or decrease) the flow rate of landfill gas from the landfill and/or wells under control;

Modulation of the gas extraction rate to maintain and/or obtain a constant percentage of any of the constituent gases (including but not limited to methane, carbon dioxide, oxygen, nitrogen, etc.) in the landfill gas coming from the landfill and/or wells under control;

Modulation of the gas extraction rate to control (e.g., increase or decrease) the concentration of any of the constituent gases in the landfill gas coming from the landfill or wells under control;

Modulation of the gas extraction rate to control (e.g., increase or decrease) the energy content of the landfill gas (e.g., control the total quantity of methane extracted in a given period of time, etc.) coming from the landfill and/or wells under control;

Modulation of the gas extraction rate to control (e.g., increase or decrease) the total volume of the landfill gas (e.g., control the total quantity of landfill gas extracted in a given period of time, etc.) coming from the landfill and/or wells under control;

Modulation of the gas extraction rate to increase the rate of extraction during periods of increased energy demand (e.g., increasing generation during the peaks of real time, hourly, daily, weekly, monthly, and/or seasonal electricity prices);

Modulation of the gas extraction rate to decrease the rate of extraction during periods of reduced energy demand (e.g., reducing generation during the lows of real time, hourly, daily, weekly, monthly, or seasonal electricity prices);

Modulation of the gas extraction rate to control (e.g., maintain, improve, and/or establish) the long term stability of the biochemical decomposition processes (aerobic or anaerobic digestion, etc.) occurring within a section of waste that is in the vicinity of the well(s) under control;

Modulation of the gas extraction rate to control (e.g., increase or decrease) the rates of decomposition occurring within a section of waste that is in the vicinity of the well(s) under control;

Modulation of the gas extraction rate to match the operating parameters or limitations of the gas collection system for the landfill and/or wells under control (including limitations of header junctions and/or subsections of underground piping that impact only certain wells);

Modulation of the gas extraction rate to prevent or extinguish underground fires and/or other potentially dangerous events occurring within a section of waste that is in the vicinity of the well(s) under control;

Modulation of the gas extraction rate to control (e.g., reduce) emission of odors from the landfill and/or wells under control;

Modulation of the gas extraction rate to control (e.g., reduce) emissions of landfill gas or components of landfill gas ($H_2S$, methane, etc.) in the vicinity of the gas extraction well(s) under control;

Modulation of the gas extraction rate to control (e.g., reduce) gas losses into the atmosphere;

Modulation of the gas extraction rate to control (e.g., maintain, improve, and/or establish) compliance of the gas extraction system with local, state and/or federal regulations;

Modulation of the gas extraction rate to control (e.g., reduce) damage to an engine, turbine, and/or other energy generation equipment from contaminants emanating from the vicinity of a well or wells under control;

The success or failure of the above-described control schemes may be assessed in any suitable way. In some embodiments, attributes of the landfill gas may be monitored over a period of time, and a determination may be made as to whether the monitored values comply with the control scheme. For example, to determine whether a specified quantity of methane has been extracted from the landfill in a specified time period, the concentration of methane in the extracted landfill gas and the flow rate of the extracted landfill gas may be monitored during the time period, and quantity of extracted methane may be determined based on the monitored methane concentration levels and gas flow rates. In some embodiments, attributes of the landfill gas may be measured at a specified time, and a determination may be made as to whether the measured values comply with the control scheme. For example, to determine whether the flow rate of extracted landfill gas matches a target flow rate, the flow rate of extracted landfill gas may be measured at some time and compared to the target flow rate.

In some embodiments, the control system 500 may be used to monitor the effect of other treatments besides just the setting of the control valve (e.g., monitoring effects of microbial treatment, leachate recirculation, watering out/pumping of the wells, adding iron, $H_2S$ abatement, etc.).

Figure 10:
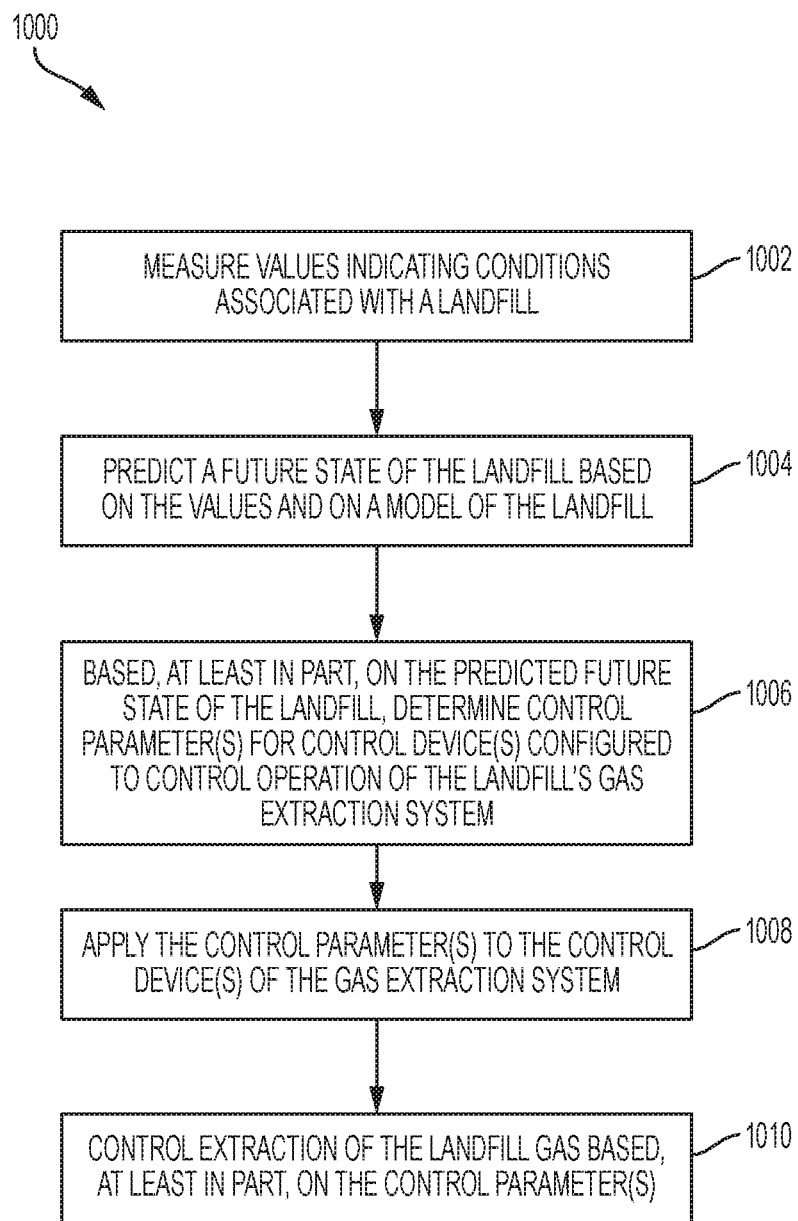
FIG. 10 is a flowchart of an illustrative process for controlling extraction of landfill gas from a landfill through a gas extraction system, according to some embodiments.

FIG. 10 illustrates a method 1000 for control extraction of landfill gas from a landfill through a gas extraction system, according to some embodiments. In step 1002 of method 1000, values indicating conditions associated with the landfill are measured. In step 1004 of method 1000, a future state of the landfill is predicted based, at least in part, on the measured values and on the model of the landfill. In some embodiments, the predicted future state may be computed by at least one computing device. In step 1006 of method 1000, one or more control parameters are determined for one or more control devices configured to control operation of the landfill's gas extraction system. In step 1008 of method 1000, the control parameter(s) are applied to the control device(s) of the gas extraction system. In step 101 of method 1000, extraction of the landfill gas is controlled (e.g., by the one or more control devices) based, at least in part, on the control parameter(s).

In some embodiments, the predicted future state of the landfill may include one or more predicted attributes of the landfill gas produced by the landfill and/or extracted by the gas extraction system at a future time and/or in a future time period. In some embodiments, the future state of the landfill may be predicted based, at least in part, on the predicted future state of the landfill, on the model of the landfill, on the current state of the landfill, on control parameter(s) applied to the control device(s) before making the prediction, and/or on environmental data indicating environmental conditions associated with the landfill. In some embodiments, the current state of the landfill may include the measured values indicating conditions associated with the landfill. In some embodiments, the measured values may be measured by sensor devices (e.g., sensor devices associated with one or more in situ control mechanisms). The values indicating conditions associated with the landfill may include temperature, pressure, flow rate, humidity, energy content (e.g., energy density), and/or composition of the landfill gas. In some embodiments, the determined attributes may correspond to landfill gas provided by a single well, landfill gas provided by a plurality of wells, and/or landfill gas extracted from the landfill. In some embodiments, the environmental data may indicate atmospheric pressure, ambient temperature, wind direction, wind speed, characteristics of ambient precipitation, subsurface temperature, subsurface moisture level, and/or pH value of an area of the landfill or adjacent to the landfill.

In some embodiments, the one or more control parameters may be determined based, at least in part, on predicted future electrical power demand and/or on an energy content of the landfill gas extracted from the landfill. In some embodiments, the one or more control parameters may be applied to the one or more respective control devices in real time. In some embodiments, controlling extraction of the landfill gas from the landfill may include controlling a flow rate and/or composition of the landfill gas extracted from the landfill. In some embodiments, the control parameter(s) may be determined based, at least in part, on the predicted future state of the landfill, on a current state of the landfill, on one or more current values of the control parameters, and/or on a control objective for the landfill. In some embodiments, the control parameter(s) may be determined based, at least in part, on electrical power data including past electrical power consumption, past electrical power prices, predicted future electrical power demand, and/or predicted future electrical power prices. In some embodiments, the control parameter(s) may be determined based, at least in part, on a target rate at which the landfill gas is extracted from the landfill by the gas extraction system, a target vacuum pressure applied to the gas extraction system, a target composition of the landfill gas extracted from the landfill by the gas extraction system, a target energy content of the landfill gas extracted from the landfill by the gas extraction system, a target volume of the landfill gas extracted from the landfill by the gas extraction system, a target stability of a decomposition process in the landfill, a target rate of a decomposition process in the landfill, a target rate of emission of the landfill gas into an atmosphere, a target odor level associated with emission of the landfill gas into the atmosphere, and/or a target level of compliance with one or more regulations applicable to the landfill. In some embodiments, the control parameter(s) may be determined based, at least in part, on the exact chemical composition of the gas as specified by the operator of the pipeline system into which the extracted gas is being introduced.

Although not illustrated in FIG. 10, some embodiments of method 1000 may include one or more steps for adapting the predictive model(s) of the predictive landfill state estimator. In some embodiments, such steps may include (1) after computing the predicted future state of the landfill at the future time, determining an actual state of the landfill at the future time, and (2) adapting the model based, at least in part, on a difference between the predicted future state of the landfill and the determined actual state of the landfill. In some embodiments, adapting the model may include adapting the model to decrease the difference between the predicted future state of the landfill and the determined actual state of the landfill.

Figure 12:
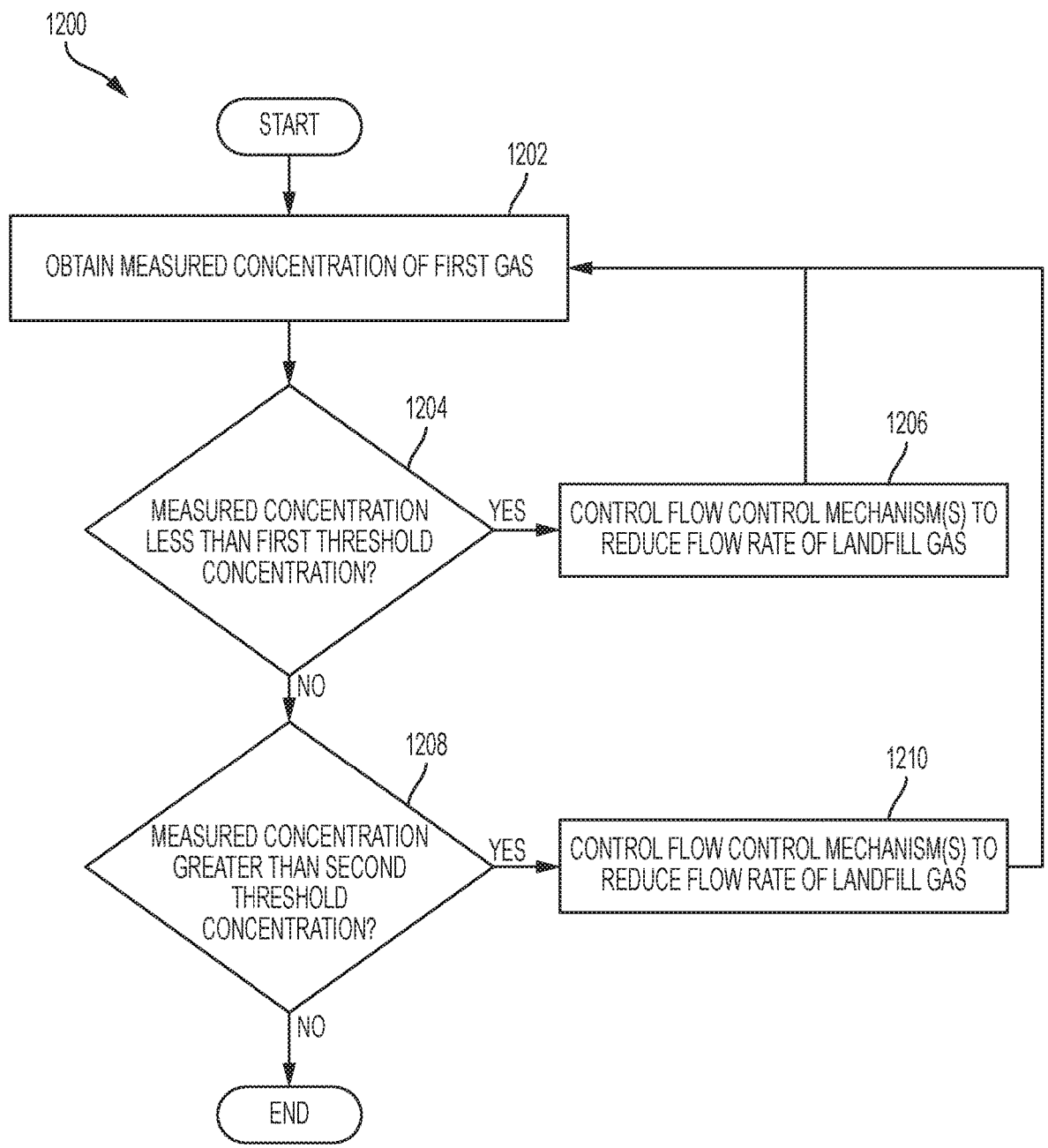
FIG. 12 is a flowchart of another illustrative process for controlling extraction of landfill gas through a gas extract system, according to some embodiments.

FIG. 12 is a flowchart of an illustrative process 1200 for controlling extraction of landfill gas through a gas extraction system, according to some embodiments. Process 1200 may be performed by any suitable system and, for example, may be performed by control system 500 described herein with reference to FIG. 5. In some embodiments, the entirety of process 1200 may be performed by an in situ controller and, for example, may be performed by in situ controller 400 described herein with reference to FIG. 4. In some embodiments, one or more acts of process 1200 may be performed by an in situ controller (e.g., in situ controller 400) co-located with a flow-control mechanism (e.g., a valve) and one or more other acts of process 1200 may be performed by a remote controller (e.g., controller module 504).

Process 1200 may be used for controlling extraction of landfill gas such that the concentration(s) of one or more constituent gases fall within a target range or ranges. For example, process 1200 may be used for controlling extraction of landfill gas such that the concentration of methane in the extracted landfill gas is in a specified range (e.g., 35%-65% by volume, 40%-60% by volume, 45-55% by volume, and/or any other suitable target range within these ranges).

Process 1200 begins at act 1202, where a measured concentration of a first gas is obtained. The measured concentration may be obtained by using one or more sensors (e.g., one or more of sensors 205) configured to sense partial pressure and/or concentration of the first gas in the landfill gas being extracted from a landfill. The first gas may be methane, oxygen, nitrogen, carbon dioxide, carbon monoxide, hydrogen sulfide or any other gas that may be part of gas being extracted from a landfill.

Next, process 1200 proceeds to decision block 1204, where it is determined whether the measured concentration of the first gas obtained at act 1202 is less than a first target threshold concentration. For example, the first gas may be methane and it may be determined, at decision block 1204, whether the measured concentration of methane is less than a first target concentration of methane (e.g., less than 30% by volume, less than 35% by volume less than 40% by volume, less than 45% by volume, less than 50% by volume, less than 55% by volume, and/or less than any suitable percentage in the 30-55% range by volume).

When it is determined that the measured concentration is less than the first threshold concentration, process 1200 proceeds, via the YES branch, to act 1206, where one or more flow control mechanisms are controlled to reduce the flow rate of landfill gas being extracted from the landfill. For example, in some embodiments, a single flow control mechanism (e.g., a valve) may be controlled to reduce the flow rate of landfill gas (e.g., by closing the valve to a greater degree). In some embodiments, multiple flow control mechanisms (at a same site or different sites in a landfill) may be controlled to reduce the flow rate of landfill gas. In some embodiments, a valve may be closed by a predefined increment, for example, by 5% or by any other suitable amount. In some embodiments, a flow control mechanism may be controlled by an in situ and/or a remote controller by receiving one or more control signals from the in situ controller and/or the remote controller.

On the other hand, when it is determined that the measured concentration is greater than or equal to the first threshold concentration, process 1200 proceeds, via the NO branch, to decision block 1208, where it is determined whether the measured concentration obtained at act 1202 is greater than a second target threshold concentration. For example, the first gas may be methane, and it may be determined, at decision block 1208, whether the measured concentration of methane is greater than a second target concentration of methane (e.g., greater than 40% by volume, greater than 45% by volume, greater than 50% by volume, greater than 55% by volume, greater than 60% by volume, greater than 65% by volume, and/or greater than any suitable percentage in the 40-70% range by volume).

When it is determined that the measured concentration is not greater than the second target threshold concentration, process 1200 completes, as the measured concentration is in the target range (between the first and second target concentrations). The process 1200 may be repeated periodically and/or according to a schedule to continue monitoring the concentration of the first gas in the landfill gas being extracted from the landfill.

On the other hand, when it is determined, at decision block 1208, that the measured concentration is greater than the second threshold concentration, process 1200 proceeds, via the YES branch, to act 1210, where one or more flow control mechanisms are controlled to increase the flow rate of landfill gas being extracted from the landfill. For example, in some embodiments, a single flow control mechanism (e.g., a valve) may be controlled to increase the flow rate of landfill gas (e.g., by opening the valve to a greater degree). In some embodiments, multiple flow control mechanisms (at a same site or different sites in a landfill) may be controlled to increase the flow rate of landfill gas. In some embodiments, a valve may be opened by a predefined increment, for example, by 5% or by any other suitable amount.

As shown in FIG. 12, after completion of either of acts 1206 and 1208, process 1200 returns to act 1202, where an updated measurement of the concentration of the first gas may be obtained and another iteration of the process 1200 may begin to be performed. In this way, process 1200 may involve iteratively increasing and/or decreasing the flow rate of gas (e.g., by opening and/or closing one or more valves) in order to achieve a target concentration of a constituent gas.

It should be appreciated that process 1200 is illustrative and that there are variations. For example, although the control scheme illustrated in FIG. 12 may be used for achieving a target concentration of methane in landfill gas, the relationship between flow rate and gas concentration for other gasses (e.g. oxygen and nitrogen) may be different. Accordingly, in some embodiments, when the first gas is oxygen or nitrogen, one or more flow control mechanisms may be controlled to increase (rather than decrease as the case may be when the first gas is methane) the flow rate landfill gas in response detecting that the measured concentration of the first gas is less than a first threshold concentration. Additionally, in such embodiments, one or more flow control mechanisms may be controlled to decrease (rather than increase as the case may be when the first gas is methane) the flow rate landfill gas in response detecting that the measured concentration of the first gas is greater than a first threshold concentration. In such embodiments, the "YES" branch from decision block 1204 would connect to act 1210 instead of the "YES" branch from decision block 1208, and the "YES" branch from decision block 1208 would connect to act 1206.

As discussed herein, the inventors have developed techniques for controlling extraction of landfill gas in order to maximize the energy content of the extracted gas. In some embodiments, the techniques involve iteratively adjusting the flow rate of extracted landfill gas, based on flow rate and methane concentration measurements, so as to maximize the product of methane concentration and extracted landfill gas flow rate. The product of methane concentration and gas flow rate may provide an estimate of the energy content of landfill gas being extracted.

Figure 13:
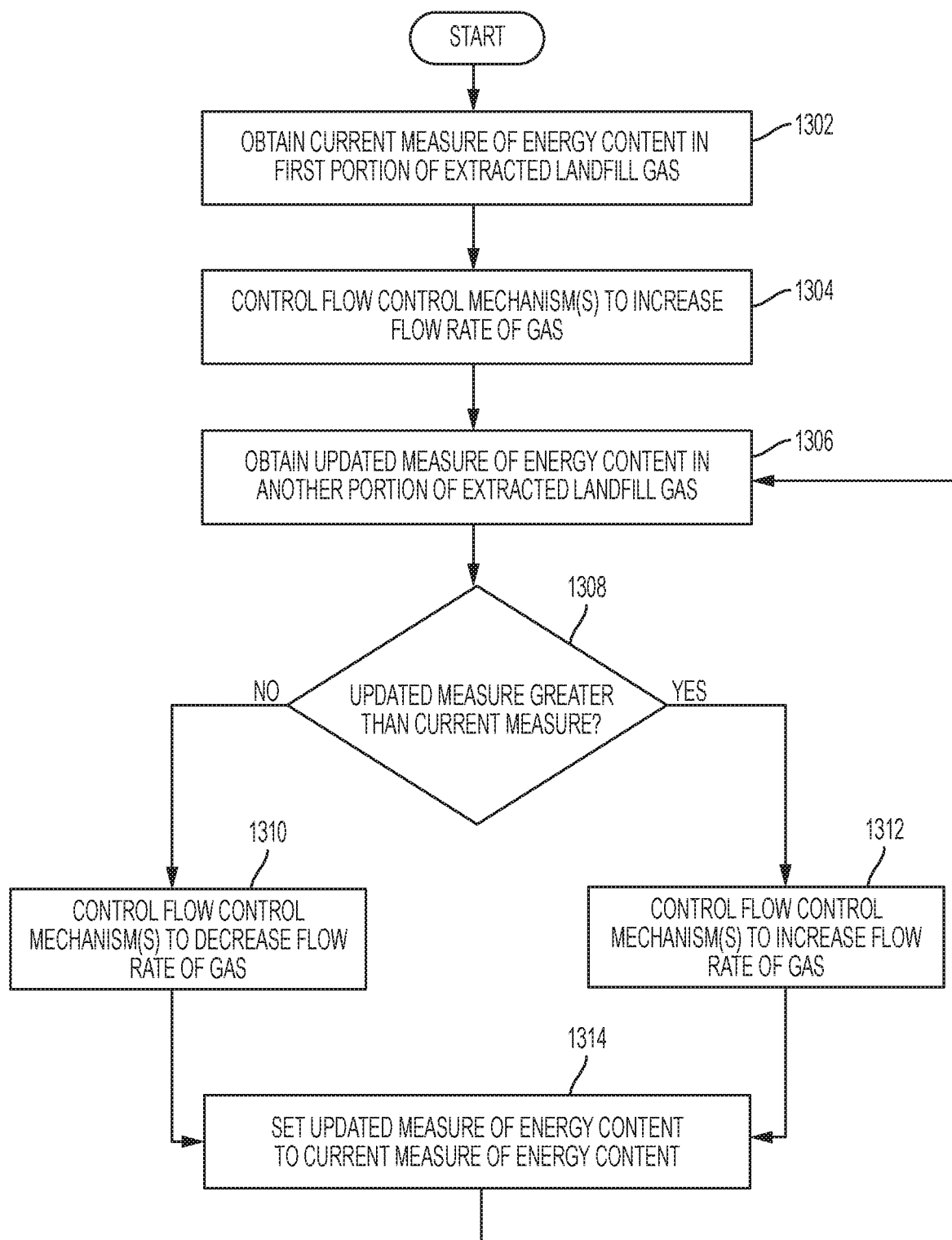
FIG. 13 is a flowchart of another illustrative process for controlling extraction of landfill gas through a gas extract system, according to some embodiments.

FIG. 13 is a flowchart of an illustrative process 1300 for controlling extraction of landfill gas through a gas extraction system with the goal of maximizing the energy content of the landfill gas. Process 1300 may be performed by any suitable system and, for example, may be performed by control system 500 described herein with reference to FIG. 5. In some embodiments, the entirety of process 1300 may be performed by an in situ controller and, for example, may be performed by in situ controller 400 described herein with reference to FIG. 4. In some embodiments, one or more acts of process 1300 may be performed by an in situ controller (e.g., in situ controller 400) co-located with a flow-control mechanism (e.g., a valve) and one or more other acts of process 1300 may be performed by a remote controller (e.g., controller module 504).

Process 1300 begins at act 1302, where a current measure of energy content in a first portion of extracted landfill gas may be obtained. In some embodiments, the measure of energy content may be obtained by: (1) measuring the concentration of methane in the first portion of extracted landfill gas (e.g., using one or more of sensors 205, which may include at least one sensor configured to sense partial pressure and/or concentration of methane); (2) measuring the flow rate of extracted landfill gas (e.g., by using one or more of sensors 205 to determine a pressure differential across a venturi, orifice plate, or other restriction to the flow of gas; by pitot tube, mechanical flow meter, heated wire or thermal mass flow meter, and/or using any other suitable technique); and (3) calculating an estimate of the energy content as a product of the measured methane concentration and the determined flow rate. Though, it should be appreciated that the measure of energy content may be obtained in any other suitable way.

Next process 1300 proceeds to act 1304, where one or more flow control mechanisms are used to change the flow rate of gas being extracted from the landfill. For example, the flow rate of rate of gas may be increased at act 1304. The flow control mechanism(s) may include one or more valves, which may be opened to a greater degree in order to increase the flow rate of gas, respectively.

Next process 1300 proceeds to act 1306, where an updated measure of energy content in a second portion of extracted landfill gas may be obtained. This measurement may reflect the impact of changes to the gas flow rate made at act 1304 onto the energy content of landfill gas being extracted. The updated measure of energy content may be obtained in any suitable way and, for example, may be obtained in the same way as described with reference to act 1302. For example, in some embodiments, the updated measure of energy content may be obtained: (1) measuring the concentration of methane in the second portion of extracted landfill gas (e.g., using one or more of sensors 205, which may include at least one sensor configured to sense partial pressure and/or concentration of methane); (2) measuring the flow rate of extracted landfill gas (e.g., by using one or more of sensors 205 to determine a pressure differential across a venturi, orifice plate, or other restriction to the flow of gas; by pitot tube, mechanical flow meter, heated wire or thermal mass flow meter, and/or using any other suitable technique); and (3) calculating an estimate of the energy content as a product of the measured methane concentration and the determined flow rate.

Next, process 1300 proceeds to decision block 1308, where it is determined whether the updated measure of energy content obtained at act 1306 is greater than the current measure of energy content obtained at act 1302. When it is determined that the updated measure of energy content is greater than the current measure of energy content, process 1300 proceeds, via the YES branch, to act 1312 where one or more flow control mechanism(s) are controlled to increase the flow rate of gas. For example, in some embodiments, a single flow control mechanism (e.g., a valve) may be controlled to increase the flow rate of landfill gas (e.g., by opening the valve to a greater degree). In some embodiments, multiple flow control mechanisms (at a same site or different sites in a landfill) may be controlled to reduce the flow rate of landfill gas. In some embodiments, a valve may be opened by a predefined increment, for example, by 5% or by any other suitable amount. In some embodiments, a flow control mechanism may be controlled by an in situ and/or a remote controller by receiving one or more control signals from the in situ controller and/or the remote controller.

On the other hand, when it is determined that the updated measure of energy content is not greater than the current measure of energy content, process 1300 proceeds, via the NO branch, to act 1310 where one or more flow control mechanism(s) are controlled to decrease the flow rate of gas. For example, in some embodiments, each of one or more valves may be controlled (e.g., by receiving one or more control signals from one or more controllers) to close to a greater degree (e.g., by a predefined increment of any suitable size or in any other suitable way) in order decrease the flow rate of landfill gas being extracted.

After one of acts 1310 and 1312 is performed, the current measure of energy content is changed to be the updated measure of energy content, and process 1300 returns to act 1306, where a new updated measure of energy content in another portion of extracted landfill gas is obtained. Thereafter, decision block 1308 and acts 1310, 1312, and 1314 may be repeated. In this way, process 1300 may involve iteratively increasing and/or decreasing the flow rate of gas (e.g., by opening and/or closing one or more valves) in order to extract landfill gas having high energy content.

It should be appreciated that process 1300 is illustrative and that there are variations. For example, in some embodiments, the techniques for controlling the extraction of landfill gas may seek to maximize energy content in the landfill gas subject to one or more constraints on the concentration(s) of one or more other gases (e.g., nitrogen and/or oxygen). Limits on concentration of such gases may be imposed by landfill operators, local regulations, state regulations, and/or federal regulations. Accordingly, in some embodiments, process 1300 may further include steps to measure concentrations of nitrogen (e.g., by inferring nitrogen concentration as the concentration of balance gas by using measured concentrations of oxygen, methane, and carbon dioxide) and/or oxygen (e.g., using an oxygen sensor).

In turn, at decision block 1308, process 1300 may proceed to act 1312 to increase the flow rate of landfill gas only when it is determined both that the updated measure of energy content is greater than the current measure of energy content and the concentration of nitrogen or oxygen is less than a respective threshold (e.g., 2.5% by volume for nitrogen, 5.0% by volume for oxygen). Similarly, at decision block 1308, process 1300 may proceed to act 1310 to decrease the flow rate of landfill gas when it is determined that either the updated measure of energy content is lower than the current measure of energy content or that the nitrogen (or oxygen) concentration is greater than its respective threshold.

As discussed herein, the inventors have developed techniques for controlling extraction of landfill gas that take into account changes in atmospheric conditions, such as atmospheric pressure. In some embodiments, the flow rate of landfill gas being extracted may be decreased in response to increasing atmospheric pressure and/or increased in response to decreasing atmospheric pressure. One such example embodiment is illustrated in FIG. 14.

Figure 14:
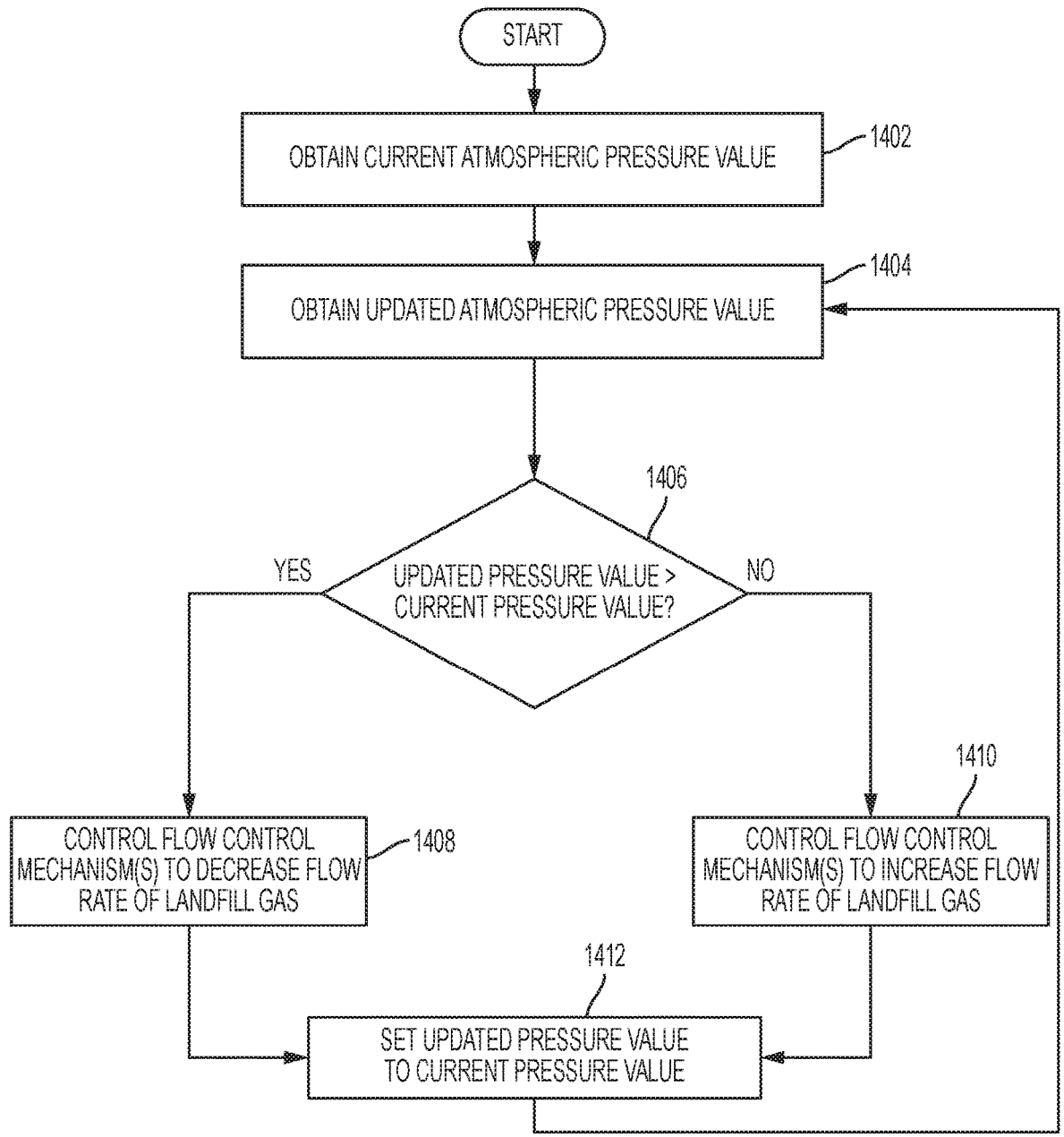
FIG. 14 is a flowchart of another illustrative process for controlling extraction of landfill gas through a gas extract system, according to some embodiments.

FIG. 14 is a flowchart of an illustrative process 1400 for controlling extraction of landfill gas through a gas extraction system based, at least in part, on atmospheric pressure measurements. Process 1400 may be performed by any suitable system and, for example, may be performed by control system 500 described herein with reference to FIG. 5. In some embodiments, the entirety of process 1400 may be performed by an in situ controller and, for example, may be performed by in situ controller 400 described herein with reference to FIG. 4. In some embodiments, one or more acts of process 1400 may be performed by an in situ controller (e.g., in situ controller 400) co-located with a flow-control mechanism (e.g., a valve) and one or more other acts of process 1400 may be performed by a remote controller (e.g., controller module 504).

Process 1400 begins at act 1402, where a measurement of atmospheric pressure may be obtained. This measured value (the "current atmospheric pressure" value) may be stored for subsequent comparison with one or more other atmospheric pressure measurements. In some embodiments, the measurement of atmospheric pressure may be obtained by using one or more of external sensors 203 (e.g., by an atmospheric pressure sensor) or in any other suitable way.

Next, at act 1404, another measurement of atmospheric pressure (the "updated atmospheric pressure" value) may be obtained. This measurement may be obtained after a threshold amount of time (e.g., at least 1 minute, at least 2 minutes, at least 5 minutes, at least 10 minutes, at least 30 minutes, at least 1 hour, at least 5 hours, at least 1 day, at least one week, and/or any suitable threshold in the 1 minute-1 week range). The updated atmospheric pressure value may be compared to the current atmospheric pressure value at decision block 1406.

When it is determined that the updated atmospheric pressure value is greater than the current atmospheric pressure value, process 1400 proceeds, via the YES branch, to act 1410 where one or more flow control mechanism(s) are controlled to increase the flow rate of gas. For example, in some embodiments, a single flow control mechanism (e.g., a valve) may be controlled to increase the flow rate of landfill gas (e.g., by opening the valve to a greater degree). In some embodiments, multiple flow control mechanisms (at a same site or different sites in a landfill) may be controlled to reduce the flow rate of landfill gas. In some embodiments, a valve may be opened by a predefined increment, for example, by 5% or by any other suitable amount. In some embodiments, a flow control mechanism may be controlled by an in situ and/or a remote controller by receiving one or more control signals from the in situ controller and/or the remote controller.

On the other hand, when it is determined that the updated atmospheric pressure value is not greater than the current atmospheric pressure value, process 1400 proceeds, via the NO branch, to act 1408 where one or more flow control mechanism(s) are controlled to decrease the flow rate of gas. For example, in some embodiments, each of one or more valves may be controlled (e.g., by receiving one or more control signals from one or more controllers) to close to a greater degree (e.g., by a predefined increment of any suitable size or in any other suitable way) in order decrease the flow rate of landfill gas being extracted.

After one of acts 1408 and 1410 is performed, the current atmospheric pressure value is changed to be the updated atmospheric pressure value, and process 1400 returns to act 1404, where a new updated atmospheric pressure measurement is obtained. Thereafter, decision block 1406 and acts 1408, 1410, and 1412 may be repeated. In this way, process 1400 may involve iteratively increasing and/or decreasing the flow rate of gas (e.g., by opening and/or closing one or more valves) based on atmospheric pressure changes.

It should be appreciated that process 1400 is illustrative and that there are variations. For example, in some embodiments, the techniques for controlling the extraction of landfill gas based on changes in atmospheric pressure may do so subject to one or more constraints on the concentration(s) of one or more other gases (e.g., nitrogen and/or oxygen). Limits on concentration of such gases may be imposed by landfill operators, pipeline operators, local regulations, state regulations, and/or federal regulations. Accordingly, in some embodiments, process 1400 may further include steps to measure concentrations of nitrogen (e.g., by inferring nitrogen concentration as the concentration of balance gas by using measured concentrations of oxygen, methane, and carbon dioxide) and/or oxygen (e.g., using an oxygen sensor).

In turn, at decision block 1406, process 1400 may proceed to act 1410 to increase the flow rate of landfill gas only when it is determined both that there is a decrease in atmospheric pressure and the concentration of nitrogen or oxygen is less than a respective threshold (e.g., 2.5% by volume for nitrogen, 5.0% by volume for oxygen). Similarly, at decision block 1406, process 1400 may proceed to act 1408 to decrease the flow rate of landfill gas when it is determined that either there is an increase in atmospheric pressure or that the nitrogen (or oxygen) concentration is greater than its respective threshold.

Site-Level Landfill Gas Extraction Control

Landfill gas collected from multiple different extraction wells in a landfill is aggregated at a gas output. For example, the gas output may be a power plant that uses the aggregated landfill gas to generate electricity. In another example, the gas output may be a processing plant where landfill gas collected from the extraction wells undergoes treatment. The inventors have recognized that the power plant may require the aggregated landfill gas to have a certain energy content in order to process the aggregate landfill gas instead of flaring it. Accordingly, the inventors have developed a control system that concurrently controls extraction of landfill gas from multiple wells based on a target energy content for the gas output (e.g., power plant, treatment plant). The multiple wells may each have a valve disposed in well piping coupled to the well that modulates a flow rate of landfill gas being extracted from the well. In some embodiments, the control system may obtain a value indicating a measured energy content of landfill gas collected at the gas output, and determine whether the measured energy content is different from a target energy content. In response to determining that the measured energy content is different from the target energy content, the control system may control the valves disposed in the well piping to control flow rates of landfill gas being extracted from the multiple wells. The controller may change the degree to which each of the valves is open to change the flow rates.

In some embodiments, energy content of landfill gas or other fuel may indicate an amount of energy per unit of volume or mass of the landfill gas or other fuel. When energy content of landfill gas or other fuel indicates an amount of energy per unit volume of the gas or fuel, the energy content may be referred to as "energy density". Some embodiments of the technology described herein involve controlling gas extraction using energy content (e.g., based on measured and target energy content), which encompasses controlling gas extraction using energy content per unit volume (energy density), energy content per unit of mass, or any other suitable measure of energy content. In some embodiments, using energy content for controlling gas extraction may involve obtaining a measure of energy content of landfill gas, comparing the measure of energy content against a target energy content in the landfill gas, and controlling one or more valves in the landfill gas extraction system based on results of the comparison (e.g., based on the difference between the measured and target energy content).

The inventors have recognized that landfill gas collected at a gas output may be required to meet threshold levels of quality for subsequent use. For example, a power plant that uses the collected landfill gas may require that the landfill gas have energy content within a range of energy content. If the energy content of the collected landfill gas is outside of the specified range, the power plant may be unable to use the extracted landfill gas, and the gas may need to be flared. Accordingly, the inventors have developed a control system for performing error recovery in a situation that the landfill gas collected at the gas output does not meet a target range of energy content. In some embodiments, the control system obtains a value indicating a measured energy content of the landfill gas collected at the gas output from multiple wells. The system determines whether the measured energy content is within the target range of energy content. In the case that the measured energy content is outside of the target range of energy content, the control system controls multiple valves disposed in well-piping to change flow rates of landfill gas being extracted from the wells. The control system may change the degree to which each of the valves is open to change the flow rates.

The inventors have recognized that the quality of landfill gas extracted from a gas extraction well is affected by a variety of different factors. By way of example and not limitation, such factors may include changes in barometric/ambient pressure, changes in ambient temperature, precipitation, and changes in pressure of a vacuum source. Furthermore, extraction from an individual well may have to be adjusted such that landfill gas aggregated from multiple wells meets certain standards (e.g., energy content standards, balance gas limits, etc.). Accordingly, the inventors have developed a system for controlling extraction of landfill gas from a gas extraction well based on multiple factors. In some embodiments, the system has a controller that determines one or more control variables based on measurements of change in pressure of a vacuum source, change in barometric pressure outside of the landfill, change in ambient temperature outside of the landfill, and/or a quality of aggregated landfill gas from multiple wells. The system then controls a flow control mechanism (e.g., a valve) to adjust a flow rate of landfill gas being extracted from the gas extraction well based on the control variable(s).

Figure 15:
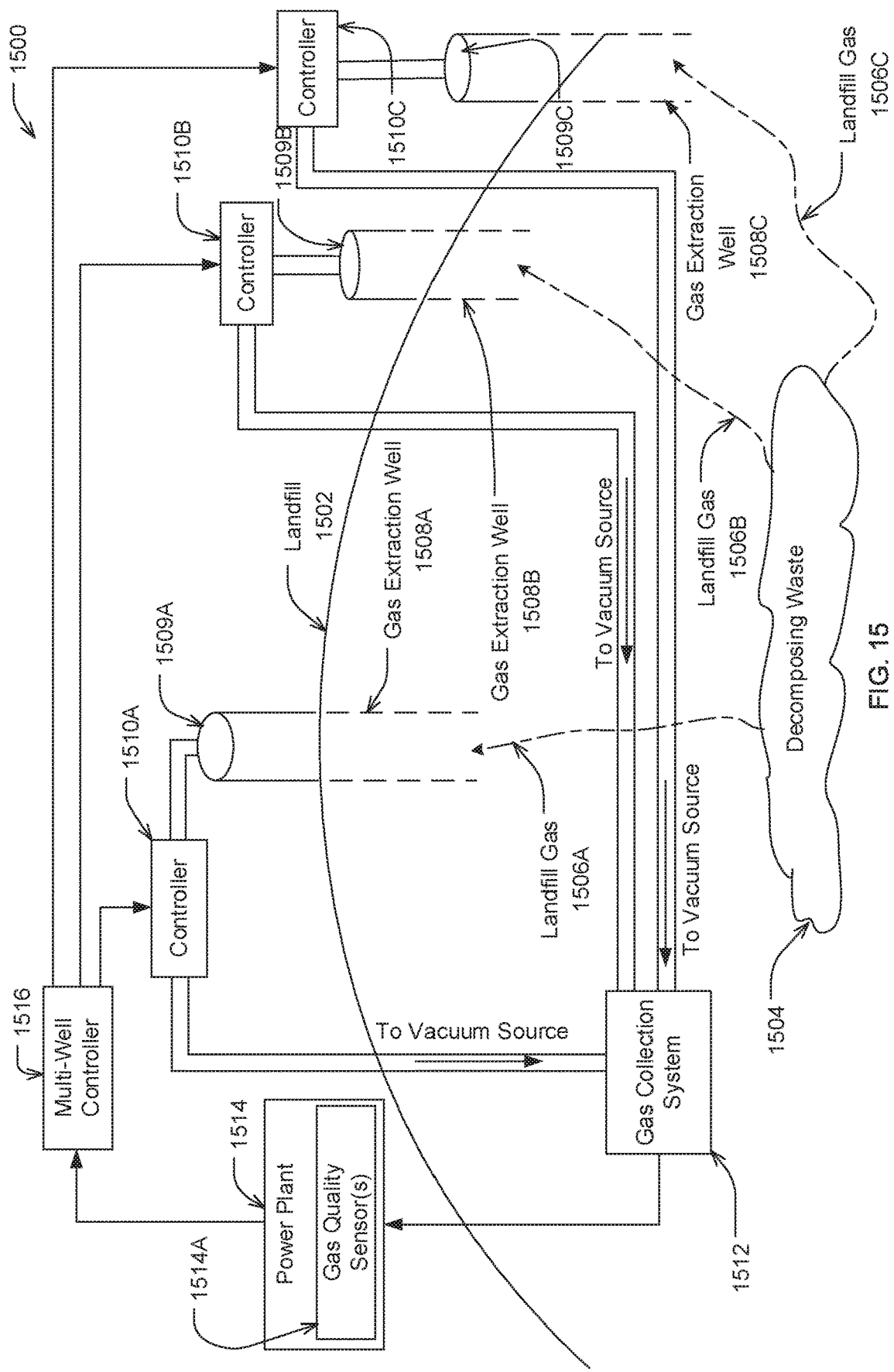
FIG. 15 is an example of a landfill gas extraction system, according to some embodiments.

FIG. 15 illustrates an example environment 1500 in which aspects of the technology described herein may be implemented. The environment 1500 includes a landfill 1502, which holds decomposing waste 1504. The decomposing waste 1504 produces landfill gas (LFG) 1506A-C which flows out from the landfill 1502 through gas extraction wells 1508A-C. A gas extraction well may also be referred to herein as a "well." The gas extraction wells 1508A-C include respective wellheads 1509A-C. Each of the gas extraction wells 1508A-C is coupled to a respective one of the controllers 1510A-C through the wellhead of the gas extraction well. Each of the controllers 1510A-C may be configure to locally control extraction of gas from the gas extraction well that the controller is coupled to. A controller coupled to a particular well may be referred to herein as a "local controller." A gas collection system 1512 collects the landfill gas extracted from the wells 1508A-C. The gas collection system 1512 supplies the extracted landfill gas to a power plant 1514. The power plant 1514 may be communicatively coupled to a multi-well controller 1516. The multi-well controller 1516 is communicatively coupled to the controllers 1510A-C associated with wells 1508A-C. The multi-well controller 1516 receives, from the power plant 1514, information indicating gas quality of landfill gas aggregated from the wells 1508A-C. The multi-well controller 1516 uses the information to feed control inputs to the local controllers 1510A-C to globally control extraction of landfill gas at the wells 1508A-C. It should be appreciated that although three wells are shown in FIG. 15, this is by way of example and not limitation, as a site may include any suitable number of wells (e.g., at least 10, at least 50, at least 100, at least 250, between 50 and 1000 wells).

In some embodiments, the gas collection system 1512 includes a vacuum source. The vacuum source generates a negative pressure differential between the gas collection system 1512 and the landfill 1502. The negative pressure differential causes the landfill gas 1506A-C to flow from the landfill 1502 to the gas collection system 1512 through the wells 1508A-C. In some embodiments, the gas collection system 1512 may comprise an additional location where extracted landfill gas is stored, and/or where the extracted landfill gas may be treated (e.g., by removing impurities) before being supplied to the power plant 1514. In some embodiments, the gas collection system 1512 may include a processing plant where the collected landfill gas is treated. The landfill gas may be treated to modify concentration(s) of one or more of the gases that make up the landfill gas. In some embodiments, the processing plant may be configured to treat the landfill gas to increase an energy content of the landfill gas. For example, the landfill gas may include methane, oxygen, carbon dioxide, hydrogen sulfide, nitrogen, and other gases. The processing plant may reduce the concentration(s) of one or more non-methane gases to increase energy content (e.g., energy density) of the collected landfill gas. The power plant 1514 may be configured to generate electricity using the extracted landfill gas. For example, the power plant 1514 may burn the extracted landfill gas to turn a rotor of an electricity generator or a turbine. Although the gas collection system 1512 and the power plant 1514 are shown separately in FIG. 15, in some embodiments, the gas collection system 1512 and the power plant 1514 may be components of a single system.

The power plant 1514 includes one or more sensors 1514A which the power plant may use to determine one or more measures of quality of extracted landfill gas. The landfill gas may be collected from multiple wells at the landfill 1502, such as wells 1508A-C. In some embodiments, the sensor(s) 1514A may be configured to measure an energy content (e.g., energy density) of collected landfill gas. For example, the sensor(s) 1514A may include a gas chromatograph that measures concentrations of one or more of the gases that make up the collected landfill gas, and uses the concentration(s) to calculate content of energy in the collected landfill gas. For example, the gas chromatograph may determine a concentration of methane in the collected landfill gas and use it to calculate the energy content. The multi-well controller 1516 may receive one or more values indicating the measured quality of collected landfill gas. In some embodiments, the multi-well controller 1516 may receive a value indicating a measured energy content (e.g., energy density) of the collected landfill gas.

In some embodiments, each of the local controllers 1510A-C controls extraction of landfill gas locally at a respective one of the gas extraction wells 1508A-C. The controller may be configured to operate to control extraction of landfill gas to achieve a desired target of energy content of extracted landfill gas, composition of extracted landfill gas, flow rate of gas extraction, regulatory requirements, and/or other parameters. In some embodiments, the controller may be configured to control a flow rate of landfill gas being extracted from the well. For example, the controller may be configured to control a position of a valve disposed in well-piping of the well which in turn modulates a flow rate of landfill gas being extracted from the well. Example operation of a controller is described above with reference to FIGS. 1-3. A local controller may also be referred to herein as an "in-situ control mechanism."

In some embodiments, the multi-well controller 1516 controls extraction of landfill gas globally across multiple gas extraction wells, including the gas extraction wells 1508A-C. In some embodiments, the multi-well controller 1516 may be configured to concurrently control extraction of landfill gas from multiple wells. Concurrently controlling extraction of landfill gas from multiple wells involves causing an adjustment in a valve at a first well during a first time period, and in a valve at a second well during a second time period that at least partially overlaps with the first time period. The multi-well controller 1516 may receive one or more values indicating one or more measures of gas quality of landfill gas aggregated from multiple wells. In some embodiments, the multi-well controller 1516 may be configured to receive value(s) indicating measured energy content of collected landfill gas. The multi-well controller 1516 may control the controllers at 1510A-C based on the measured energy content. In some embodiments, the multi-well controller 1516 may be configured to determine whether the measured energy content meets a target energy content and/or is within a target range of energy content. In response to determining that the measured energy content does not meet the target energy content or is outside the target range of energy content, the multi-well controller may adjust flow rates of landfill gas being extracted from the wells 1508A-C. The multi-well controller 1516 may transmit one or more control inputs to the controllers 1510A-C to adjust the flow rates.

In some embodiments, each of the controllers 1510A-C may include a valve whose position controls a flow rate of landfill gas being extracted from a respective well. The multi-well controller 1516 may control the positions of the valves of the controllers 1510A-C to control, globally, flow rates of landfill gas being extracted from the wells 1508A-C. In some embodiments, the multi-well controller 1516 may be configured to control the positions of the valves of the controllers 1510A-C by transmitting a control variable to each of the controllers 1510A-C. Each of the controllers 1510A-C uses the control variable to determine an adjustment to make to the degree that the valve being controlled by the controller is open. In some embodiments, the multi-well controller 1516 may transmit a valve position adjustment to each of the controllers 1510A-C. The controllers 1510A-C may be configured to apply the received adjustment to the respective valves.

In some embodiments, each of the local controllers 1510A-C that control landfill gas extraction locally may incorporate input from the multi-well controller 1516. For example, a local controller may determine one or more adjustments to make to a position of a valve based on a value of a control variable received from the multi-well controller 1516. Additionally or alternatively, in some embodiments, a local controller may determine other adjustments to the valve locally based on input provided from sources other than the multi-well controller 1516. The local controller may be configured to use one or more locally determined measures of characteristics of landfill gas being gas extracted from a respective well to determine adjustments. For example, the local controller may determine adjustments based on energy content and/or concentration of methane in landfill gas being extracted from the well. In some embodiments, the local controller may be configured to control flow rate of landfill gas being extracted from the well using measures of conditions outside of the well. For example, the local controller may use measured or predicted changes in ambient temperature, changes in barometric pressure, and/or changes in vacuum pressure to control the flow rate.

In some embodiments, each of the controllers 1510A-C may be configured to incorporate input received from the multi-well controller 1516 to determine control adjustments. For example, the controller may use a value of a control variable received from the multi-well controller 1516 and one or more values of locally determined control variables to determine an adjustment that is to be applied to a valve of the controller. Techniques by which a controller locally controls extraction of landfill gas are discussed herein.

In some embodiments, the multi-well controller 1516 may comprise at least one computer. The at least one computer may communicate with the controllers 1510A-C. In some embodiments, the multi-well controller 1516 may be configured to periodically transmit one or more control inputs to the controllers 1510A-C. In some embodiments, the multi-well controller 1516 may wirelessly transmit the control input(s) to the controllers 1510A-C. In some embodiments, the multi-well controller 1516 may communicate with the controllers 1510A-C over wired connections.

Figure 16:
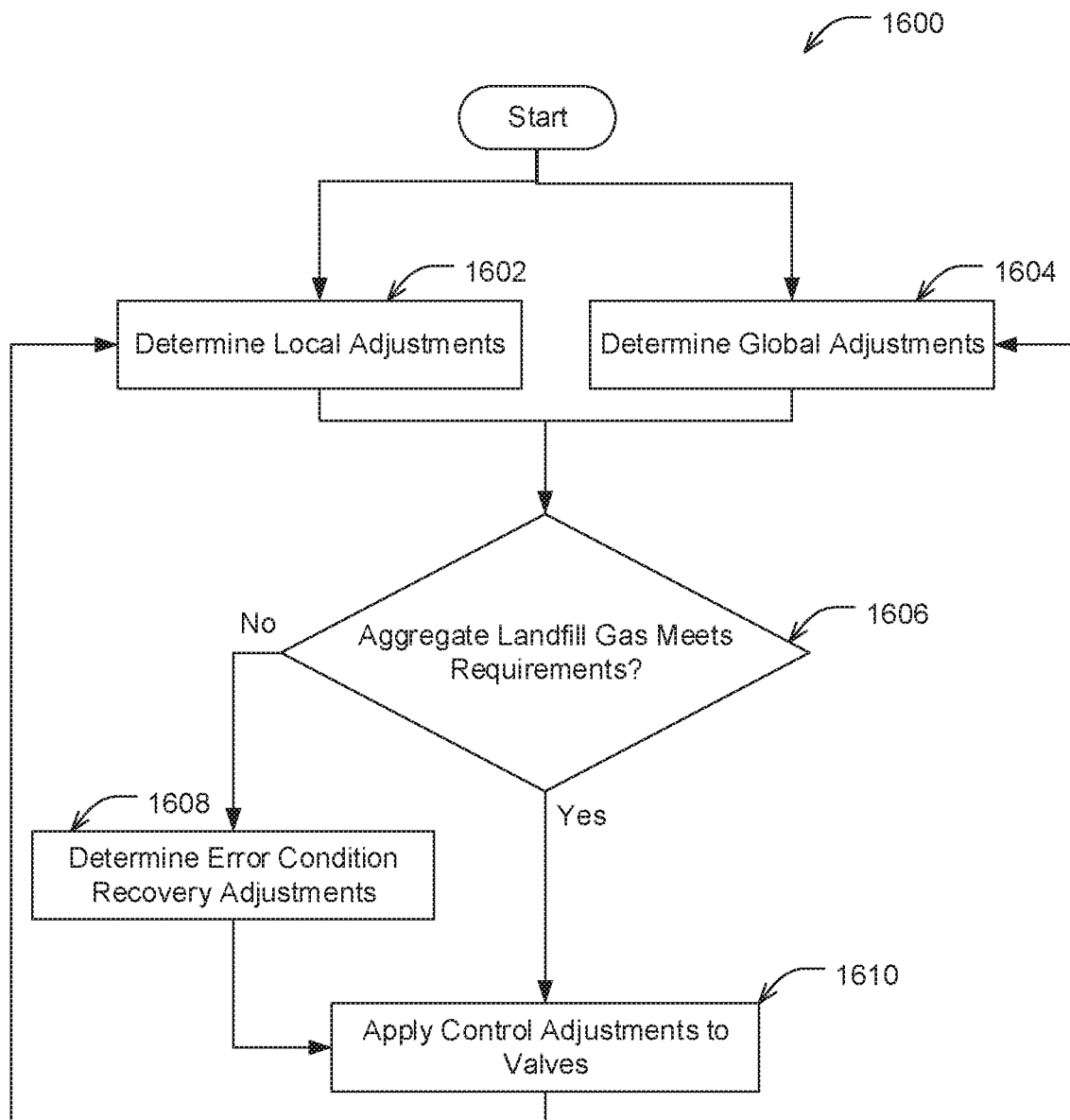
FIG. 16 is a flowchart of an illustrative process for controlling extraction of landfill gas from multiple gas extraction wells, according to some embodiments.

FIG. 16 is a flowchart of an illustrative process 1600 for controlling extraction of landfill gas from multiple gas extraction wells. Process 1600 may be performed at least in part by using multi-well controller 1516 and multiple local controllers 1510A-C discussed above with reference to FIG. 15.

Process 1600 begins at acts 1602 and 1604 where local adjustments are determined by local controllers, and global adjustments are determined by the multi-well controller.

In some embodiments, each of multiple local controllers determines one or more adjustments to apply to a flow control mechanism disposed in piping of a well that the local controller is configured to control. The flow control mechanism may be a valve disposed in well piping of the well. The position of the valve may determine a flow rate of landfill gas being extracted from the well. A local controller may be configured to determine local adjustments based on one or more factors. The factor(s) may include characteristics of landfill gas being extracted from the landfill, conditions of an environment inside the landfill, conditions of an environment outside of the landfill, a vacuum pressure, and/or other information. In some embodiments, each of the local controllers may be configured to (1) obtain measurements of the factor(s), (2) use the measurements to determine values to determine the adjustment(s) using the measurements.

In some embodiments, the multi-well controller determines one or more global adjustments that are to be applied at multiple wells. The multi-well controller may be configured to obtain one or more values indicating one or more measures of quality of landfill gas collected from the multiple wells, and determine the global adjustment(s) based on the measure(s) of gas quality. In some embodiments, the multi-well controller may be configured to obtain a value indicating a measured energy content of the collected landfill gas. The multi-well controller may be configured to determine whether the measured energy content matches a target energy content. When the multi-well controller determines that the measured energy content does not match the target energy content (or is outside a specified range of energy content), the multi-well controller may determine a global adjustment to apply to multiple valves disposed in well-piping of wells to change flow rates of landfill gas being extracted from the wells.

Next, process 1600 proceeds to act 1606, where it is determined whether landfill gas aggregated from the multiple wells meets target requirements. In some embodiments, the requirements may include a range of energy content that the aggregated landfill gas must meet in order to be utilized for an intended function. For example, the aggregated landfill gas may be required to have an energy content within a particular range in order for a power plant to use the landfill gas to generate electricity. In another example, the aggregated landfill gas may be required to meet regulatory or government standards of gas composition.

If at act 1606 it is determined that the aggregated landfill gas does meet the requirements, then process 1600 proceeds to act 1610, where the local and global control adjustments determined at acts 1602 and 1604 are applied to the valves that control flow rates of landfill gas through the wells. In some embodiments, the local controllers may combine the local adjustment(s), and global adjustment(s) to obtain a single final adjustment that is applied to a respective valve.

For example, the local adjustments and global adjustments may be combined (e.g., via a sum, a weighted sum, etc.) to obtain a final adjustment to apply to the valve. In some embodiments, the local controller may be configured to command movement of an actuator to adjust the degree to which the valve is open. For example, the controller may modulate a throttle that causes the actuator to change the position of the valve.

If at act 1606 it is determined that the aggregated landfill gas does not meet the requirements, then process 1600 proceeds to act 1608 where the multi-well controller determines error condition recovery adjustments to apply globally. In some embodiments, the error condition adjustments may override or take precedence over local adjustments and/or global adjustments determined at acts 1602 and 1604 to insure that the aggregated landfill gas meets requirements of use. For example, the error condition adjustments may be a default change in position to apply to all the valves to change a quality of landfill gas being extracted such that the collected landfill gas meets the requirements.

After determining the error condition adjustments, process 1600 proceeds to act 1610 where the error condition adjustments are applied to the valves. In some embodiments, the local controllers may receive the error condition adjustments from the multi-well controller. The local controllers may be configured to apply the error condition recovery adjustments. For example, each local controller commands movement of an actuator to adjust the position of the valves according to the received error condition recovery adjustments. In some embodiments, the local controllers may be configured to receive a signal indicating an error recovery condition. In response, the local controllers may apply received signal to control the degree to which a respective valve is open.

Figure 17:
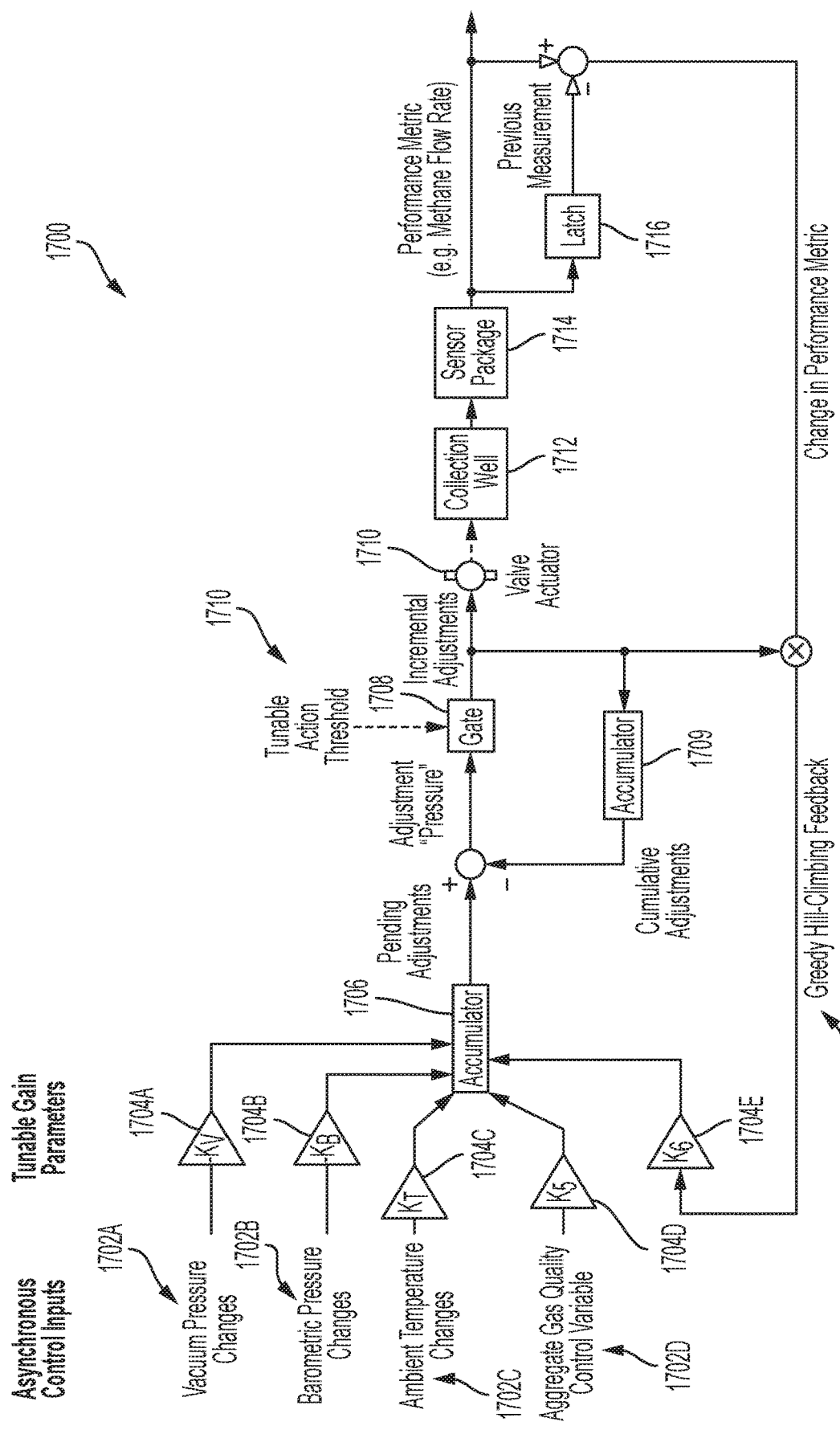
FIG. 17 is a block diagram of an illustrative control system for locally controlling flow of landfill gas at a gas extraction well, according to some embodiments.

FIG. 17 shows a block diagram of a control system 1700 for locally controlling flow of landfill gas at a gas extraction well. In some embodiments, the control system 1700 may be implemented, in part, by one or more local controllers 1510A-C described above with reference to FIG. 15.

In the illustrated embodiment, the system 1700 obtains control variables 1702A-E and applies respective gains 1704A-E to the control variables 1702A-E to obtain respective adjustments for each of the control variables. The control variables 1702A-E may be used as control inputs by the system 1700. The system 1700 includes an accumulator 1706 which combines and accumulates the adjustments. The system 1700 includes a gate 1708, which prevents application of the adjustments until a threshold adjustment pressure 1710 is reached. The threshold pressure 1710 may be a minimum magnitude of adjustment required to trigger application of the adjustment by the system 1700. Once the pending adjustments reach the threshold 1710, the pending adjustments are applied to a valve actuator 1711 which then causes the position of a valve disposed in piping of a collection well 1712 to change.

In some embodiments, an adjustment to a valve may be specified in terms of a degree to which a valve is to be opened or closed. For example, the adjustment may be a percentage change in position of the valve (e.g., 10% more open or closed). In another example, the adjustment may be an amount by which the valve position is to be changed (e.g., +/−5 degrees). In some embodiments, an adjustment may be an absolute position of the valve. For example, the adjustment may be a percentage specifying a particular position of the valve (e.g., 0-100% open). In another example, the adjustment may be a degree value specifying an absolute position of the valve (e.g., 0-180 degrees).

In the illustrated embodiment, the system 1700 includes a sensor package 1714 to obtain measurement(s) of one or more performance metrics. The system 1700 includes a latch 1716 for storing a previous measurement of the performance metric(s). The system 1700 compares a measurement of the performance metric(s) taken after application of an adjustment to a measurement of the performance metric(s) taken prior to the application of the adjustment. The result of the comparison is used as feedback control input 1702E. In some embodiments, a performance metric may be an energy content of landfill gas being extracted from the collection well 1712, a concentration of methane in the landfill gas being extracted from the collection well 1712, and/or a flow rate of landfill gas being extracted from the collection well 1712.

In the illustrated embodiment, the system 1700 includes a second accumulator 1709 which accumulates adjustments that have been applied to the valve actuator 1711. The applied adjustments that have been accumulated by the accumulator 1709 are subtracted from pending adjustments such that the adjustments may be applied in discrete increments. For example, if a pending adjustment of 5 degrees meets the action threshold 1710, and is applied to the valve actuator 1711, the 5 degree adjustment that is applied to the valve actuator 1711 is tracked by the accumulator 1709. In a subsequent control cycle, the pending adjustment value may remain at 5 degrees. The previous 5 degree adjustment tracked by the accumulator 1709 is subtracted from the pending adjustment value such that the adjustment pressure is 0. Accordingly, no additional adjustment is applied to the valve actuator 1711. This allows pending adjustments to be applied in discrete increments such that an effect of an applied adjustment can be measured by the sensor package 1714.

In some embodiments, the system 1700 may be configured to use a measured change in vacuum pressure 1702A as a control input. The change in vacuum pressure 1702A may indicate a change in a pressure differential between a gas output and the landfill. The pressure differential causes landfill gas to flow from the landfill to the gas output through collection well 1712. The system 1700 may apply a tunable gain parameter $(-K_V)$ 1704A to the measured change in vacuum pressure. If the pressure differential decreases by a certain amount, the system may obtain an adjustment to reduce a flow rate of landfill gas being extracted from the collection well 1712. For example, the adjustment may be one that results in closing the valve further. If the pressure differential increases by a certain amount, the system may obtain an adjustment to increase a flow rate of landfill gas being extracted from the collection well 1712. For example, the adjustment may be opening the valve further.

In some embodiments, the system 1700 may be configured to use a measured change in barometric pressure 1702B as a control input. The change in barometric pressure may be measured over a period of time. An increase in barometric pressure over the period of time may increase a pressure differential between the landfill and air outside of the landfill. As a result, more air may permeate into the landfill and affect composition of landfill gas being extracted from the landfill. In some instances, this may result in decreased concentration of methane in the land fill gas which results in the landfill gas having a lower energy content. The system may apply a gain parameter $(-K_B)$ 1704B to the measured change in barometric pressure. If there is a positive change in barometric pressure, the system may determine a corresponding adjustment to reduce a flow rate of landfill gas being extracted from the well 1712 to mitigate effects of the rise in pressure. If there is a negative change in barometric pressure, the system may determine a corresponding adjustment to increase a flow rate of landfill gas being extracted from the well 1712.

In some embodiments, the system 1700 may be configured to continuously obtain measurements of the barometric pressure. In some embodiments, the system 1700 may be configured to obtain a measurement every 1 minute, 2 minutes, 3 minutes, 4 minutes, 5 minutes, 6 minutes, 7 minutes, 8 minutes, 9 minutes, or 10 minutes. In some embodiments, the system 1700 may be configured to calculate a running average rate of change of barometric pressure. In some embodiments, the system 1700 may be configured to determine whether the magnitude of the calculated rate of change of the barometric pressure is greater than a threshold rate of change. In response to determining that the magnitude of the calculated rate of change is greater than the threshold rate of change, the system 1700 may trigger a response to the change in barometric pressure. If there is a positive change in the rate of change of the barometric pressure, the system may determine a corresponding adjustment to reduce a flow rate of landfill gas being extracted from the well 1712 to mitigate effects of the rise in pressure. If there is a negative change in the rate of change of the barometric pressure, the system may determine a corresponding adjustment to increase a flow rate of landfill gas being extracted from the well 1712.

In some embodiments, the threshold rate of change may be 0.05 mbar/hour, 0.1 mbar/hour, 0.15 mbar/hour, 0.2 mbar/hour, 0.25 mbar/hour, 0.3 mbar/hour, 0.35 mbar/hour, 0.4 mbar/hour, 0.5 mbar/hour 0.55 mbar/hour, 0.6 mbar/hour, 0.65 mbar/hour, 0.7 mbar/hour, 0.75 mbar/hour, 0.8 mbar/hour, 0.85 mbar/hour, 0.9 mbar/hour, 0.95 mbar/hour, or 1 mbar/hour.

In some embodiments, the system 1700 may be configured to use a measured change in ambient temperature 1702C as a control input. When an ambient temperature outside of the landfill decreases by a certain amount, the permeability of a covering placed over the landfill may increase. As a result, additional air from the atmosphere around the landfill may enter the landfill and affect composition of the landfill gas being extracted. For example, a concentration of methane in the landfill gas being extracted may be reduced, which results in reduced energy content of the landfill gas being extracted. The system 1700 may be configured to apply a gain parameter ($K_T$) 1704C to the measured change in ambient temperature. If the ambient temperature decreases over a period of time, the system may obtain a corresponding adjustment that reduces a flow rate of landfill gas from the well 1712 to mitigate effects of the drop in temperature. If the ambient temperature increases, the system may obtain a corresponding adjustment to increase a flow rate of landfill gas being extracted from the well 1712.

In some embodiments, the system 1700 may be configured to use an aggregate gas quality control variable 1702D. The aggregate gas quality control variable may be obtained from a multi-well controller that determines global adjustments to be applied to multiple gas extraction wells at a landfill. The aggregate gas quality control variable may be determined as described below with reference to FIG. 18. The system 1700 may apply a gain parameter ($K_S$) 1704D to the aggregate gas quality control variable 1702D. The system may determine an adjustment to increase the flow rate of landfill gas being extracted from the well 1712 in response to more positive values of the control variable, and an adjustment to decrease the flow rate of landfill gas being extracted from the well 1712 in response to more negative values of the control variable.

In some embodiments, the system 1700 may be configured to use a feedback control input 1702E determined based on a measured effect of one or more applied adjustments. In some embodiments, the system may be configured to implement a greedy hill climbing feedback input. The system 1700 may multiply a measured effect of the performance metric(s) of an applied adjustment by the applied adjustment. If the applied adjustment resulted in a negative effect on the performance, the feedback 1704E will be an opposite of the applied adjustment. For example, if an applied adjustment of +1 degrees resulted in a −2% decrease in concentration of methane, the value of the feedback input 1702E will be −2 which is in the opposite direction of the applied adjustment. Conversely, if the applied adjustment resulted in a positive effect on the performance, the feedback 1704E will continue in a direction of the applied adjustment. For example, if an applied adjustment of +1 degrees results in a +2% increase in concentration of methane, the value of the feedback input 1702E will be 2. The system 1700 may apply a gain parameter ($K_G$) 1704E to the feedback 1702E.

In some embodiments, the system 1700 may be configured to use a predicted change in barometric pressure as a control input. An increase in barometric pressure may affect landfill gas being extracted from the well 1712. Using predicted changes in barometric pressure may allow the system 1700 to bias a flow of landfill gas to mitigate effects of future actual changes in barometric pressure on landfill gas being extracted from the well 1712. The system 1700 may apply a gain parameter to a predicted change in barometric pressure. If the system obtains a predicted increase in barometric pressure, the system may obtain a corresponding adjustment to decrease a flow rate of landfill gas being extracted from the well 1712. If the system obtains a predicted decrease in barometric pressure, the system may obtain a corresponding adjustment to increase a flow rate of landfill gas being extracted from the well 1712.

In some embodiments, the system 1700 may be configured to use a predicted change in ambient temperature as a control input. As described above, a change in ambient temperature may affect landfill gas being extracted from the well 1712. Using predicted changes in ambient temperature may allow the system 1700 to bias the flow of landfill gas to mitigate effects of future changes in the ambient temperature on the landfill gas being extracted from the well 1712. The system 1700 may apply a gain parameter to a predicted change in ambient temperature. If the system obtains a predicted increase in ambient temperature pressure, the system may obtain a corresponding adjustment to increase a flow rate of landfill gas being extracted from the well 1712. If the system obtains a predicted decrease in ambient temperature, the system may obtain a corresponding adjustment to decrease a flow rate of landfill gas being extracted from the well 1712.

In some embodiments, the system 1700 may use other control inputs in addition to or instead of those illustrated in FIG. 17. In some embodiments, the system 1700 may be configured to use a value indicating a measured current precipitation and/or predicted precipitation outside of the landfill as a control input. A change in precipitation may affect landfill gas being extracted from the landfill. For example, the value may indicate a measured amount of precipitation (e.g., inches) and/or a type of precipitation (e.g., snow, rain, hail). Some embodiments are not limited to any particular set of control inputs. Some embodiments may use any combination of control inputs discussed herein.

In some embodiments, the system 1700 may be configured to obtain values of one or more control inputs using local sensors. For example, values of control inputs 1702A-C may be obtained using sensors that are part of the control system. In some embodiments, the system 1700 may be configured to receive values of one or more control inputs from an external system. For example, the system 1700 may access barometric pressure changes, ambient temperature changes, forecasted barometric pressure changes, and forecasted ambient temperature changes from a computer separate from the system 1700.

In some embodiments, the gain parameters used by the system may be tunable. Different wells may react differently to various changes. The gain parameters may be tuned based on unique characteristics of the well 1712. For example, methane concentration in landfill gas being extracted from a first well may be more sensitive to changes in flow rate than landfill gas being extracted from a second well. Each well may have a set of gain parameters that have been tuned for the well. In some embodiments, gain parameters at each well may be tuned to maximize performance at the well. In some embodiments, gain parameters may be tuned such that effects of control inputs are uniform across different wells. In some embodiments, the gain parameters may be tuned manually or automatically.

In some embodiments, the system 1700 may utilize different gains for controlling the opening and closing of the valve. For example, a first set of one or more gains may be used for controlling opening of the valve and a second set of one or more gains may be used for controlling closing of the valve, with the first and second sets of gains being different from one another. For example, different vacuum pressure change gains $K_V$ may be used for controlling opening and closing a valve. Additionally or alternatively, different barometric pressure change gains $K_B$ may be used for controlling opening and closing a valve. Additionally or alternatively, different ambient temperature change gains $K_T$ may be used for controlling opening and closing a valve. Additionally or alternatively, different ambient temperature change gains $K_T$ may be used for controlling opening and closing a valve. Additionally or alternatively, different aggregate gas quality control gains $K_S$ may be used for controlling opening and closing a valve. Additionally or alternatively, different feedback gains $K_G$ may be used for controlling opening and closing a valve. Additionally or alternatively, different action thresholds 1710 may be used for controlling opening and closing a valve. Thus, it should be appreciated that different gains for any one or more of the gains $K_V$, $K_B$, $K_S$, $K_T$, $K_G$ and action thresholds may be used for controlling opening and closing of the valves.

In some embodiments, one or more of the gains for a valve may be based on how quickly the composition of gas flowing through a valve from a well changes as a result of a valve adjustment. When the composition of gas changes more rapidly in response to a valve adjustment operation (e.g., closing or opening), then the gain for that valve operation may be set to a lower value. When the composition of gas changes more slowly in response to a valve adjustment operation, then the gain for that valve operation may set to a higher value. For example, suppose that the composition of gas flowing through a valve from a well changes more rapidly in response to opening of a valve than to closing of the valve. In that situation, one or more gains of the valve may be set lower (e.g., a first gain) for the opening adjustment than for the closing adjustment (e.g., a second gain larger than the first gain).

In some embodiments, the system 1700 may include a gate 1708 that allows application of adjustments that meet a threshold 1710 level of adjustment. In some embodiments, the threshold 1710 may be tuned to adjust sensitivity of the system 1700 to adjustments. For example, a lower threshold 1710 will allow adjustments to be applied more frequently, and will allow application of finer adjustments. A higher threshold 1710 will limit frequency of adjustments applied, and will limit application to coarser adjustments. In some embodiments, the threshold 1710 may be tuned to balance stability of the system 1700 with precision of control. In some embodiments, the controller may have limited power resources, and the gate 1708 may moderate a frequency of application of adjustments to limit use of the power. For example, a controller may be powered by a solar panel which stores energy. The gate 1708 may limit application of adjustments to conserve the stored energy.

In some embodiments, the threshold 1710 may be a minimum percentage of change. For example, the threshold may be a magnitude of 1%, 2%, 3%, 5%, 10%, 15%, or 20%. In some embodiments, the threshold may be a particular number of degrees. For example, the threshold may be 1 degree, 2, 3, 5, 10, 15, 20, or 25 degrees.

In some embodiments, the system 1700 may be configured to maintain one or more limits of the position of the valve. The limit(s) may be referred to as "guard rails." The system 1700 may be configured to prevent adjustments to the position of the valve beyond the limit(s). In some embodiments, the system 1700 may prevent the valve from opening beyond a first limit and/or closing beyond a second limit. The limit may be a particular position of the valve. For example, the system 1700 may prevent the valve from opening beyond a position of 80 degrees. In another example, the system 100 may prevent the valve from closing more than a position of 5 degrees. In yet another example, the system 1700 may prevent the valve from opening beyond a position of 90% open. In yet another example, the system 1700 may not allow the valve to close beyond a position of 10% open.

In some embodiments, the system 1700 may be configured to maintain a threshold concentration of one or more of the gases that make up the landfill gas. In some embodiments, the system 1700 may be configured to determine if a measured concentration of oxygen in the landfill gas is above a maximum oxygen concentration. If the system 1700 determines that the measured concentration of oxygen is above the maximum oxygen concentration, the system 1700 may restrict a flow of landfill gas. For example, the system 1700 may prevent adjustments that further open the valve. In another example, the system 1700 may close the valve by a certain amount. In some embodiments, the system 1700 may be configured to determine if a measured concentration of nitrogen in the landfill gas is above a maximum nitrogen concentration. If the system 1700 determines that the measured concentration of nitrogen is above the maximum nitrogen concentration, the system 1700 may restrict a flow of landfill gas. For example, the system 1700 may prevent adjustments that further open the valve. In another example, the system 1700 may close the valve by a certain amount. In some embodiments, the system 1700 may be configured to determine if a measured concentration of methane in the landfill gas is above a maximum methane concentration. If the system 1700 determines that the measured concentration of methane is above the maximum methane concentration, the system 1700 may restrict a flow of landfill gas. For example, the system 1700 may prevent adjustments that further open the valve. In another example, the system 1700 may close the valve by a certain amount.

Figure 18:
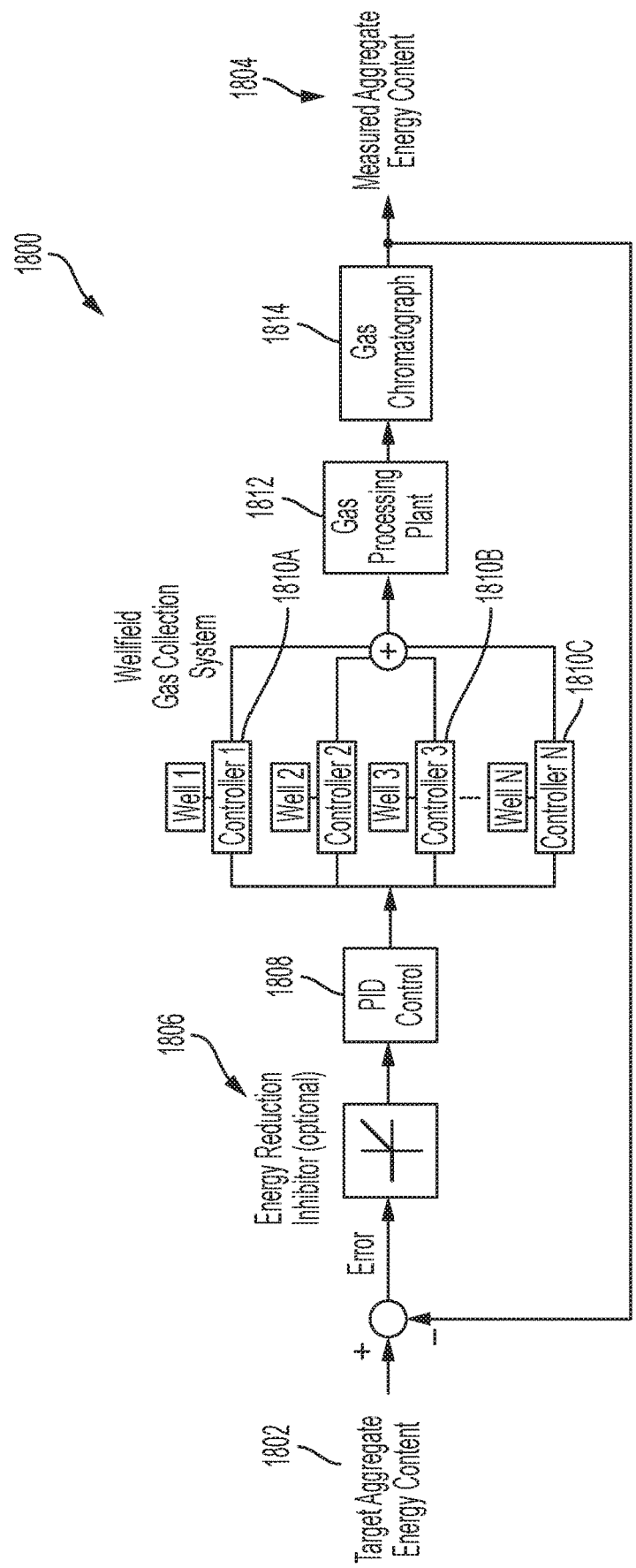
FIG. 18 is a block diagram of an illustrative control system for globally controlling flow of landfill gas at multiple gas extraction wells, according to some embodiments.

FIG. 18 shows a block diagram of a control system 1800 for globally controlling flow of landfill gas at multiple gas extraction wells. In some embodiments, the control system 1800 may be implemented by a multi-well controller 1516 described above with reference to FIG. 15.

In some embodiments, the system 1800 may be configured to determine a global adjustment to apply to valves at multiple gas extraction wells of a landfill. The system 1800 may obtain a target energy content 1802 of aggregated landfill gas being extracted from the multiple wells. In some embodiments, the target energy content 1802 may be in units of British thermal units per standard cubic foot (BTU/SCF). The system may determine an error between the target energy content 1802 and a measured energy content 1804 of aggregated landfill gas extracted from the wells. The system 1800 may obtain a value indicating the measured energy content 1804 from a gas chromatograph 1814. The system 1800 may determine an error between the target energy content 1802 and the measured energy content 1804. The error value is input into a proportional integral derivative (PID) controller 1808 to generate a global adjustment value. The value of the global adjustment may be transmitted to multiple local controllers 1810A-C coupled to respective wells. Each of the local controllers 1810A-C may use the global adjustment as a control variable in determining an adjustment to apply to a respective valve. For example, the global adjustment may be received as aggregate gas control variable 1702D by a local control system 1700 as described above with reference to FIG. 17. The local controller may apply a gain to the aggregate control variable to obtain a corresponding adjustment. In some embodiments, the local controller may not apply a gain value to the global adjustment and use a value directly as received from the multi-well controller.

In some embodiments, the system 1800 may be configured to transmit the determined global adjustment to the local controllers 1810A-C. In some embodiments, the system may be configured to transmit the global adjustment periodically. For example, the system may transmit the global adjustment every second, minute, every 15 minutes, every 30 minutes, or every hour. In some embodiments, the system 1800 may be configured to transmit the global adjustment to each of the local controllers 1810A-C in response to a request from the local controllers. For example, the system 1800 may receive a signal pinging the system 1800 for a value of the global adjustment. In response, the system 1800 may transmit the value of the global adjustment to a controller from which the signal was received.

In the illustrated embodiment, the landfill gas extracted from the multiple wells is collected at a gas processing plant 1812. In some embodiments, the gas processing plant may purify and/or filter the aggregated landfill gas. In some embodiments, the gas processing plant may be part of a power plant that uses the aggregated gas to generate electricity. The system 1800 then obtains a value indicating a measured energy content of the aggregated gas from a gas chromatograph 1814 based on which the system 1800 can calculate an error for a subsequent control cycle.

In some embodiments, the system 1800 may include a filter 1806 to inhibit error values that would result in reduction of energy content. For example, the filter may be a function max(0, Error) that filters out negative error values. The system 1800 may determine global adjustments to maintain a measured energy content 1804 that is above the target energy content 1802. In some embodiments, the system 1800 does not include the filter 1806. The system 1800 may input positive or negative error values into the PID controller 1808 for generating a global adjustment. The system 1800 may then determine global adjustments to such that the measured energy content 1804 tracks the target energy content 1802.

In some embodiments, the system 1800 may use a different type of controller in addition to or instead of a PID controller. For example, the system 1800 may use a proportional integral (PI controller). In another example the system 1800 may use proportional derivative (PD) controller. In yet another example, the system 1800 may apply a proportional gain to the error.

In some embodiments, the target energy content (e.g., target energy density) may be 930 BTU/SCF, 935 BTU/SCF, 940 BTU/SCF, 945 BTU/SCF, 950 BTU/SCF, 955 BTU/SCF, 955 BTU/SCF, 960 BTU/SCF, 965 BTU/SCF, 970 BTU/SCF, 975 BTU/SCF, 980 BTU/SCF, 985 BTU/SCF, or 990 BTU/SCF.

In some embodiments, the system 1800 may be configured to obtain the target energy content from a separate computer. For example, the system 1800 may receive the target energy content from a computer at a power plant. In some embodiments, the target energy content may be stored or programmed into a multi-well controller implementing the system 1800.

In some embodiments, the system 1800 may be configured to use a different target metric of gas quality in addition to or instead of energy content. In some embodiments, the system 1800 may be configured to obtain a target methane concentration of landfill gas being extracted from the wells. The system 1800 may obtain a value indicating a measured concentration of methane in landfill gas extracted from the wells. The system 1800 may then determine the error between the target methane concentration and the measured methane concentration.

Figure 19:
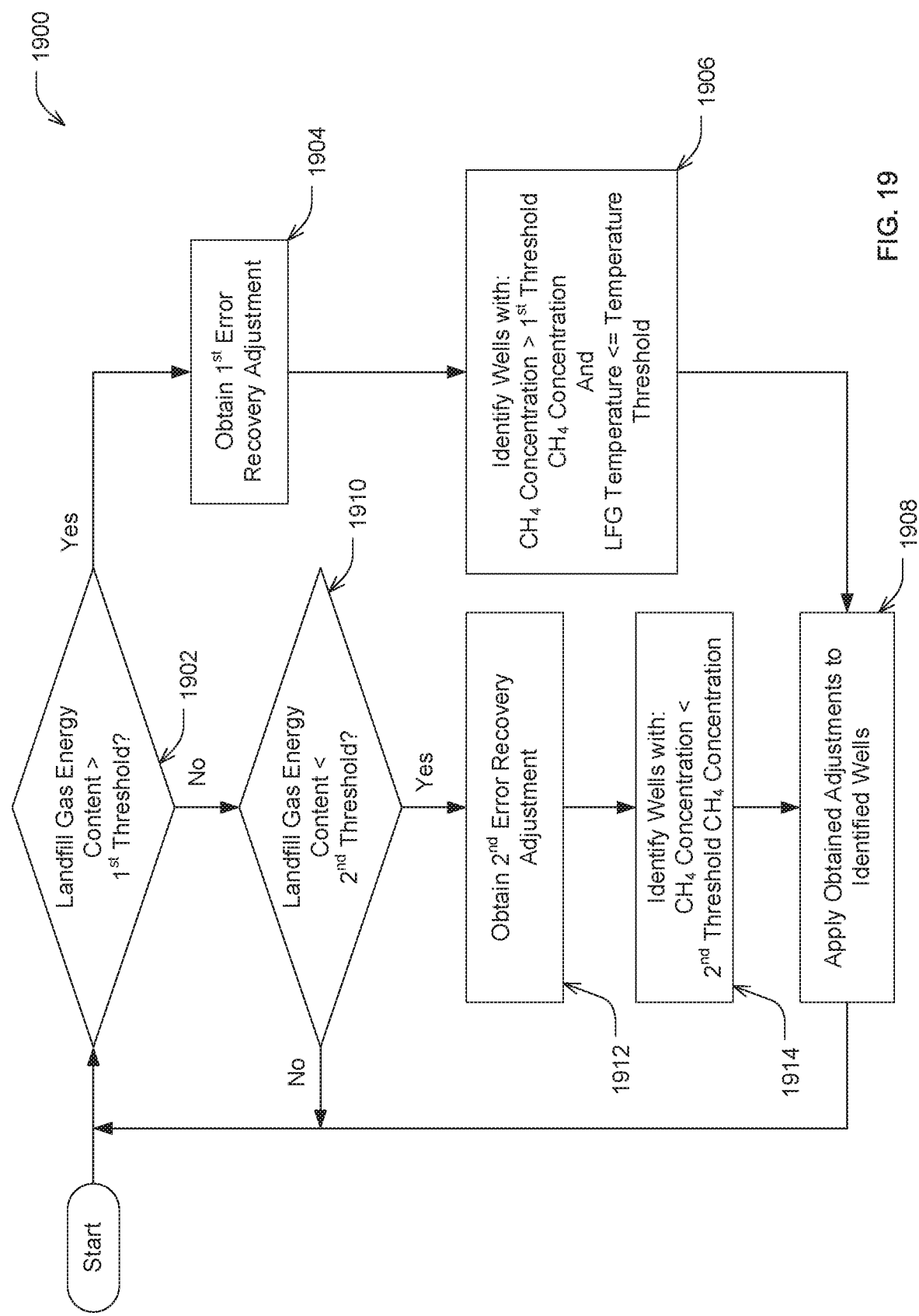
FIG. 19 is a flowchart of an illustrative process for performing global error recovery at multiple gas extraction wells, according to some embodiments.

FIG. 19 is a flowchart of a process 1900 for performing error condition recovery in a landfill gas extraction system. In some embodiments, process 1900 may be performed by multi-well controller 1516 discussed above with reference to FIG. 15.

Process 1900 begins at act 1902 where the system performing process 1900 determines whether energy content of landfill gas collected from multiple gas extraction wells is greater than a first threshold energy content. In some embodiments, the system may be configured to obtain a value indicating a measured energy content of the collected landfill gas. For example, the system may receive the value from one or more sensors of a power plant that received the collected landfill gas. In some embodiments, the system may include one or more sensors that measure the energy content.

In some embodiments, the first threshold energy content may be a maximum energy content required at a gas output. For example, a power plant may require that collected landfill gas have at most the first threshold energy content for the landfill gas to be used for generating electricity. In some embodiments the first threshold energy content is 910, 920, 930, 940, 950, 960, 970, 980, 990, or 1000 BTU/SCF.

If at act 1902 the system determines that the measured energy content is greater than the first threshold energy content, then process 1900 proceeds to act 1904, where the system obtains a first error recovery adjustment to apply to multiple valves disposed at multiple wells in a landfill. In some embodiments, the first error recovery adjustment may be an adjustment to open the valves to increase flow of landfill gas being extracted from the wells.

In some embodiments, the first error adjustment is opening the valves by 0.5, 1, 2, 3, 4, 5, 6, 7, 8, 9, 10, 11, 12, 13, 14, or 15 degrees. In some embodiments, the first error adjustment is opening the valves by 20, 30, 40, 50, 60, 70, 80, 90, 100, 110, 120, 130, 140, 150, 160, 170, or 180 degrees. In some embodiments, the first error adjustment is opening the valves to a maximum open position. In some embodiments, the first error adjustment is opening the valves by 1%, 5%, 10%, 15%, 20%, 25%, 30%, 40%, 45%, 50%, 55%, 60%, 65%, 70%, 75%, 80%, 85%, 90%, 95%, or 100%. In some embodiments, the first error recovery adjustment may be stored in a memory of the system. In some embodiments, the first error recovery adjustment may be received by the system from a computer separate from the system.

Next, process 1900 proceeds to act 1906 where the system determines a subset of wells at which to apply the first error recovery adjustment obtained at act 1904. In some embodiments, the system may be configured to determine all the wells at which landfill gas being extracted has (1) a measured concentration of methane that is greater than a first threshold concentration of methane, and (2) a temperature less than or equal to a temperature threshold. In some embodiments, the first threshold concentration of methane is 50%, 55%, 56%, 57%, 58%, 59%, 60%, 61%, 62%, 63%, 64%, or 65%. In some embodiments, the temperature threshold is 100, 105, 110, 115, 120, 125, 130, 135, 140, 145, 150 degrees Celsius. In some embodiments, local controllers coupled to the wells may be configured to determine whether landfill gas being extracted from respective wells meet the criteria. For example, each of the local controllers may receive a signal from the multi-well controller indicating of an error condition in which the aggregate energy content is greater than the first threshold energy content. In response, each local controller may determine whether the landfill gas being extracted from a respective well that the local controller is coupled to meets the two criteria. The local controller may use one or more sensors to obtain a measurement of the concentration of methane in the landfill gas being extracted and a measurement of temperature of the landfill being extracted. The local controller may use the measurements to determine whether landfill gas being extracted from a respective well meets the criteria.

Next, process 1900 proceeds to act 1908, where the system applies the first error recovery adjustment obtained at act 1904 to the identified subset of wells. In some embodiments, each of the of local controllers may be configured to apply the first error recovery adjustment in response to determining that landfill gas being extracted from a respective well has a measured methane concentration greater than the first threshold concentration of methane and a measured temperature less than or equal to the temperature threshold. In some embodiments, the local controller may override other adjustments determined by the controller. For example, the local controller may override adjustments determined from control inputs, or other global adjustments. The local controller may control an actuator to apply the first error recovery adjustment. In some embodiments, the local controller may be configured to apply a gain factor to the error recovery adjustment value received from the multi-well controller. The gain factor may modify the received error recovery adjustment for the well. The gain factor may be tuned for each of the wells. If at act 1902 the system determines that the measured energy content of the collected landfill gas is less than the first threshold energy content, then process 1900 proceeds to act 1910 where the system determines whether the measured energy content is less than a second threshold energy content. In some embodiments, the second threshold energy content may be a minimum energy content required at a gas output. For example, a power plant may require that collected landfill gas have at least the second threshold energy content for the landfill gas to be used for generating electricity. In some embodiments the second threshold energy content is 900, 910, 920, 930, 940, 950, 960, 970, 980, or 990 BTU/SCF.

If at block 1910 the system determines that the measured energy content is greater than the second threshold energy content, then process 1900 proceeds to act 1902 where the system again determines whether a measured energy content of landfill gas collected from multiple wells is greater than the first threshold energy content. In some embodiments, the system may obtain an updated value indicating the measured energy content of the collected landfill gas.

If at act 1910 the system determines that the measured energy content is less than the second threshold energy content, then process 1900 proceeds to block 1912 where the system obtains a second error recovery adjustment to apply to multiple valves disposed at multiple wells in a landfill. In some embodiments, the second error recovery adjustment may be an adjustment to close the valves to restrict flow of landfill gas being extracted from the wells.

In some embodiments, the second error recovery adjustment is closing the valves by 0.5, 1, 2, 3, 4, 5, 6, 7, 8, 9, 10, 11, 12, 13, 14, or 15 degrees. In some embodiments, the first error adjustment is closing the valves by 20, 30, 40, 50, 60, 70, 80, 90, 100, 110, 120, 130, 140, 150, 160, 170, or 180 degrees. In some embodiments, the first error adjustment is closing the valves to a maximum closed position. In some embodiments, the first error adjustment is closing the valves by 1%, 5%, 10%, 15%, 20%, 25%, 30%, 40%, 45%, 50%, 55%, 60%, 65%, 70%, 75%, 80%, 85%, 90%, 95%, or 100%. In some embodiments, the second error recovery adjustment may be stored in a memory of the system. In some embodiments, the second error recovery adjustment may be received by the system from a computer separate from the system.

Next, process 1900 proceeds to block 1914 where the system identifies a subset of wells at which landfill gas being extracted has a measured concentration of methane that is less than a second threshold concentration of methane. In some embodiments, the second threshold concentration of methane is 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, or 60%. In some embodiments, local controllers coupled to the wells may be configured to determine whether landfill gas being extracted from respective wells meet the criteria. For example, multiple local controllers may receive a signal from the multi-well controller indicating of an error condition in which the aggregate energy content is less than the second threshold energy content. In response, each local controller may determine whether the landfill gas being extracted from a respective well that the local controller is coupled to has a measured concentration of methane less than the second threshold concentration of methane. The local controller may use one or more sensors to obtain a measurement of the concentration of methane in the landfill gas being extracted.

Next, process 1900 proceeds to act 1908 where the system applies the second error recover adjustment obtained at act 1912 to the subset of wells identified at act 1914. In some embodiments, each of the of local controllers may be configured to apply the second error recovery adjustment in response to determining that landfill gas being extracted from a respective well has a measured methane concentration less than the second threshold concentration of methane. In some embodiments, the local controller may be configured to override other adjustments determined by the controller. For example, the local controller may override adjustments determined from control inputs, or other global adjustments. The local controller may control an actuator to apply the second error recovery adjustment. In some embodiments, the local controller may be configured to apply a gain factor to the error recovery adjustment value received from the multi-well controller. The gain factor may modify the received error recovery adjustment for the well. The gain factor may be tuned for each of the wells.

After applying obtained error recovery adjustments at act 1908, process 1900 proceeds to act 1902 where the system again determines whether a measured energy content of landfill gas collected from multiple wells is less than a first threshold energy content. In some embodiments, the system may obtain an updated value indicating the measured energy content of the collected landfill gas. In some embodiments, the system may be configured to wait a period of time after applying the determined error recovery adjustment at act 1908. In some embodiments, the period of time may be 15 minutes, 30 minutes, 45 minutes, 1 hour, 1.5 hours, 2 hours, 3 hours, 4 hours, 5 hours, 6 hours, 7 hours, 8 hours, 9 hours, 10 hours, 12 hours, or 1 day.

Proportional Response

Some of the automated control techniques described herein involve adjusting the degree to which one or more valves are open or closed based on the difference between a measured value of a quantity (e.g., BTU, energy content in gas, percentage of a particular type of gas such as methane or oxygen or nitrogen in the landfill gas, etc.) and a target value for that quantity. In some embodiments, when it is determined that a valve is to be closed or opened, the valve is controlled to close or open by a fixed amount. In some embodiments, when it is determined that a valve is to be closed or opened, the valve is controlled to close or open by an amount that depends on the difference between the measured value of the quantity and the target value for that quantity. For example, when closing the valve serves to decrease the difference between the measured value and the target value of a quantity, then the valve may be closed to a greater degree when the difference between the measured and target values is large than when that difference is small. In this way, a valve may be closed and opened by an amount proportional to the difference between the measured and target value of the quantity used for control. As a further example, in some embodiments, when the measured gas composition at the plant is farther away from the desired gas composition, the batch valve open/close command may be greater (as reflected by the larger gains utilized).

Automated Shutoff

In some embodiments, automated control of one or multiple valves in a landfill gas extraction system may be stopped in response to receiving one or more unexpected measurements from one or more sensors parts of the automated control system. In this way, valve adjustments determined by any of the automated control techniques described herein are not determined based on erroneous sensor readings, especially erroneous sensor readings at the power plant.

For example, in some embodiments, automated control may be stopped in response to obtaining gas composition measurement (e.g., from power plant equipment) outside of one or more specified ranges for constituent gasses. As another example, in some embodiments, automated control may be stopped in response to obtaining a BTU measurement (e.g., from power plant equipment) outside of a specified BTU range. For example, automated control may be stopped in response to obtaining a BTU measurement outside of the range of 940-1000 BTUs.

After automated control is stopped, it may be restarted in any suitable way. For example, in some embodiments, the automated control may be restarted after a threshold amount of time has elapsed. As another example, in some embodiments, the automated control may be restarted in response to updated measurements falling within the specified ranges. For instance, if automation control was stopped in response to a measurement of a quantity falling outside of a specified range of "normal" values for that quantity, automated control may be restarted when a subsequent measurement of that same quantity is within the specified range. As yet another example, in some embodiments, automated control may be resumed in response to user input (e.g., provided through a computer interface, such as a graphical computer interface) indicating that the automated control is to be resumed.

Current and Predicted Measurements

The automated control techniques described herein, in some embodiments, control the degree to which one or more valves are open based on one or more sensor measurements (e.g., one or more measurements of gas composition, flow rate, ambient temperature, barometric pressure, BTU measurements at the power plant, etc.). The inventors have recognized that, while such valve adjustments can be effective, in some embodiments the impact of the adjustments takes time to take effect. In other words, the overall response time in the system to a valve adjustment may be slower than desired.

The inventors have recognized that, in some circumstances, the response time to valve adjustments may be reduced, by using a predicted value of a quantity to control the valves instead of a currently measured value of that same quantity. By way of example, suppose that valve control is being performed, in part, based on the percentage of methane in landfill gas. The first measurement may indicate that the percentage of methane is 46%. An hour later, the second measurement may indicate that the percentage of methane is 45%. Another hour later, the third measurement may indicate that the percentage of methane is 44%. A valve adjustment could be made, each hour, based on these measurements. However, by using the 46% and 45% measurements, it may be possible to predict that, in an hour, the predicted value of methane concentration would be 44%. If such a prediction could be made, then the automated control techniques could determine the degree(s) to which to close/open one or more respective values based on the predicted value (i.e., 44%) rather than the measured values of 46% and 45%, and to do so before the 44% value would be measured (an hour later) thereby reducing the overall time needed to control the gas extraction system to a target state.

Accordingly, in some embodiments, one or more (e.g., two, three, etc.) measured values of a quantity (e.g., one or more measurements of gas composition, flow rate, ambient temperature, barometric pressure, BTU measurements at the power plant, etc.) may be used to predict a value that quantity is likely to take during a specified time period in the future (e.g., 1, 5, 10, 15, 20, 25, 30, 35, 40, 45, 50, 55, 60 minutes, 2 hours, 3 hours, between 1 and 5 minutes, between 10 and 20 minutes, between 30 minutes and 2 hours, or any range within these ranges). In some embodiments, two measurements may be used to obtain a predicted value using linear projection (e.g., measure the slope of the line defined by the two measurements and use the measured slope to predict a third value). In embodiments, where a larger number of measurements is used (i.e., three or more), a higher order polynomial projection may be performed.

It should be appreciated that any of the control techniques described herein may use predicted values of measurements for any of the quantities utilized for control (e.g., gas composition, flow rate, ambient temperature, barometric pressure, BTU measurements at the power plant, etc.). In some embodiments, predicted values may be used for all the quantities utilized for control. In some embodiments, one or more predicted values and one or more measured values may be utilized for control. In some embodiments, prediction may not be employed, and only measured values may be used.

Pressure Control

A landfill gas extraction system extracts landfill gas from a collection well by using a vacuum source to create a negative pressure differential between the landfill and a gas output (e.g., a gas treatment plant, and/or a power plant). The negative pressure differential causes landfill gas to flow from the landfill to the gas output through well piping of the gas extraction system. A positive pressure in well piping of the gas extraction system may cause landfill gas to be released into the atmosphere. Landfill gas may have an unpleasant odor. Additionally, landfill gas may contain methane and $CO_2$ which are greenhouse gases that contribute to atmospheric warming. For these reasons, operators of gas extraction systems may be required to take corrective action if it is determined that landfill gas is being released into the atmosphere.

In conventional gas extraction systems, operators review measurements of landfill gas pressure in the well piping of a gas extraction system to determine if there is a risk of landfill gas being released into the atmosphere. These measurements are collected manually (e.g., every month). Operation compliance requirements may require an operator to make a corrective manual adjustment at the gas extraction system if a measurement indicates that there is a risk of landfill gas being released from the gas extraction system into the atmosphere. For example, the operator may be required to make an adjustment to a manually controlled valve.

The inventors have recognized that a gas extraction system may frequently enter a state in which landfill gas is being released into the atmosphere between collected measurements. For example, changes in environmental conditions such as barometric pressure may result in a positive landfill gas pressure in the well piping of the gas extraction system that causes landfill gas to be released into the atmosphere. As another example, control adjustments (e.g., valve position adjustments) made to the gas extraction system may result in a positive landfill gas pressure in the well piping that causes landfill gas to be released into the atmosphere. Conventional gas extraction systems fail to detect instances between collected measurements during which there is a risk of landfill gas being released into the atmosphere due to a positive pressure inside the gas extraction system. As a result, the gas extraction system may be releasing landfill gas into the atmosphere, and violating compliance requirements without detection or corrective action being performed.

Accordingly, the inventors have developed a control system that automatically: (1) determines whether a gas extraction system is in a state in which there is a risk of landfill gas being released into the atmosphere; and (2) automatically controls landfill gas flow to mitigate the risk and/or stop a release of landfill gas. In some embodiments, the control system may be configured to control a valve to control flow of landfill gas through well piping of the gas extraction system. If the landfill gas pressure at a location upstream of the valve is positive, this may indicate that the gas extraction system is in a state in which there is a risk of landfill gas being released into the atmosphere. In some embodiments, the control system may include a pressure sensor to measure the landfill gas pressure at the location upstream of the valve. The control system may be configured to automatically control the valve to reduce the landfill gas pressure at the location upstream of the valve if the sensor indicates that the landfill gas pressure at the location upstream of the valve is above a threshold pressure (e.g., −0.1 mbar). The control system may prevent the gas extraction system from releasing landfill gas into the atmosphere, or make adjustments to reduce or stop release of landfill gas into the atmosphere.

Figure 20:
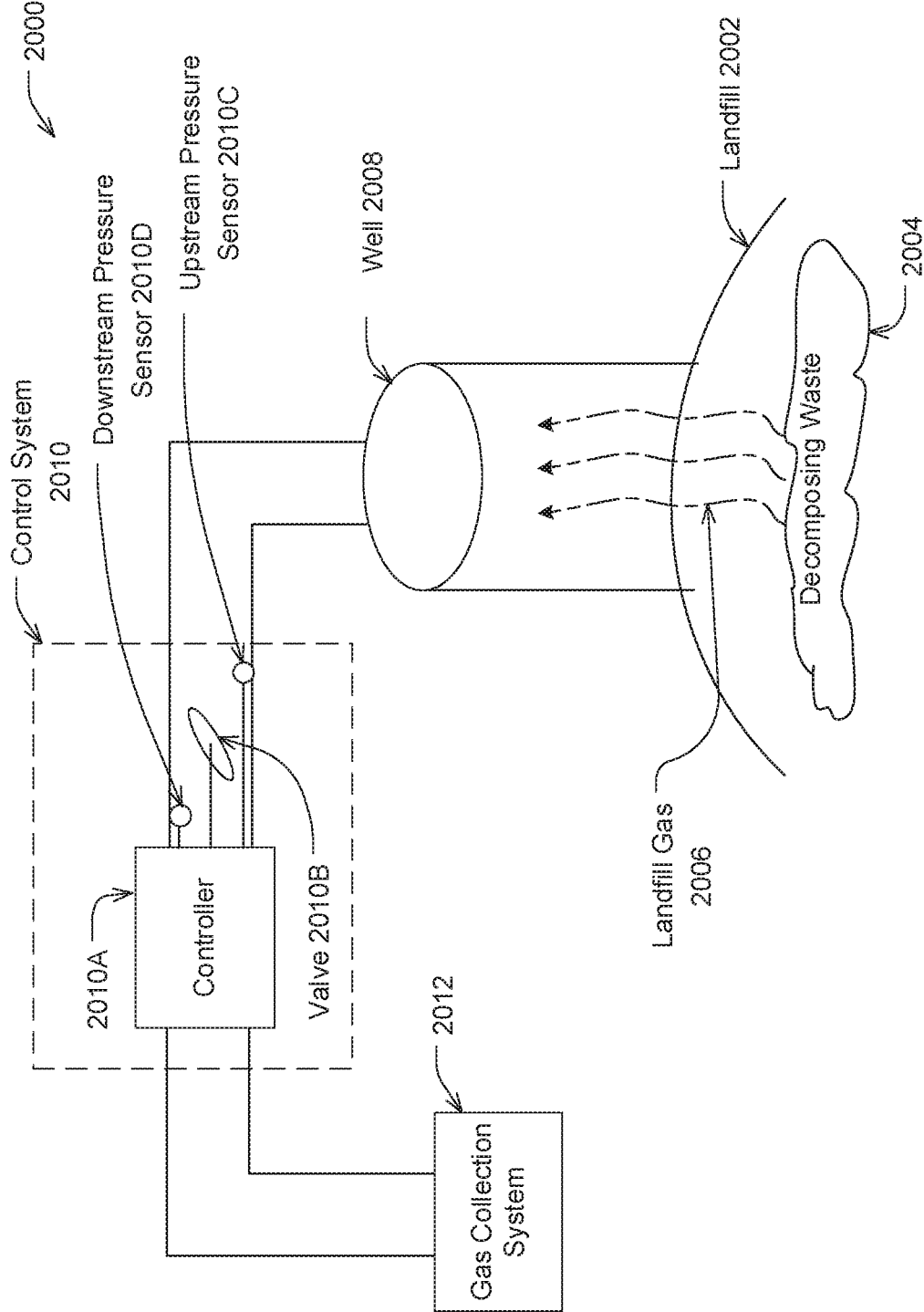
FIG. 20 is an example of a landfill gas extraction system, according to some embodiments.

FIG. 20 illustrates an example environment 2000 in which aspects of the technology described herein may be implemented. The environment 2000 includes a landfill 2002 with decomposing waste 2004. The decomposing waste may generate landfill gas 2006 that flows out from the landfill 2002 through piping of a collection well 2008. The well 2008 is coupled to a control system 2010 that controls a flow of landfill gas through piping of the collection well 2008. A gas collection system 2012 collects the landfill gas extracted from the well 2008. The collected landfill gas may be stored, used, or provided to another entity for use. For example, the collected landfill gas may be used by a power plant to generate electricity. As another example, the collected landfill gas may be treated in a gas processing plant to obtain methane from the landfill gas. For example, the landfill gas may be treated to remove oxygen, carbon dioxide, and/or another gas from the landfill gas. The methane gas may then be transported by a gas distribution system.

In some embodiments, the gas collection system 2012 includes a vacuum source. The vacuum source generates a negative pressure differential between the gas collection system 2012 and the landfill 2002. The negative pressure differential causes landfill gas to flow from the landfill 2002 to the gas collection system through the well 2008. In some embodiments, the gas collection system 2012 may be gas collection system 1512 described above with reference to FIG. 15.

In some embodiments, the control system 2010 may be configured to control extraction of landfill gas at the well 2010. Example control systems are described above with reference to FIGS. 1-3. In the example embodiment of FIG. 20, the control system 2010 includes a controller 2010A configured to control a valve 2010B to control flow of landfill gas through the well piping. In some embodiments, the controller 2010A may be configured to control a position of the valve 2010B to control a flow rate of landfill gas flowing through the well piping. Examples of valves are discussed herein. In some embodiments, the valve 2010B may be a throttle as described in U.S. patent application Ser. No. 16/510,167, titled "LANDFILL GAS EXTRACTION SYSTEM THROTTLE," filed on Jul. 12, 2019, which is incorporated by reference in its entirety herein. The control system 2010 includes an upstream pressure sensor 2010C for measuring landfill gas pressure at a location upstream of the valve 2010B, and a downstream pressure sensor 2010D for measuring landfill gas pressure at a location downstream of the valve 2010B. Example pressure sensors are discussed herein.

Landfill gas pressure at a location upstream of a valve may also be referred to herein as "landfill gas pressure upstream of the valve," and/or "upstream landfill gas pressure." Landfill gas pressure at a location downstream of a valve may also be referred to herein as "landfill gas pressure downstream of the valve," and/or "downstream landfill gas pressure."

In some embodiments, the controller 2010A may be configured to use a measurement of landfill gas pressure at the location upstream of the valve 2010B obtained from the pressure sensor 2010C to determine whether the gas extraction system is in a condition in which there is a risk of landfill gas being released into the atmosphere. In some embodiments, the controller 2010A may be configured to determine whether the measurement of landfill gas pressure at the location upstream of the valve 2010B is greater than a threshold pressure. The controller 2010A may be configured to take corrective action in response to determining that the measurement of landfill gas pressure at the location upstream of the valve is greater than the threshold pressure. For example, the controller 2010A may be configured to control the valve 2010B to reduce the landfill gas pressure upstream of the valve and, as a result, prevent, reduce, or stop release of landfill gas into the atmosphere. In some embodiments, the controller 2010A may be configured to change a degree to which the valve 2010B is open to change the landfill gas pressure upstream of the valve. For example, the controller 2010A may rotate the valve 2010B to open the valve 2010B further to cause a reduction in landfill pressure upstream of the valve.

In some embodiments, the controller 2010A may be configured to determine if the landfill gas pressure at a location downstream of the valve is less than a threshold pressure based on a measurement obtained from the downstream pressure sensor 2010D to determine if there is sufficient negative landfill gas pressure downstream of the valve to use to reduce the landfill gas pressure upstream of the valve. For example, the controller 2010A may determine whether the measurement of the landfill gas pressure at the location downstream of the valve 2010B is negative. In some embodiments, the controller 2010A may be configured to determine to change a position of the valve 2010B based on the measurement of the landfill gas pressure at the location downstream of the valve to ensure that the valve 2010B is only opened further if there is sufficient negative landfill gas pressure downstream of the valve 2010B that may be used to reduce the pressure upstream of the valve 2010B. For example, the controller 2010A may determine to increase the degree to which the valve 2010B is open if the controller 2010A determines that (1) the landfill gas pressure at the location upstream of the valve is positive, and (2) the landfill gas pressure at the location downstream of the valve measured by the pressure sensor 2010D is negative. As another example, the controller 2010A may determine to increase the degree to which the valve 2010B is open if the controller 2010A determines that (1) the landfill gas pressure at the location upstream of the valve is above a threshold (e.g., −0.1 MBar), and (2) the landfill gas pressure at the location downstream of the valve measured by the pressure sensor 2010D is negative.

In some embodiments, the controller 2010A may be a local controller to the well 2008. For example, controller 2010A may be one of controller 1510A-C described above with reference to FIG. 15. In some embodiments, the controller 2010A may be remote from the well 2008. The controller 2010A may be in communication with an actuator and/or sensors 2010C-D located at the well 2008 to remotely control the valve 2010B.

In some embodiments, the controller 2010A may be configured to control the valve 2010B to reduce the landfill gas pressure upstream of the valve 2010B by not implementing one or more other adjustments in position determined for the valve based on other control inputs (e.g., vacuum pressure change, barometric pressure change, ambient temperature change, field level adjustment inputs). For example, if the controller 2010A detects that the landfill gas pressure upstream of the valve 2010B is greater than a threshold pressure, the controller 2010A may bypass the other adjustments in position determined for the valve 2010B.

In some embodiments, the controller 2010A may be configured to use the measurement of landfill gas pressure at the location upstream of the valve 2010B and/or a determination of whether the measured landfill gas pressure at the location upstream of the valve 2010B exceeds a threshold pressure as an input to use in combination with other inputs to determine an adjustment in position for the valve 2010B. For example, the controller 2010A may be configured to use the measured landfill gas pressure at the location upstream of the valve 2010B as an additional input to inputs 1702A-E described above with reference to FIG. 17 to determine a cumulative adjustment to the valve position 2010B based on multiple different inputs.

In some embodiments, the controller 2010A may be configured to store a record of a detected state in which there was a risk of releasing landfill gas into the atmosphere. Regulators (e.g., government) may require reporting of cases in which there is a risk of landfill gas releasing landfill gas into the atmosphere, and a record of corrective action. To comply with these requirements, the controller 2010A may be configured to automatically store a record of when the measured landfill gas pressure at the location upstream of the valve 2010B exceeds a threshold pressure. For example, the controller 2010A may store a timestamp, and measurement of the landfill gas pressure at the location upstream of the valve 2010B in response to detecting a state in which there is a risk of landfill gas being released into the atmosphere. In some embodiments, the controller 2010A may be configured to store a record of corrective action taken by the controller 2010A. For example, the controller 2010A may store one or more adjustments made to the position of the valve 2010B, and/or one or more measurements of the landfill gas pressure upstream of the valve 2010B subsequent to the adjustment(s). In some embodiments, the controller 2010A may be configured to store a record of the measurement(s) of the landfill gas pressure upstream of the valve subsequent to the adjustment(s) when the controller 2010A has detected that the measurement(s) of the landfill gas pressure upstream of the valve is less than the threshold pressure (e.g., −0.1 mbar).

Figure 21:
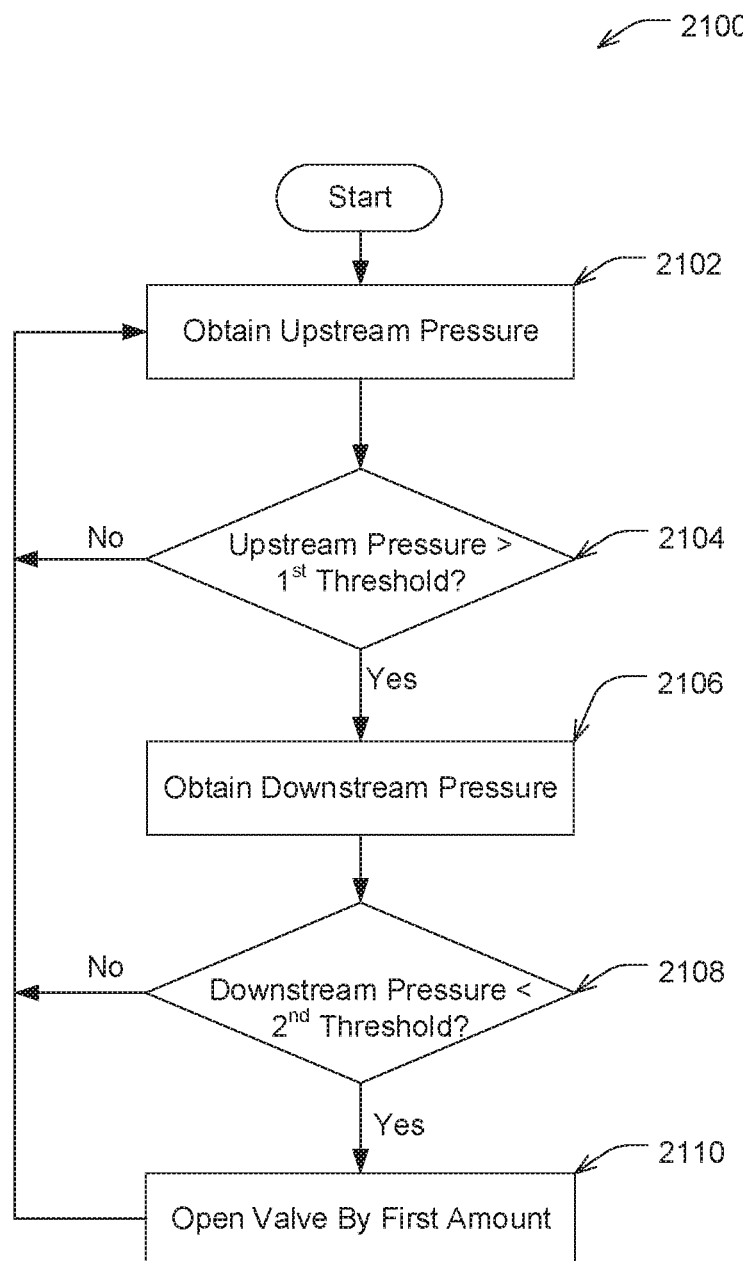
FIG. 21 is a flow chart of a process for controlling pressure in a landfill gas extraction system, according to some embodiments.

FIG. 21 is a flowchart of an illustrative process 2100 for controlling flow of landfill gas. Process 2100 may be performed at least in part by control system 2010 described above with reference to FIG. 20.

Process 2100 begins at act 2102 where the system obtains a measurement of a landfill gas pressure at a location upstream of a valve of the system. For example, the system may obtain a measurement of landfill gas pressure upstream of the valve 2010B from pressure sensor 2010C. The landfill gas pressure upstream of the valve may be used by the system as an indication as to whether the gas extraction system is in a state, or approaching a state, in which it may be releasing landfill gas into the atmosphere.

Next, process 2100 proceeds to act 2104, where the system determines whether the measurement of landfill gas pressure upstream of the valve is greater than a first threshold pressure. In some embodiments, the first threshold pressure may be a pressure at which there is a risk of landfill gas being released into the atmosphere. In some embodiments, the first threshold pressure is approximately −0.6 mbar, −0.5 mbar, −0.4 mbar, −0.3 mbar, −0.2 mbar, −0.1 mbar, 0 mbar, 0.1 mbar, 0.2 mbar, 0.3 mbar, 0.4 mbar, 0.5 mbar, or 0.6 mbar. In some embodiments, the first threshold pressure may be a variable value that is determined by the system. For example, the system may be configured to determine the first threshold pressure based on one or more environmental conditions (e.g., barometric pressure, ambient temperature, and/or vacuum pressure).

If at act 2104 the system determines that the measurement of landfill gas pressure upstream of the valve is less than the first threshold pressure, then process 2100 returns to act 2102 where the system again obtains a measurement of the landfill gas pressure upstream of the valve. The system may determine that there is no corrective action to be taken based on the measurement of the landfill gas pressure upstream of the valve. For example, the system may maintain a current position of the valve. As another example, the system may implement one or more valve position adjustments determined based on control inputs (e.g., ambient temperature change, barometric pressure change) other than the measurement of landfill gas pressure upstream of the valve.

In some embodiments, the system may be configured to obtain a measurement of the landfill gas pressure upstream of the valve at a regular interval. For example, the system may obtain a measurement every second, minute, or hour. Some embodiments are not limited to a particular frequency of obtaining measurements of the landfill gas pressure upstream of the valve.

If at act 2104 the system determines that the measurement of landfill gas pressure upstream of the valve is greater than the first threshold pressure, then process 2100 process to act 2106 where the system obtains a measurement of landfill gas pressure at a location downstream of the valve. For example, the system may obtain a measurement of the landfill gas pressure downstream of the valve 2010B from pressure sensor 2010D described above with reference to FIG. 20. The measurement of landfill gas pressure downstream of the valve may be used as an indication as to whether there is negative landfill gas pressure downstream of the valve that can be utilized to reduce the landfill gas pressure upstream of the valve.

After obtaining the measurement of landfill gas pressure downstream of the valve at act 2106, process 2100 proceeds to act 2108 where the system determines whether the landfill gas pressure downstream of the valve is less than a second threshold pressure. In some embodiments, the second threshold pressure may be a pressure at which opening the valve may reduce the pressure upstream of the valve. For example, if there is negative landfill gas pressure downstream of the valve, opening the valve may reduce the landfill gas pressure upstream of the valve. In some embodiments, the second threshold pressure is approximately −5 mbar, −4 mbar, −3 mbar, −2 mbar, −1 mbar, 0 mbar. In some embodiments, the second threshold pressure may be a variable value that is determined by the system. For example, the system may determine the second threshold pressure based on the landfill gas pressure upstream of the valve. The system may set the threshold pressure to a value less than the measured landfill gas pressure upstream of the valve to ensure that opening the valve results in reduction of landfill gas pressure upstream of the valve.

If at act 2108 the system determines that the measurement of landfill gas pressure downstream of the valve is less than the second threshold pressure, then process 2100 proceeds to act 2102. In some embodiments, the system may be configured to maintain the valve at a current position, as there is not sufficient pressure differential between the landfill gas pressure upstream of the valve and the landfill gas pressure downstream of the valve to reduce the landfill gas pressure upstream of the valve by opening the valve. For example, if the landfill gas pressure downstream of the valve is not negative, opening the valve further may result in increasing the landfill gas pressure upstream of the valve. This in turn may increase the release of landfill gas into the atmosphere.

If at act 2108 the system determines that the landfill gas pressure downstream of the valve is less than the second threshold pressure, then process 2100 proceeds to act 2110, where the system opens the valve by a first amount. In some embodiments, the system may be configured to specify a percentage to set the position of the valve. For example, 0% may be a fully closed valve, and 100% may be a fully open valve. At act 2110, the system may be configured to open the valve by a certain percentage. For example, the system may open the valve by 1%, 2%, 3%, 4%, 5%, 10%, 15%, 20%, or 25%. In some embodiments, the system may be configured to specify a rotational position of the valve. For example, 0 degrees may be fully closed, and 180 degrees may be fully opened. At act 2110, the system may be configured to open the valve by a certain number of degrees. For example, the system may open the valve by 1, 2, 3, 4, 5, 10, 15, 20, or 25 degrees. In some embodiments, the system may be configured to open the valve by an amount that is proportional to a ratio of the landfill gas pressure upstream of the valve to a threshold pressure value. In some embodiments, the threshold pressure value may be −5 mbar, −4 mbar, −3 mbar, −2 mbar, −1 mbar, 1 mbar, 2 mbar, 3 mbar, 4 mbar, or 5 mbar.

After opening the valve by the first amount at act 2110, process 2100 proceeds to act 2102 where the system again obtains a measurement of the landfill gas pressure upstream of the valve (e.g., from pressure sensor 2010C). In some embodiments, the system may be configured to make incremental changes (e.g., by the first amount) in position of the valve until the landfill gas pressure upstream of the valve is less than the first threshold. Obtaining a new measurement of the landfill gas pressure upstream of the valve after opening the valve by the first amount may provide the system with an indication of an effect that the adjustment had on the landfill gas pressure upstream of the valve.

In some embodiments, the system may be configured to prevent further adjustments if a measurement of landfill gas pressure upstream of the valve obtained after making an adjustment in valve position results in an undesired effect. For example, if the landfill gas pressure upstream of the valve increases in response to the adjustment, the system may prevent subsequent adjustments in the same direction (e.g., opening the valve further).

In some embodiments, the system may be configured to repeat process 2100 at a regular interval (e.g., every second, minute, hour, and/or day). In some embodiments, this may allow the system to detect a risk of releasing landfill gas into the atmosphere during all times of operation of the gas extraction system, and take corrective action in response. This ensures that the gas extraction system mitigates release of landfill gas into the atmosphere, and also automatically meets operational requirements by automatically taking corrective action and documenting effects of the corrective action.

Figure 11:
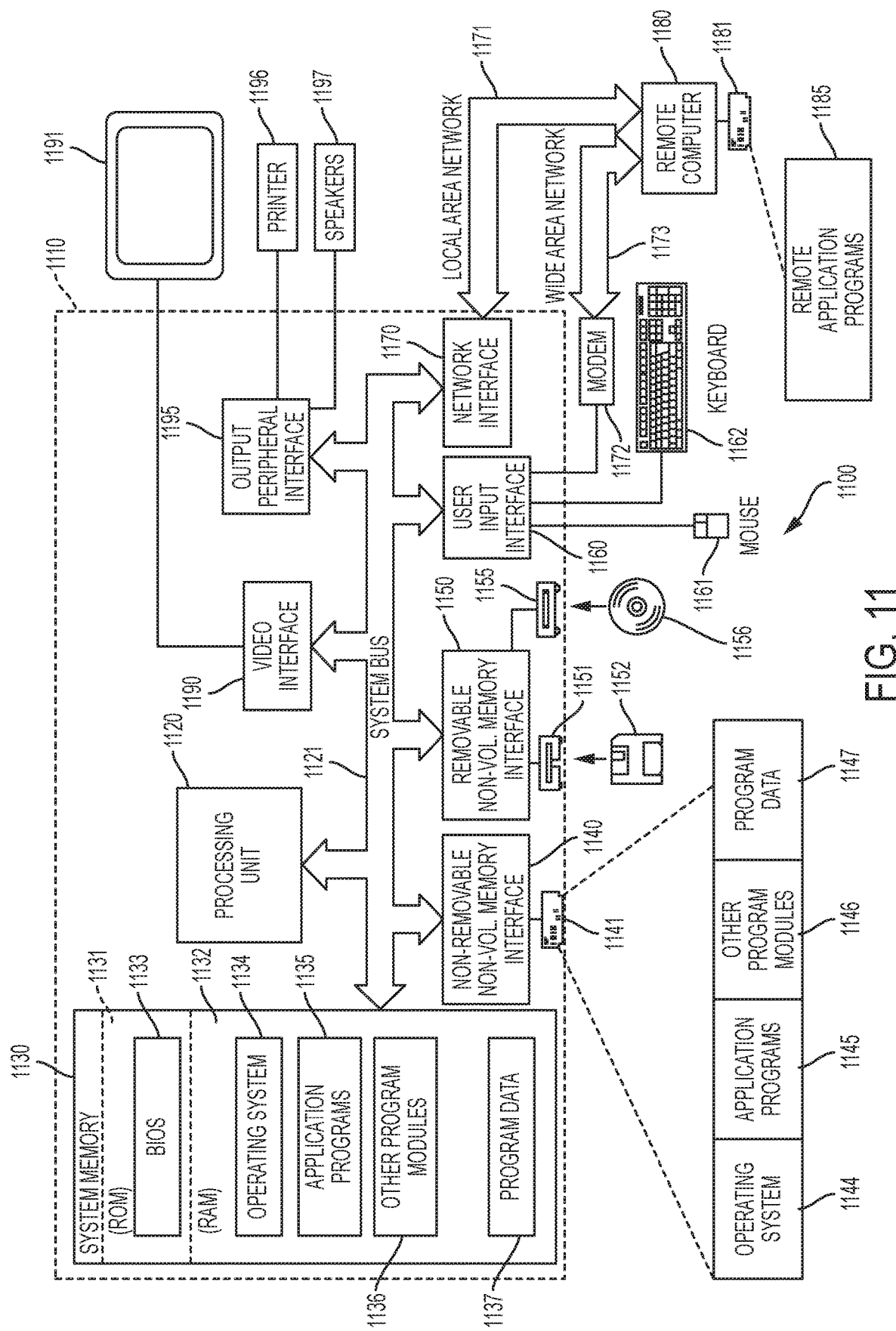
FIG. 11 is a block diagram of an exemplary computer system in which aspects of the present disclosure may be implemented, according to some embodiments.

FIG. 11 illustrates an example of a suitable computing system environment 1100 on which techniques disclosed herein may be implemented. In some embodiments, portions of a landfill gas extraction control system may be implemented in a computing system environment. For example, in some embodiments, Device Manager 502, Controller Module 504, User Interface 508, and/or Database 510 may be implemented in a computing system environment. In some embodiments, aspects of one or more techniques described herein may be implemented in a computing system environment.

The computing system environment 1100 is only one example of a suitable computing environment and is not intended to suggest any limitation as to the scope of use or functionality of the devices and techniques disclosed herein. Neither should the computing environment 1100 be interpreted as having any dependency or requirement relating to any one or combination of components illustrated in the exemplary operating environment 1100.

The techniques disclosed herein are operational with numerous other general purpose or special purpose computing system environments or configurations. Examples of well-known computing systems, environments, and/or configurations that may be suitable for use with techniques disclosed herein include, but are not limited to, personal computers, server computers, hand-held devices (e.g., smart phones, tablet computers, or mobile phones), laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 11, an exemplary system for implementing techniques described herein includes a general purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and/or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through an non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information into the computer 1110 through input devices such as a keyboard 1162 and pointing device 1161, commonly referred to as a mouse, trackball or touch pad. Other input devices (not shown) may include a microphone, joystick, game pad, satellite dish, scanner, or the like. These and other input devices are often connected to the processing unit 1120 through a user input interface 1160 that is coupled to the system bus, but may be connected by other interface and bus structures, such as a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through a output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

Embodiments of the above-described techniques can be implemented in any of numerous ways. For example, the embodiments may be implemented using hardware, software or a combination thereof. When implemented in software, the software code can be executed on any suitable processor or collection of processors, whether provided in a single computer or distributed among multiple computers. In some embodiments, the functions performed by an In Situ Control Mechanism 106 and/or a Controller 204 may be implemented as software executed on one or more processors.

Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various events/acts are described herein as occurring or being performed at a specified time. One of ordinary skill in the art would understand that such events/acts may occur or be performed at approximately the specified time.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

What is claimed is:

1. A method for controlling, with a control system comprising at least one controller, extraction of landfill gas from a landfill via a gas extraction system, the gas extraction system comprising well piping for coupling a plurality of wells to a gas output, the plurality of wells comprising a first well having a first valve for controlling a flow rate of landfill gas being extracted from the first well, the method comprising:

using the at least one controller to perform:
determining, based on a measure of concentration of a first constituent gas in landfill gas collected from at least some of the plurality of wells, a global adjustment to be made to flow rates of landfill gas being extracted from the at least some of the plurality of wells, the at least some of the plurality of wells including the first well;
determining, based on a measure of concentration of a second constituent gas in landfill gas collected from the first well, a local adjustment to be made to the first valve to adjust the flow rate of landfill gas being extracted from the first well;
determining at least one adjustment to be applied to the first valve based at least in part on the global adjustment and the local adjustment; and
adjusting the flow rate of the first well by applying the at least one adjustment to the first valve of the first well.

2. The method of claim 1, wherein the local adjustment comprises a value indicating a degree to which to open or close the first valve.

3. The method of claim 1, wherein the global adjustment comprises a value indicating a degree to which to open or close the first valve.

4. The method of claim 3, wherein the at least one adjustment consists of a single adjustment determined using the local adjustment and the global adjustment.

5. The method of claim 4, wherein the single adjustment comprises a sum of the local adjustment and the global adjustment.

6. The method of claim 5, wherein the single adjustment comprises a weighted sum of the local adjustment and the global adjustment.

7. The method of claim 1, wherein the at least some of the plurality of wells includes a second well having a second valve for controlling a flow rate of landfill gas being extracted from the second well, the method further comprising:

determining, with the at least one controller, based on a measure of concentration of the second constituent gas in landfill gas collected from the second well, a local adjustment to be made to the second valve;

determining, with the at least one controller, at least one adjustment to be made to the second valve based at least in part on the global adjustment and/or the local adjustment to be made to the second valve; and adjusting, with the at least one controller, the flow rate of the second well by applying the at least one adjustment to be made to the second valve to the second valve of the second well.

8. The method of claim 1, wherein the first constituent gas comprises methane and the second constituent gas comprises one of methane, oxygen, or nitrogen.

9. The method of claim 8, wherein determining the global adjustment is performed based on a measure of energy content of the landfill gas being extracted from the at least some of the plurality of wells.

10. A control system for controlling extraction of landfill gas from a landfill via a gas extraction system, the gas extraction system comprising well piping for coupling a plurality of wells to a gas output, the plurality of wells comprising a first well having a first valve for controlling a flow rate of landfill gas being extracted from the first well, the control system comprising:

at least one controller configured to:
  determine, based on a measure of concentration of a first constituent gas in landfill gas collected from at least some of the plurality of wells, a global adjustment to be made to flow rates of landfill gas being extracted from at least some of the plurality of wells, the at least some of the plurality of wells including the first well;
  determine, based on a measure of concentration of a second constituent gas in landfill gas collected from the first well, a local adjustment to be made to the first valve to adjust the flow rate of landfill gas being extracted from the first well;
  determine at least one adjustment to be applied to the first valve based at least in part on the global adjustment and the local adjustment; and
  adjust the flow rate of the first well by applying the at least one adjustment to the first valve of the first well.

11. The control system of claim 10, wherein the local adjustment comprises a value indicating a degree to which to open or close the first valve.

12. The control system of claim 11, wherein the global adjustment comprises a value indicating a degree to which to open or close the first valve.

13. The control system of claim 12, wherein the at least one adjustment consists of a single adjustment determined using the local adjustment and the global adjustment.

14. The control system of claim 13, wherein the single adjustment comprises a sum of the local adjustment and the global adjustment.

15. The control system of claim 14, wherein the single adjustment comprises a weighted sum of the local adjustment and the global adjustment.

16. The control system of claim 10 wherein the at least some of the plurality of wells includes a second well having a second valve for controlling a flow rate of landfill gas being extracted from the second well and the at least one controller is further configured to:
  determine, based on a measure of concentration of the second constituent gas in landfill gas collected from the second well, a local adjustment to be made to the second valve;
  determine at least one adjustment to be applied to the second valve based at least in part on the global adjustment and/or the local adjustment to be made to the second valve; and
  adjust the flow rate of the second well by applying the at least one adjustment to be made to the second valve to the second valve of the second well.

17. The control system of claim 10, wherein the first constituent gas comprises methane and the second constituent gas comprises one of methane, oxygen, or nitrogen.

18. The control system of claim 17, wherein the at least one controller is configured to determine the global adjustment based at least in part on a measure of energy content of the landfill gas being extracted from the at least some of the plurality of wells.

* * * * *